United States Patent
Braedt et al.

(10) Patent No.: US 12,122,479 B2
(45) Date of Patent: Oct. 22, 2024

(54) MODULAR BICYCLE DERAILLEUR

(71) Applicant: SRAM DEUTSCHLAND GBMH, Schweinfurt (DE)

(72) Inventors: Henrik Braedt, Hambach (DE); Sebastian Dueweling, Mainberg (DE); Florian Fuhlrott, Bamberg (DE); Tobias Harcke, Dittelbrunn (DE); Alexander Linke, Schonungen (DE); Matthias Mueller, Schweinfurt (DE); Joachim Stuermer, Schweinfurt (DE); Martin Weiss, Schweinfurt (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 0 days.

(21) Appl. No.: 17/852,879

(22) Filed: Jun. 29, 2022

(65) Prior Publication Data
US 2022/0411017 A1 Dec. 29, 2022

(30) Foreign Application Priority Data

Jun. 29, 2021 (DE) ...................... 10 2021 003 319.1
Jun. 22, 2022 (DE) ...................... 10 2022 115 599.4

(51) Int. Cl.
*B62M 9/125* (2010.01)
*B62M 9/122* (2010.01)
(Continued)

(52) U.S. Cl.
CPC ............ *B62M 9/125* (2013.01); *B62M 9/122* (2013.01); *B62M 9/126* (2013.01); *B62M 9/16* (2013.01); *B62M 2009/12406* (2013.01)

(58) Field of Classification Search
CPC .... B62M 9/122; B62M 9/1242; B62M 25/08; B62M 9/126; B62M 9/124; B62M 9/125;
(Continued)

(56) References Cited

U.S. PATENT DOCUMENTS 4,183,255 A * 1/1980 Leiter .................. B62M 9/1246
474/82
5,957,792 A * 9/1999 Ando ..................... B62M 9/125
474/127
(Continued)

FOREIGN PATENT DOCUMENTS

CN 108725685 11/2018
DE 102020201229 9/2020
(Continued)

*Primary Examiner* — Henry Y Liu

(57) ABSTRACT

A rear derailleur is configured as a hierarchical, at least two-level modular construction system and comprises at least several of the modules: "base element module", "swivel formation module", "shifting element module", and "chain guiding device module". At least one of the modules is replaceable and handleable in one piece. At least one of the modules includes at least one sub-assembly that is replaceable and handleable in one piece. In an embodiment the modular construction system is configured to use at least one family of sub-assemblies comprising at least two family members within at least one of the modules.

Detachable connection interfaces of the family members to adjacent sub-assemblies of the module within the sub-assembly family are configured uniformly across family members for the respective sub-assembly family in such a way that a family member of the sub-assembly family of the module is exchangeable for another family member of the same sub-assembly family that, is for example, of different material, of different design, of different functionality or has different surface properties, while retaining the remaining sub-assemblies of the module.

19 Claims, 39 Drawing Sheets

(51) Int. Cl.
  *B62M 9/124*  (2010.01)
  *B62M 9/126*  (2010.01)
  *B62M 9/16*   (2006.01)

(58) Field of Classification Search
  CPC ...... B62M 9/121; B62M 9/1248; B62M 9/16; B62M 2009/12406
  USPC ..................................................... 474/80, 82
  See application file for complete search history.

(56) References Cited

U.S. PATENT DOCUMENTS

| | | | |
|---|---|---|---|
| 6,290,621 B1* | 9/2001 | Ichida | B62M 9/1242 474/82 |
| 7,780,558 B2 | 8/2010 | Kunisawa | |
| 8,105,193 B2 | 1/2012 | Oseto | |
| 2004/0116222 A1* | 6/2004 | Shahana | B62M 9/125 474/82 |
| 2006/0091639 A1* | 5/2006 | Dearborn | B62M 9/10 280/260 |
| 2006/0135301 A1* | 6/2006 | Shahana | B62M 9/1248 474/82 |
| 2007/0037645 A1* | 2/2007 | Ishikawa | B62M 25/08 474/70 |
| 2008/0026891 A1* | 1/2008 | Oseto | B62M 9/1242 474/82 |
| 2008/0058136 A1* | 3/2008 | Muramoto | B62M 9/126 474/82 |
| 2009/0215561 A1* | 8/2009 | Fukuda | B62M 9/122 474/82 |
| 2013/0130853 A1* | 5/2013 | Bohm | B62M 9/124 474/80 |
| 2014/0087901 A1* | 3/2014 | Shipman | B62M 9/1242 429/100 |
| 2015/0111675 A1* | 4/2015 | Shipman | B62M 9/122 474/82 |
| 2015/0259031 A1* | 9/2015 | Sala | B62M 9/122 474/80 |
| 2016/0176478 A1* | 6/2016 | Chang | B62M 9/126 474/69 |
| 2016/0318582 A1* | 11/2016 | Johnson | B62K 23/04 |
| 2017/0066501 A1* | 3/2017 | Hilgenberg | B62M 9/122 |
| 2017/0113759 A1* | 4/2017 | Watarai | B62J 43/30 |
| 2018/0274623 A1* | 9/2018 | Brown | F16F 9/10 |
| 2018/0354586 A1* | 12/2018 | Komatsu | B62M 9/1242 |
| 2019/0023351 A1 | 1/2019 | Tsai | |
| 2019/0061876 A1* | 2/2019 | Suyama | B62M 9/1242 |
| 2019/0144071 A1* | 5/2019 | Boehm | B62M 9/122 474/80 |
| 2019/0300111 A1 | 10/2019 | Liao | |
| 2019/0322333 A1* | 10/2019 | Braedt | B62M 9/125 |
| 2020/0062343 A1* | 2/2020 | Braedt | B62M 9/125 |
| 2020/0189688 A1* | 6/2020 | Rodgers | B62M 9/1242 |
| 2020/0198728 A1* | 6/2020 | Braedt | B62M 9/125 |
| 2020/0269954 A1* | 8/2020 | Mizutani | B62M 9/128 |
| 2020/0385088 A1* | 12/2020 | Fukumori | B62M 9/123 |
| 2021/0129937 A1* | 5/2021 | Sala | H02J 7/02 |
| 2021/0129938 A1* | 5/2021 | Sala | B62M 9/1242 |

FOREIGN PATENT DOCUMENTS

| | | |
|---|---|---|
| EP | 1396419 | 3/2004 |
| EP | 3216688 | 9/2017 |
| EP | 3730394 | 10/2020 |
| TW | 202009173 | 3/2020 |

* cited by examiner

MODULAR BICYCLE DERAILLEUR

This application claims priority to, and/or the benefit of, German patent applications DE 10 2021 003 319.1 filed Jun. 29, 2021 and DE 10 2022 115 599.4 filed Jun. 22, 2022, the contents of which are incorporated herein in their entirety.

FIELD OF THE DISCLOSURE

The present disclosure relates to bicycle rear derailleurs.

BACKGROUND

A bicycle is typically equipped with a drive arrangement, such as a chain drive. Such bicycle drive arrangements are used to transmit drive torque from a rider to a rear wheel and to propel the bicycle in this manner. For example, such a drive arrangement may transmit torque from a front chainring assembly to a rear sprocket assembly, such as a sprocket of a multispeed sprocket cassette, to drive the rear wheel. Such drive arrangement is commonly referred to as a bicycle drive train.

In a bicycle drivetrain, front chainring assemblies may have one or more chain wheels, in the industry known as chainrings. Such front chainrings may be attached to a bicycle using a variety of attachment fixtures. For example, a chainring may be attached with chainring bolts, or may be directly connected to the right-hand crank of a bicycle. Rear chain wheels of a bicycle are commonly referred to as sprockets. A plurality of rear sprockets is commonly referred to as a cassette, sprocket cassette, or sprocket set. A sprocket cassette is typically configured to be attached to a freewheel portion of a rear wheel. For this purpose, a sprocket cassette may be attached to a freewheel body of a rear wheel hub, for example, by means of a splined and/or threaded connection.

The horizontal, left/right alignment of a front chainring with a rear sprocket cassette affects the performance of the drive train. For example, a front chainring assembly may have a single chainring aligned with a particular sprocket of the sprocket set of a rear sprocket cassette. When the chain connects the single chainring to this substantially aligned rear sprocket, the chain is under little or no lateral, left/right load. However, when the chain is moved laterally to another sprocket of the cassette, such as by a rear chain derailleur of the drive train, the chain and the entire drive train experience increased lateral loading. Corresponding lateral loads on the chain occur when a front chainring arrangement has several chainrings, where the chain can be moved laterally between these chainrings by a front derailleur as part of the drive train.

For optimal performance of such derailleur drive trains, proper positioning and alignment especially of the rear derailleur on the frame of the bike is particularly important.

The coaxial characteristics of a rear derailleur alignment with respect to the rear wheel can be applied to a rear bicycle derailleur. In particular, components of the rear wheel, specifically the rear hub, can serve as a direct reference for the assembly and alignment of the rear derailleur.

This way, a rear derailleur and a sprocket cassette can be aligned, with respect to a rear axle of the bicycle, both radially and axially to each other and simultaneously to the rear axle. This way, inaccuracies that commonly occur due to tolerance variations and tolerance chains particularly of the rear frame, of the so-called derailleur hanger required for conventional rear derailleurs, and of the rear derailleur itself can be significantly reduced, or even practically eliminated.

Conventionally, rear derailleurs are mounted at the right dropout of a bicycle frame, or generally at the end area of the right chain stay, by means of a derailleur hanger, which is usually a separate part that is attached to the frame. The attachment point of the rear derailleur is then offset radially with respect to the rear wheel axis of the bicycle due to the attachment with a derailleur hanger and is therefore not coaxial with the rear wheel axis.

Especially for bicycle frames made of carbon or aluminum, derailleur hangers have become established which are provided separately and mounted as an additional part, as this arrangement allows the derailleur hanger to be replaced in the event of damage. In steel bicycle frames, the derailleur hanger is often configured in a single piece as part of the rear frame or as part of the right-hand side rear dropout, in this case called a rear frame eye.

In addition to the design advantages of lightweight frames, replaceable derailleur hangers have become established primarily because damage often occurs to conventional bicycle derailleurs in the event of accidents, jamming of the chain or collisions of the rear derailleur with obstacles. In many such cases, damage in the form of bending or breaking can be limited to the derailleur hanger, without additionally severely damaging the frame or the derailleur, which would require costly repair or replacement. However, this certain advantage of the derailleur hanger is countered by a number of disadvantages.

For example, if the derailleur hanger is torn off or severely bent, it must be completely replaced. The continuation of the ride is therefore usually not possible in such cases. Also, the hanger can be deformed in a way such that the rear derailleur is caught by the spokes of the wheel. This can lead to considerable consequential damage to the drive train, the wheel or the frame, and is also not without risk for the rider, for example in the event of the rear wheel locking as a result.

Such derailleur hangers are fixed to the dropout of the rear frame at one end of the derailleur hanger in the area of the rear axle, for mounting on the bicycle, and are connected to a base element (in the industry known as a B-knuckle) of the bicycle derailleur at the other end of the derailleur hanger. The base element of the rear derailleur is usually rotatable relative to the derailleur hanger about the so-called B-axis of the base element, which is parallel to the rear wheel axis but radially offset from it.

These known derailleur hangers differ greatly from each other depending on the manufacturer and mounting method. They can be designed in one piece with the frame or as a separate component. Separate derailleur hangers are either clamped to the frame via quick-release axles or thru axles, or bolted or riveted to the dropout. Furthermore, derailleur hangers can be connected to the frame either on the outside of the right-hand side rear frame dropout, or on the inside.

It is known in the industry that the bicycle market offers hundreds of different and mutually incompatible derailleur hangers alone for the current bicycle models, and even more if previous years' models are considered.

Depending on the frame and derailleur hanger used, this results in the rear derailleur adopting a different position in the radial direction relative to the rear wheel axis and also in the axial direction relative to the sprocket set. Such differences in position in both the axial and radial directions complicate the rear derailleur design as well as the assembly and adjustment of the rear derailleur. The rear derailleur must be adjusted differently depending on the respective frame and derailleur hanger used.

With such known rear frame derailleur eyes or derailleur hangers, there are considerable additional tolerances in the dimensional chain between the sprocket cassette and rear derailleur position, which have a negative effect on the positioning accuracy of the derailleur. In addition, both the radial and the axial position of the rear derailleur depend on the manufacturing quality and the current condition of the derailleur hanger as well as the rear frame.

In other words, any inaccuracy of both the rear frame and the derailleur hanger, or the rear frame derailleur eye, significantly affects the positioning and alignment of the rear derailleur relative to the sprocket cassette.

In addition, derailleur hangers, especially as separate components, are susceptible to damage and often rather unstable. With the ever-increasing rear cassette sprocket sizes and correspondingly larger derailleur dimensions, increased leverage forces occur, which can only be insufficiently absorbed by a replaceable, single-sided derailleur hanger.

Also, the structural stability of most derailleur hangers or derailleur rear frame eyes is no longer able to withstand the demands of today's riding conditions. Even the chain pull that occurs during normal operation can lead to elastic deformation of a derailleur hanger of a magnitude that impairs the positioning accuracy of the rear derailleur relative to the sprockets. Even minor falls or simple overturning of the bicycle often result in plastic deformation of the derailleur hanger, or the rear frame eye formed on the left-hand side rear frame dropout.

Also, the derailleur hanger is an additional component that is individually developed by the frame manufacturer. Often, different hangers are even used by the same manufacturer for the same bicycle frame in order to be able to optimize it for the respective application. This means additional cost and development effort and creates ambiguity in the market as well as with the end user.

These disadvantages of conventional rear derailleur assembly have been known at least since the introduction of replaceable derailleur hangers. However, the problem described above is currently being exacerbated by the trend towards larger cassettes with an ever-increasing number of gears. On the one hand, this results in higher leverage forces on the derailleur hanger due to correspondingly larger sprocket and derailleur dimensions.

An additional factor is the increased stress peaks in the drive train due to chain cage dampers of modern rear derailleurs. The overall longer lever ratios with today's derailleurs thus have an additional negative effect on the positioning accuracy of the derailleur relative to the sprocket cassette. Conversely, the increasing number of gears actually requires increasing the positioning accuracy.

A development that increasingly affects the bicycle market is the general need for a reduction in the consumption of resources in manufacture and usage of technical products. This resource consumption reduction is increasingly being demanded by consumers as well as society and legislators. Social and legislative developments are thus pointing away from a throwaway mentality often encountered in the past and placing increasing demands on the service life and reparability of technical products.

Reference is made in this regard to the German patent application published as DE102018001253A1, to the European patent application published as EP3388324A2, to the Taiwanese patent application published as TW201834921A, to the Chinese patent CN108622302B, and to the U.S. Pat. No. 10,870,464B2, all of which are attributable to the applicant.

From these publications or patents, a rear derailleur is known for coaxial mounting with respect to a rear wheel axis on a bicycle frame.

SUMMARY

In an embodiment, a rear derailleur for coaxial mounting with respect to a rear wheel axis to a frame dropout of a rear frame is provided. The rear derailleur includes a rigid base element. The rigid base element includes an inner mounting arm having an inner pivot joint for inboard arrangement in the region of the frame dropout and an outer mounting arm having an outer pivot joint coaxially aligned with the inner pivot joint for outboard arrangement in the region of the frame dropout. The base element is connectable to the rear frame so as to be pivotable coaxially about the rear wheel axis by the inner pivot joint and outer pivot joint. The rear derailleur also has a shifting element for changing gears. The shifting element includes a swivel formation pivotably connecting the base element and the shifting element so that the shifting element is translatory pivotably movable relative to the base element pivotably. The rear derailleur also has a chain guide device rotatably and pivotably connected to the shifting element. The chain guide includes an upper chain guide pulley and a lower chain tensioning pulley. The rear derailleur is configured as a hierarchical modular construction system with at least two hierarchical levels.

BRIEF DESCRIPTION OF THE DRAWINGS

In the following, embodiments of the present disclosure are described by way of example with reference to the figures.

DETAILED DESCRIPTION

Figure 1:
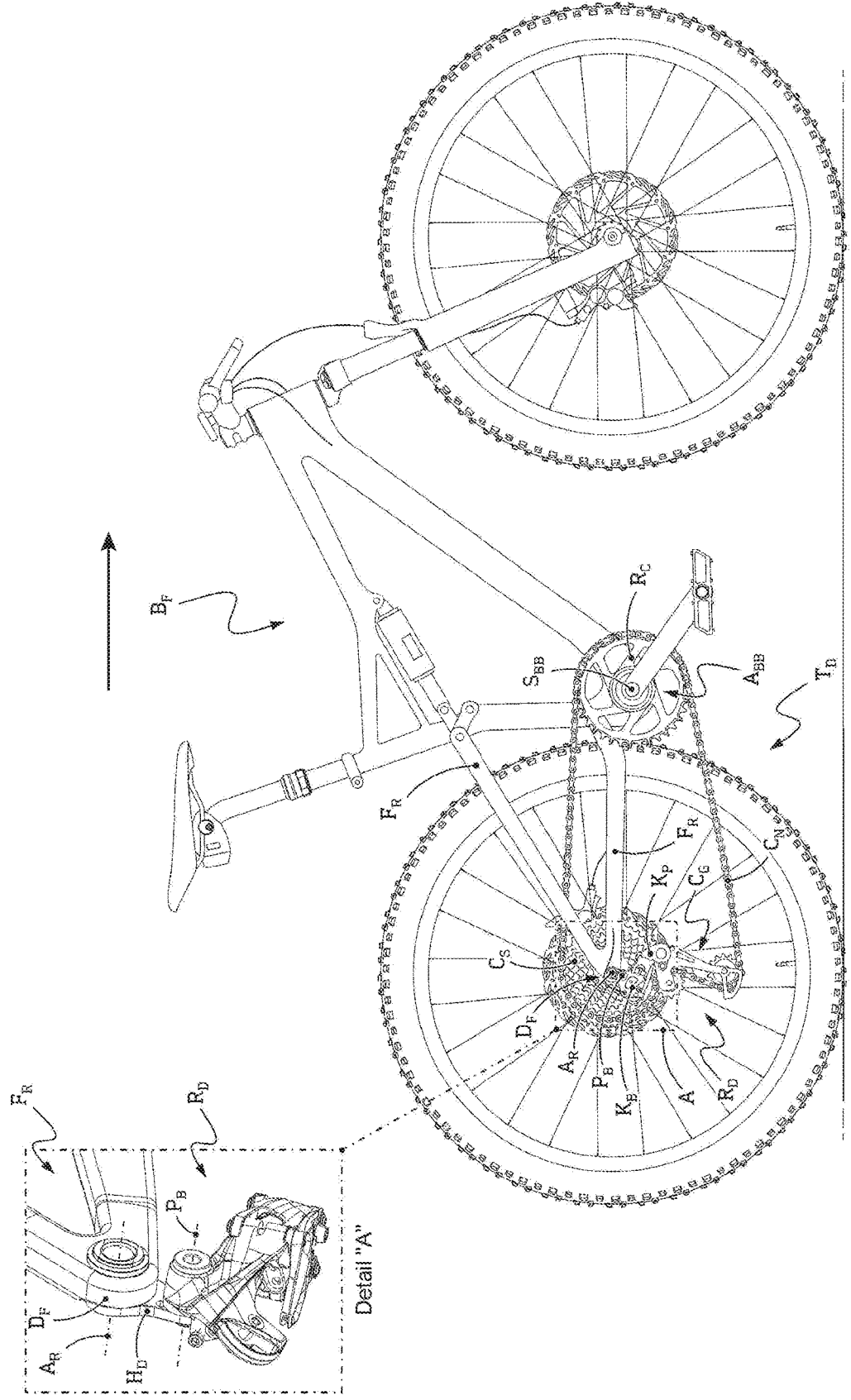
FIG. 1: shows a bicycle with a bicycle derailleur according to prior art in a side view.

Unless explicitly stated otherwise, locational and directional terms used in the present disclosure, such as "left", "right", "front", "rear", "up", "down", etc., relate to the perspective of a rider riding a bicycle. The same applies to locational and directional indications common in the industry such as "inboard" (left or to the left or in the direction of a larger sprocket of a sprocket cassette) and "outboard" (right or to the right or in the direction of a smaller sprocket of a sprocket cassette), which refer to shifting operations, or directions, or sprocket positions, on a sprocket cassette of a bicycle rear wheel.

What is disclosed is a bicycle rear derailleur.

In addition to the coaxial mounting derailleur paradigm described above and as compared with hanger-mounted rear derailleurs, the present disclosure also provides the industry, trade, and end-user with options for manufacturing, providing, repairing and replacing defective or worn individual parts. This can, in part, help to contribute to reducing the consumption of natural resources.

In view the conventional mounting of the rear derailleur on the frame, a rear bicycle derailleur is disclosed. The derailleur is mounted directly, without a derailleur hanger or a rear frame eye, in relation to the rear wheel axle, particularly directly coaxially with the rear wheel axis, on a suitably designed bicycle frame.

For connecting to this bicycle rear derailleur, a suitable bicycle frame has a special interface which, with the participation of an adapter bolt device of the rear derailleur, also serves as an interface for the connection between the frame and the rear axle assembly.

Particularly, the base element or B-knuckle of the rear derailleur is no longer referenced relative to the sprocket set via the lengthy dimensional chain over the derailleur hanger as described above, which can be problematic in terms of the adding-up of tolerances from the sprocket set via the rear axle to the frame and from there via the derailleur hanger to the rear derailleur position. Instead, the dimensional referencing between the rear derailleur and the sprocket set, both axially and radially in relation to the rear axle or the sprocket set, is conducted by means of direct contact between the B-knuckle of the rear derailleur and the hub end cap end face of the rear hub.

This results in high positioning accuracy directly between the rear derailleur and an axial end face of the rear wheel hub, and thus also between the derailleur and the sprocket cassette, the cassette usually being exactly referenced with respect to the rear wheel hub right hand side dimensions. Compared to mounting the rear derailleur on a derailleur hanger or rear frame dropout eye, positioning tolerances of the rear derailleur relative to the sprocket cassette can be achieved that are orders of magnitude smaller, with at the same time high repeatability.

This results in a simplified and standardized interface between the rear derailleur and the bicycle frame across all manufacturers. The need for a derailleur hanger and the associated tolerances and uncertainties, as well as all other disadvantages described above, are eliminated.

The rear derailleur according to the present disclosure comprises a B-knuckle or base element, a shifting parallelogram or swivel formation, a movable P-knuckle or shifting element and a chain cage or chain guiding device.

The swivel formation connects the shifting element to the base element so that it can swivel in translation. The chain guide assembly is rotationally pivotably connected to the shifting element about a pivot axis. The base element includes a first connection end for coaxial mounting to the bicycle frame with respect to the rear wheel axis, and a second connection end for coupling to the swivel formation.

The first connection end of the base element has a first arm and a second arm which are arranged at a distance from one another in the axial direction, with respect to the rear wheel axis, and are set up for mounting the rear derailleur on an associated mounting section or frame dropout of a rear end of a bicycle frame.

In accordance with the genus, the bicycle rear derailleur comprises an inherently rigid base element (inherently rigid in the sense of not containing several assemblies that are articulately hinged to each other) with an inner mounting arm having an inner pivot joint for arrangement on the inboard side at the right hand side rear frame dropout, and with an outer mounting arm having an outer pivot joint coaxial with the inner pivot joint for arrangement on the outboard side at the rear frame dropout.

With the inherently rigid base element according to the genus, the rear derailleur according to the present disclosure differs from conventional rear derailleurs described at the outset, in particular in case, for comparative purpose, the frame dropout or derailleur hanger should be attributed to the base element of a conventional rear derailleur. In this case, the base element of a conventional, non-coaxially mounted rear derailleur cannot be regarded as inherently rigid but can be broken down into two assemblies that are articulately hinged to each other by means of the B-axis of the base element (cf. prior art according to FIG. 1 with hanger $H_D$ and B-axis $P_B$).

The base element is configured to be connected to the rear frame by means of the pivot joints of the mounting arms so as to be pivotable coaxially about the rear wheel axis.

The rear derailleur according to the present disclosure further comprises a shifting element which, for the purpose of changing gears, is pivotably movable relative to the base element by means of a swivel formation which translationally pivotably connects the base element and the shifting element.

The rear derailleur according to the present disclosure further comprises a chain guiding device that is rotationally pivotably connected to the shifting element and comprises an upper chain guide pulley and a lower chain tensioning pulley.

The rear derailleur according to the present disclosure is characterized by being designed and configured in the form of a hierarchical two-level modular system. For this purpose, the derailleur includes at least several (e.g., at least two) of the modules "base element module", "swivel formation module", "shifting element module" and "chain guiding device module" or "chain guide module". Of the at least several of these modules at least one module is configured to be interchangeable as a unit that can be handled as a single piece. Further, at least one of the modules includes at least one sub-assembly that is configured to be interchangeable as a unit that can be handled as a single piece.

For the purposes of the present disclosure, "one-piece replaceable" or "one-piece handleable" means that a module or sub-assembly can be removed and then handled in one contiguous piece in the removed state.

A module or sub-assembly that disintegrates into several individual parts during or after removal, which thus can no longer be handled in one contiguous piece, thus would not be "replaceable in one piece" or "handleable in one piece" in the sense of the present disclosure.

Modules or sub-assemblies which are connected or connectable to adjacent modules or sub-assemblies by means of additional fastening elements such as screws, pins, rivets etc. can also be considered to be interchangeable or manageable in one piece within the context of the present disclosure. In this case, such additional fastening elements are not to be regarded as components or parts of the respective one-piece handleable module or assembly.

In an embodiment, at least one one-piece interchangeable sub-assembly consists of a plurality of at least three interconnected individual parts. For the purpose of the present disclosure, connecting elements such as screws, pins, rivets, etc., that are used to connect the individual parts of a sub-assembly to one another are not counted as individual parts of the sub-assembly.

The at least two-level hierarchical modular design of the rear derailleur, comprising hierarchically superordinate modules and hierarchically subordinate sub-assemblies within the modules, allows for easy disassembly, repair and/or conversion/upgrade of the derailleur, due to the at least one module and sub-assembly (or several or all modules and sub-assemblies contained in the modules) being configured as to be exchangeable and handleable in one piece.

This way, it is not necessary anymore to replace the entire rear derailleur, for example in the event of damage, or in order to upgrade the technology of the rear derailleur. Nor is it necessary to completely disassemble the entire rear derailleur or at least parts of the rear derailleur in order to replace modules or sub-assemblies. Rather, due to the hierarchical modular construction system whereby modules and sub-assemblies are configured to be exchanged and handled as a single piece, only the affected module or sub-assembly has to be detached from, or reconnected to, the adjacent modules or sub-assemblies of the derailleur.

In another embodiment the modular construction system is configured for the usage of at least one sub-assembly family within at least one of the aforementioned modules, the at least one sub-assembly family comprising at least two sub-assembly family members in the form of interchangeable sub-assemblies. For this purpose, connection interfaces of the sub-assembly family members for detachable connection with adjacent sub-assemblies of the at least one module (as well as, additionally or alternatively, if present at the respective sub-assembly, connection interfaces to adjacent modules) within the at least one sub-assembly family (in case of several sub-assembly families for a specific module for each sub-assembly family) are configured uniformly across all family members of the at least one sub-assembly family.

This way, a family member of the at least one sub-assembly family of the at least one module can be exchanged for another family member of the same sub-assembly family.

The exchanged family member can, for example, consist of varied materials, be of different design, comprise different functionalities or be of a different surface quality, while at the same time retaining all other sub-assemblies of the at least one module.

This exchange of a family member for another family member of the same sub-assembly family can, for example, already be provided for by the manufacturer during production planning, which makes it comparatively easy to plan, provide for and produce a variety of different embodiments or quality levels of the rear derailleur.

Due to the provision of standardized connection interfaces across all family members, this exchange can also be conducted by the bicycle trade, by specialist workshops and even by the end user at any time with little effort. This way, the derailleur according to the present disclosure can meet the increasing demands on the part of society and legislators for improvements to the reparability of technical goods and for reducing the consumption of natural resources significantly better than a derailleur according to prior art.

For example, the base element module can comprise at least one base element sub-assembly that is configured to be a member of a base element sub-assembly family. This means that the connection interfaces of the base element sub-assembly follow a uniformly defined standard for the base element sub-assembly family to which the at least one base element sub-assembly is assigned. This makes it possible for the base element sub-assembly to be easily separated from the rear derailleur or from the base element, for example, in order to be replaced by a base element sub-assembly from the same sub-assembly family, or in order to repair the base element sub-assembly in the event of damage.

In another embodiment, the modules or sub-assemblies of the rear derailleur are configured to be replaceable without tools, or with standard household tools, and thus easily also by an end user, for example. This also enables the customer or end user to repair their bicycle derailleur with little effort, or to renew worn parts, thus increasing the useful lifespan of the derailleur. Furthermore, it is possible to replace sub-assemblies or modules of the rear derailleur with corresponding sub-assemblies or modules of higher quality or with additional features, for example, in order to obtain a higher-quality product at low to moderate cost, without having to purchase a completely new rear derailleur and to dispose of the old derailleur.

Using the base element module as an example, at least one sub-assembly of the base element module may be in the form of an interchangeable inner or outer mounting arm. This arm can be designed as a member of a base element sub-assembly family, for example as a member of a base element sub-assembly family named "Inner mounting arm sub-assembly family" or as a member of a base element sub-assembly family named "Outer mounting arm sub-assembly family". With this sub assembly family membership, the mounting arm has connection interfaces for detachable connection to adjacent base element module sub-assemblies (as well as to adjacent modules, if applicable) that are uniformly designed within the respective sub-assembly family. This way, a modular base element or B-axis is obtained whose subassemblies are easily removable, replaceable, repairable or upgradable.

In another embodiment, at least one mounting arm of the base element module, is formed as a pressed or stamped part formed from a substantially flat blank. This is in comparison with the prior art, in which the B knuckle or base element frequently consists of a one-piece component that is geometrically complex and costly to produce, for example cast and/or milled from a single piece.

In another embodiment, at least one mounting arm of the base element module is essentially formed from a fiber composite material. By forming one or both mounting arms of the base element or B-knuckle from a fiber composite material (e.g., glass fiber-reinforced or carbon fiber-reinforced resin or thermoplastic material) a high-strength and lightweight base element is obtained.

Due to the modularity of the base element, it is also possible to produce series for different price points, for different target groups, or for different target markets by selecting materials with different densities and strengths or different manufacturing methods, or surface qualities for the individual sub-assemblies of the at least one sub-assembly family of the base element module.

In another embodiment, at least one sub-assembly of the base element module is designed as an exchangeable cover element. The exchangeable cover element protects at least areas of the base element module (or in an embodiment a member of a base element sub-assembly family) with correspondingly uniformly designed connection interfaces for detachable connection to adjacent sub-assemblies of the base element module. In an embodiments the exchangeable cover element is plastic.

A modular cover element can be easily replaced by the end user. Reasons for replacing the cover element include, but are not limited to, cosmetic reasons due to scratches that frequently occur during operation of a bicycle derailleur due to its exposed position on the bicycle. The user thus has the option returning a rear derailleur to an almost-new appearance without having to replace the entire derailleur. This is desirable in terms of cost and resource consumption.

Another embodiment of the rear derailleur according to the present disclosure provides that the swivel formation module comprises two swivel arms in the manner of a shifting parallelogram for a translationally swiveling connection of the base element module and the shifting element module. Thereby, at least one of the swivel arms has at least one interchangeable swivel arm sub-assembly, which can be formed as a member of a swivel arm sub-assembly family.

In another embodiment, at least one replaceable swivel arm sub-assembly is a cover element protecting at least areas of the swivel formation module. In an embodiment, the cover element is plastic. Similar to the above with regard to the modularly replaceable covering element on the base element, a replaceable covering element protecting the shifting parallelogram not only protects the shifting parallelogram, but in particular makes it easy to repair the shifting parallelogram of the derailleur at low cost and with low resource consumption.

With regard to a further embodiment of the bicycle derailleur, it is provided that at least one swivel arm of the swivel formation module that connects the base element module and the shifting element module can be connected or is connected in a pivotable manner to the base element module and to the shifting element module by means of two link pins. Particularly, the cover element forms a locking element for the two link pins of the at least one swivel arm of the swivel formation module in such a way that the two link pins can be removed from the at least one swivel arm without tools when the cover element is removed.

In other words, this means that, for example, the outer parallelogram arm, which is frequently damaged or at least scratched during operation of a rear derailleur, being a one-piece sub-assembly according to the present disclosure, can be removed from the rear derailleur parallelogram, and can be repaired or replaced, without having to disassemble either the parallelogram module or the entire outer parallelogram arm, nor having to laboriously dismantle the link pins, as is usually the case with prior art rear derailleurs.

Rather, by simply removing the cover element (and in an embodiment without needing any special tools) the parallelogram pins basically fall out of the parallelogram module by gravity, and the parallelogram arm sub-assembly can be easily removed in one piece.

This contributes to the modular design and easy reparability of the rear derailleur according to the present disclosure, and thus makes it possible to implement the reduction in resource consumption requested by the consumer or required by legislative.

In another embodiment, at least one of the two parallelogram arms or swivel arms of the swivel formation module comprises at least two swivel arm sub-assemblies, of which at least one swivel arm sub-assembly is interchangeable and, in an embodiment, formed as a member of a swivel arm sub-assembly family. This embodiment enables the manufacturer to offer one or both sub-assemblies that make up the at least one parallelogram arm according to this embodiment, for example, in several variants to the consumer in order to be able to upgrade or redesign the appearance of their rear derailleur.

According to another embodiment of the rear derailleur, the shifting element module or the chain guiding device module comprises a spring/damper sub-assembly for springing and/or damping the pivoting movement of the chain guiding device module relative to the shifting element module. Particularly, the spring/damper sub-assembly is configured as a spring/damper unit that can be handled or replaced in one single piece, and that in an embodiment is a member of a shifting element or chain guiding device sub-assembly family, for example a shifting element of chain guiding device sub-assembly family containing various spring/damper sub-assemblies with various functions, various qualities or various target price points.

In this way, the rear derailleur spring/damper sub-assembly can be easily removed as a one-piece unit, repaired if necessary, or replaced with a different spring/damper sub-assembly, thus allowing the rear derailleur to be upgraded accordingly without the need to replace the entire derailleur.

In one embodiment, the spring/damper sub-assembly and a receptive housing of the shifting element module serving to receive the spring/damper sub-assembly are detachably connected to one another by means of an at least two-start thread pairing arranged on the spring/damper sub-assembly and on the receptive housing. Thereby and particularly, different screw threads of the multi-start thread pairing are axially and/or circumferentially unevenly spaced from each other with respect to the pivot axis of the chain guiding device, in such a way that the multi-start thread pairing is screwable into each other in only one rotational relative position.

This is advantageous because the spring/damper sub-assembly can thus be screwed into the receptive housing of the shifting element module in only one, namely the correct rotational relative position, although a multi-start thread usually has a number of different rotational screw-in start positions that corresponds to the number of threads.

In another embodiment, the chain guiding device module of the rear derailleur comprises at least one replaceable chain guiding device sub-assembly, which in an embodiments is configured as a member of a chain guiding device sub-assembly family, i.e., in particular is provided with connection interfaces that are uniform within the sub-assembly family for detachable connection to adjacent sub-assemblies, or modules, if applicable.

In another embodiment, the at least one replaceable sub-assembly of the chain guiding device module is a chain cage guide plate device, a chain guiding pulley, or a chain tensioning pulley.

This embodiment is also in the service of simple reparability and the reduction of resource consumption. In addition, different variants of the bicycle derailleur can again be provided for different price points, applications or target markets with relatively little effort. For example, one or both of the guide plates of the chain cage device can be provided and made from different materials, such as aluminum or carbon fiber, or chain guide rollers can be provided with different performance characteristics or features.

According to a further embodiment of the bicycle derailleur, it is provided that the bicycle derailleur is an electrically operated bicycle derailleur and comprises an electric module, wherein the electric module has at least one replaceable electric sub-assembly, which in an embodiment is formed as a member of an electric sub-assembly family. In an embodiment the at least one replaceable electric sub-assembly is an electric motor-gearbox sub-assembly or a battery unit.

The possibility of modular replacement, in particular of the electric motor-gear assembly in a bicycle derailleur, is again of service to the paradigm of simple reparability or interchangeability with low resource consumption. This makes sense, since the motor-gearbox sub-assembly of an electric bicycle circuit is a particularly complex and thus cost-intensive assembly.

Likewise, due to this embodiment of the derailleur according to the present disclosure, motor-gearbox sub-assemblies with different performance characteristics can be provided by the manufacturer, which either allows rear derailleurs for different target applications to be presented with little to manageable development effort, or allows the customer to upgrade their rear derailleur by installing, for example, a higher-quality motor-gearbox sub-assembly at a justifiable cost.

The present disclosure further relates to a motor-gearbox sub-assembly for a modular electric bicycle derailleur as described above, or generally for electrically operated bicycle derailleurs.

The motor-gearbox sub-assembly is characterized by the fact that a housing of the motor-gearbox sub-assembly can be connected to the base element module or B-knuckle with respect to its six spatial degrees of freedom of movement by means of exactly one rotational axis connection and exactly two translational stop connections. This design provides for easy positioning and assembly of the motor-gearbox sub-assembly in the base element of the rear derailleur. Further, the motor-gearbox sub-assembly this way is fixed in the base element without a possibility of under- or overdetermination of the positioning of the motor-gearbox sub-assembly in the base element in terms of dimensions or tolerances, since this embodiment fixes the motor-gearbox sub-assembly relative to the base element using no less than and no more than the exact six degrees of freedom that are required for any spatial fixation.

Further, the present disclosure relates to a motor-gearbox sub-assembly for a modular electric bicycle derailleur as described above, or generally for electrically operated bicycle derailleurs.

The motor-gearbox sub-assembly is characterized in that a housing of the motor-gearbox sub-assembly comprises at least two housing parts, for example housing halves. During the assembly or joining of the housing parts or housing halves, an electric motor of the motor-gearbox unit is fixed in the housing in a form-locking, play-free manner with respect to all six degrees of freedom of movement by means of a plug-in adapter, wherein the housing parts are configured to be spring-loading the plug-in adapter by this joining and the plug-in adapter remaining spring-loaded after the housing parts or housing halves have been joined.

The spring loading of the plug-in adapter, which is effected when the housing parts or housing halves are joined, can be effected by a separate spring, for example by a flexion spring. Alternatively, the resilient loading can also be effected by elastically yielding areas formed for example integrally with a housing half or with the plug-in adapter.

This way, the electric motor can be pre-assembled together with the plug-in adapter, whereby the final assembly of the electric motor requires no further steps other than the joining of the housing parts or housing halves with the unit of electric motor and plug-in adapter contained therein. This not only simplifies assembly and thus makes it less laborious and expensive, but also improves the reparability of the motor-gearbox sub-assembly. By comparison, in the prior art, corresponding adapters or brackets for motor mounting are often embedded inseparably in a housing component of the motor-gearbox sub-assembly, for example by overmolding, which makes both assembly and disassembly of the electric motor more difficult.

FIG. 1 shows a mountain bike with a prior art rear derailleur $R_D$. The mountain bike has a frame $B_F$ with a suspended rear frame $F_R$. The drive train $T_D$ of the mountain bike comprises a bottom bracket assembly $A_{BB}$ with a bottom bracket shaft $S_{BB}$, a chainring $R_C$, a rear bicycle derailleur $R_D$, a sprocket cassette $C_S$ with multiple sprockets and a drive chain $C_N$.

The bicycle rear derailleur $R_D$ is connected to the rear frame $F_R$ in the area of the right dropout or right frame eye $D_F$ in a conventional manner. This means in particular that the base element of the rear derailleur $R_D$ is connected to the right frame dropout $D_F$ by means of a derailleur hanger $H_D$ (cf. enlarged detailed illustration "A" in FIG. 1), which entails the disadvantages described in the introduction to the description, including in particular the low stability of the connection between the bicycle rear derailleur $R_D$ and the rear frame $F_R$, and a poor shifting precision of the rear derailleur $R_D$ due to this low stability and due to long and hardly controllable tolerance chains between the rear derailleur $R_D$ and the sprocket cassette $C_S$ running over the rear frame $F_R$ and over the derailleur hanger $H_D$.

Figure 2:
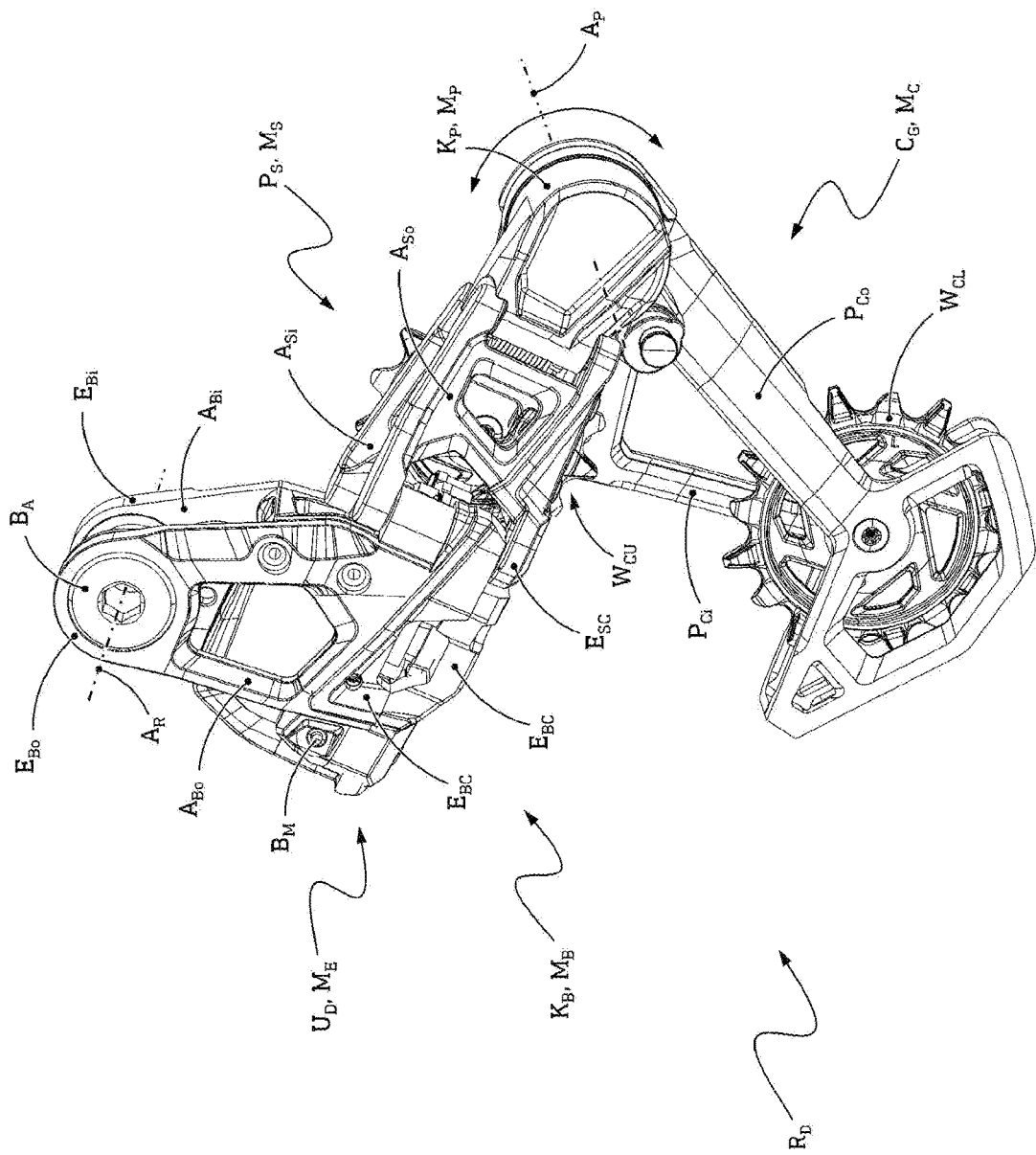
FIG. 2: shows an embodiment of a bicycle derailleur according to the present disclosure in an oblique side view.

FIG. 2 shows an embodiment of a bicycle derailleur $R_D$ according to the present disclosure in an oblique side view, enlarged with respect to FIG. 1. First of all, the general essential components of a bicycle derailleur $R_D$ for a derailleur-based drivetrain can be seen, namely a base element $K_B$, also known in the industry as B-knuckle, which serves to fasten the bicycle derailleur $R_D$ to the right frame dropout $D_F$ of the rear frame $F_R$, furthermore a shifting element $K_P$, also known in the industry as P-knuckle, which, for the purpose of gear selection, is connected in a translationally pivotable manner to the base element $K_B$ via an pivoting arrangement $P_S$ also known as a shifting parallelogram $P_S$, and furthermore a chain guiding device $C_G$ also known as a chain cage or chain cage arrangement with an upper chain guide pulley $W_{CU}$ and with a lower chain tensioning pulley $W_{CL}$.

Figure 31:
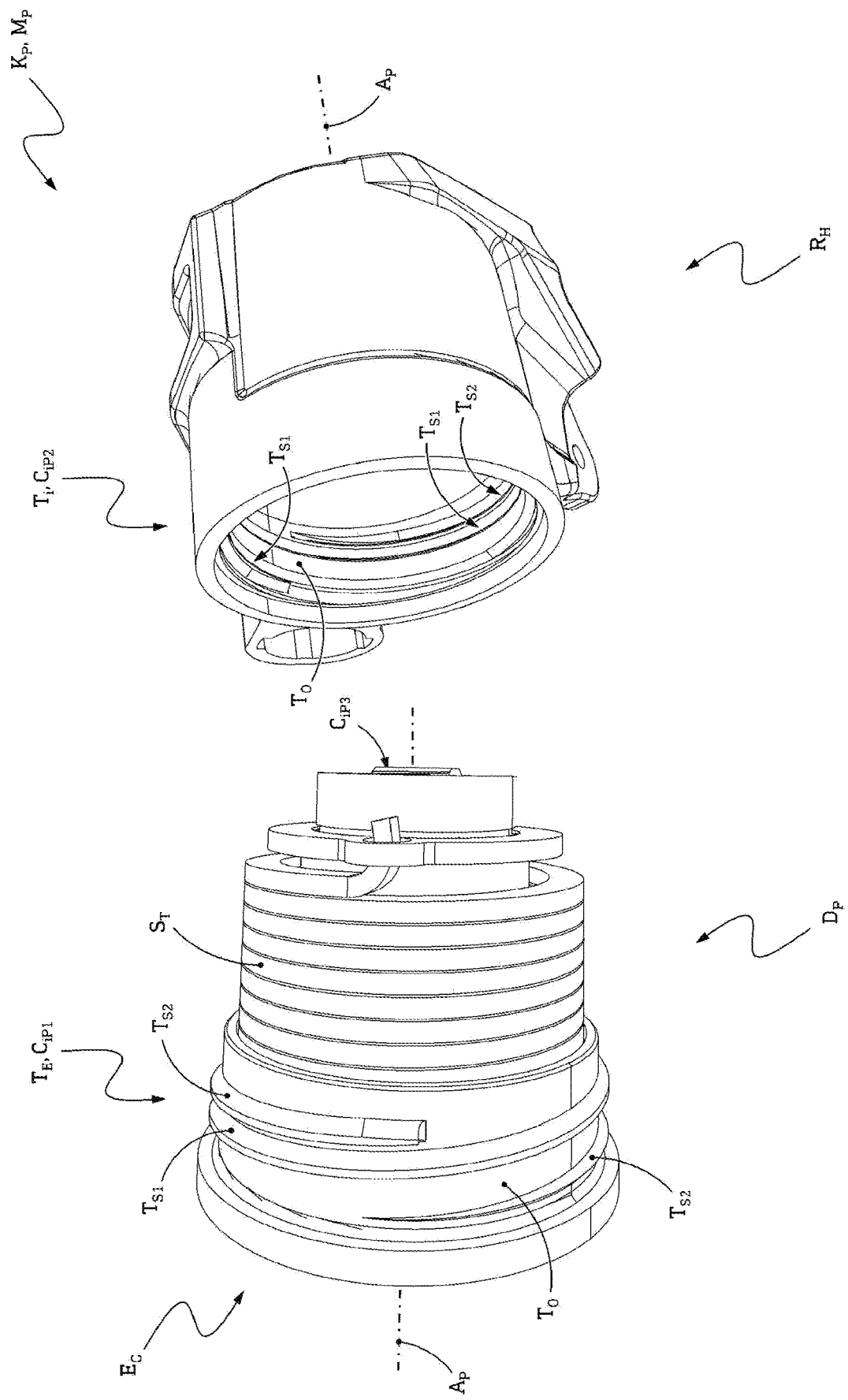
FIG. 31: shows a shifting element or P-knuckle of a rear derailleur according to FIG. 2 or 26 with spring/damper device screwed out of the receptive housing of the shifting element.

The chain guiding device $C_G$ comprises inner and outer chain cage guide plate devices $P_{Ci}$, $P_{Co}$ and is pivotable about a chain cage pivot axis $A_P$ relative to the shifting element $K_P$, and is under a spring bias acting clockwise about this pivot axis $A_P$, which bias provides for the bias of the idle run of the bicycle chain $C_N$ according to FIG. 1, cf. spring element or cage spring $S_T$ of the spring/damper device $D_P$ according to FIG. 31.

FIG. 2 also shows the outer swivel arm $A_{So}$ and the inner swivel arm $A_{Si}$ of the swivel formation $P_S$, whereby the outer swivel arm $A_{So}$ is provided with a cover element $E_{SC}$ which protects against damage such as scratches and is made of plastic, for example. In this embodiment, further cover elements $E_{BC}$ arranged in the lower region of the base element $K_B$ serve a similar purpose.

The rear derailleur $R_D$ according to FIG. 2 is an electromechanical, in particular wirelessly controllable rear derailleur, and comprises an electric drive unit $U_D$, which will be discussed and shown in more detail further below.

Figure 3:
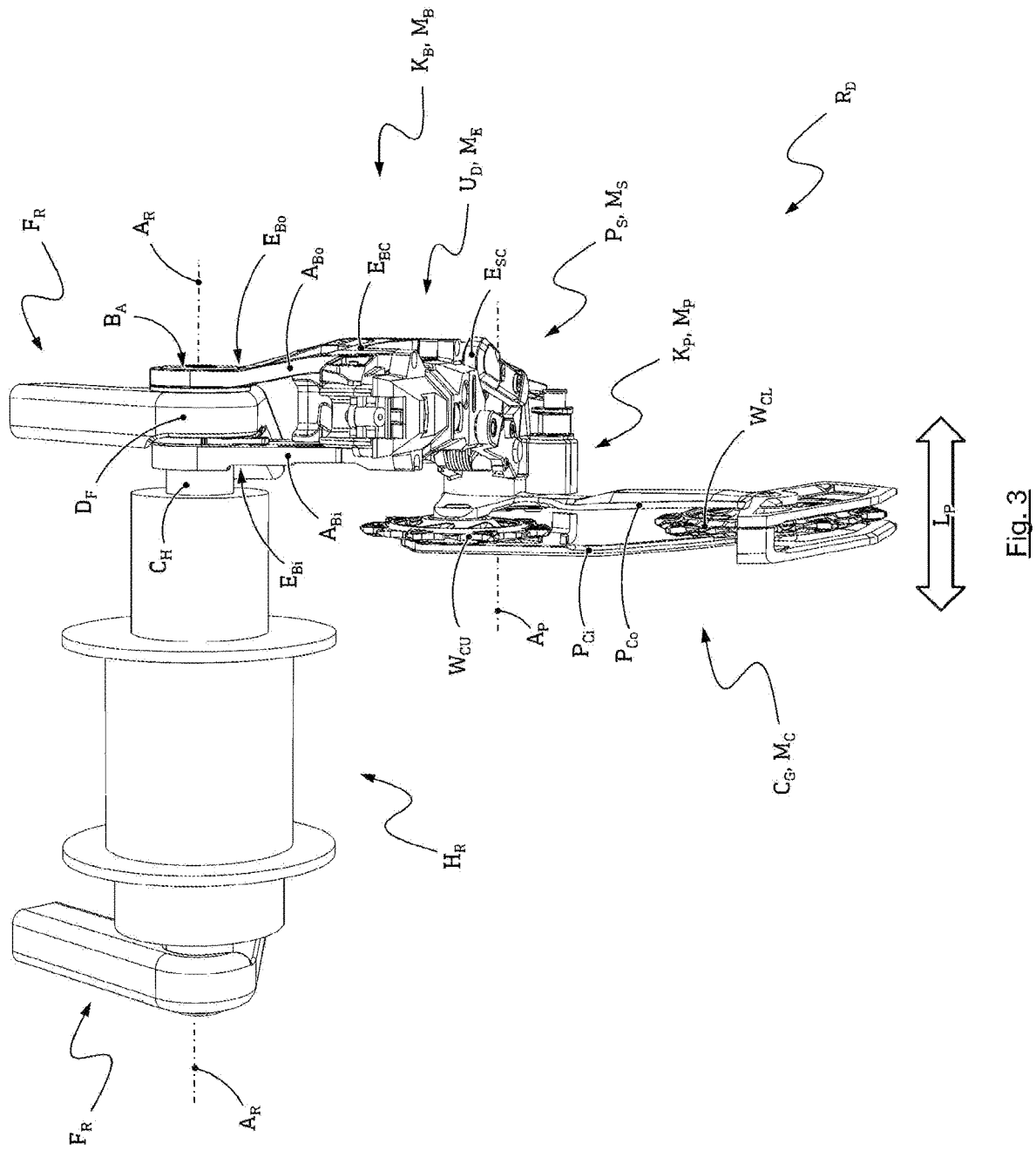
FIG. 3: shows a rear view of the bicycle derailleur according to FIG. 2 in mounted condition on the right-hand side frame dropout of a bicycle rear frame.

The bicycle rear derailleur $R_D$ shown in FIG. 2 is a rear derailleur $R_D$ for coaxial direct mounting in relation to the rear wheel axis $A_R$, which can be seen particularly clearly in FIG. 3. The decisive advantages of rear derailleurs that can be mounted coaxially directly in relation to the rear wheel axis $A_R$, including in particular the massively improved stability of the connection to the rear frame $F_R$ and an order of magnitude improvement in the precision of the positioning of the rear derailleur $R_D$ compared to the sprocket cassette $C_S$, is discussed in detail in the introduction to the description.

As can be seen in FIG. 2 and in particular in FIG. 3, the base element $K_B$ of the bicycle derailleur $R_D$ comprises, for the purpose of rear axle coaxial mounting, an inner mounting arm $A_{Bi}$ with an inner pivot joint, here in the form of a pivot eye $E_{Bi}$ and an outer mounting arm $A_{Bo}$ with an outer pivot joint, here in the form of a pivot eye $E_{Bo}$. The inner mounting arm $A_{Bi}$ is used for inboard positioning in the area of the right frame dropout $D_F$ of the rear frame $F_R$, and the outer mounting arm $A_{Bo}$ is used for outboard positioning in the area of the frame dropout $D_F$. The rear derailleur $R_D$ can be connected to the right frame dropout $D_F$ of the rear frame $F_R$ via the inner pivot eye $E_{Bi}$ of the inner mounting arm $A_{Bi}$ and via the outer pivot eye $E_{Bo}$ of the outer mounting arm $A_{Bo}$ coaxial to the rear wheel axis $A_R$, for which purpose an adapter bolt device $B_A$ is used.

The rear derailleur $R_D$ is mounted on the frame dropout $D_F$ by means of an adapter bolt device $B_A$ in such a way that, in particular after insertion and clamping of the hub axle $A_H$ of the rear hub $H_R$, a defined fixed/loose mounting of the two mounting arms $A_{Bi}$ and $A_{Bo}$ of the base element $K_B$ is achieved. A schematic axial section through frame dropout $D_F$, rear hub $H_R$ and base element $K_B$ of a two-arm coaxially mounted bicycle derailleur $R_D$ according to FIGS. 2 and 3 with such a fixed/loose bearing arrangement is shown in FIG. 4.

Figure 4:
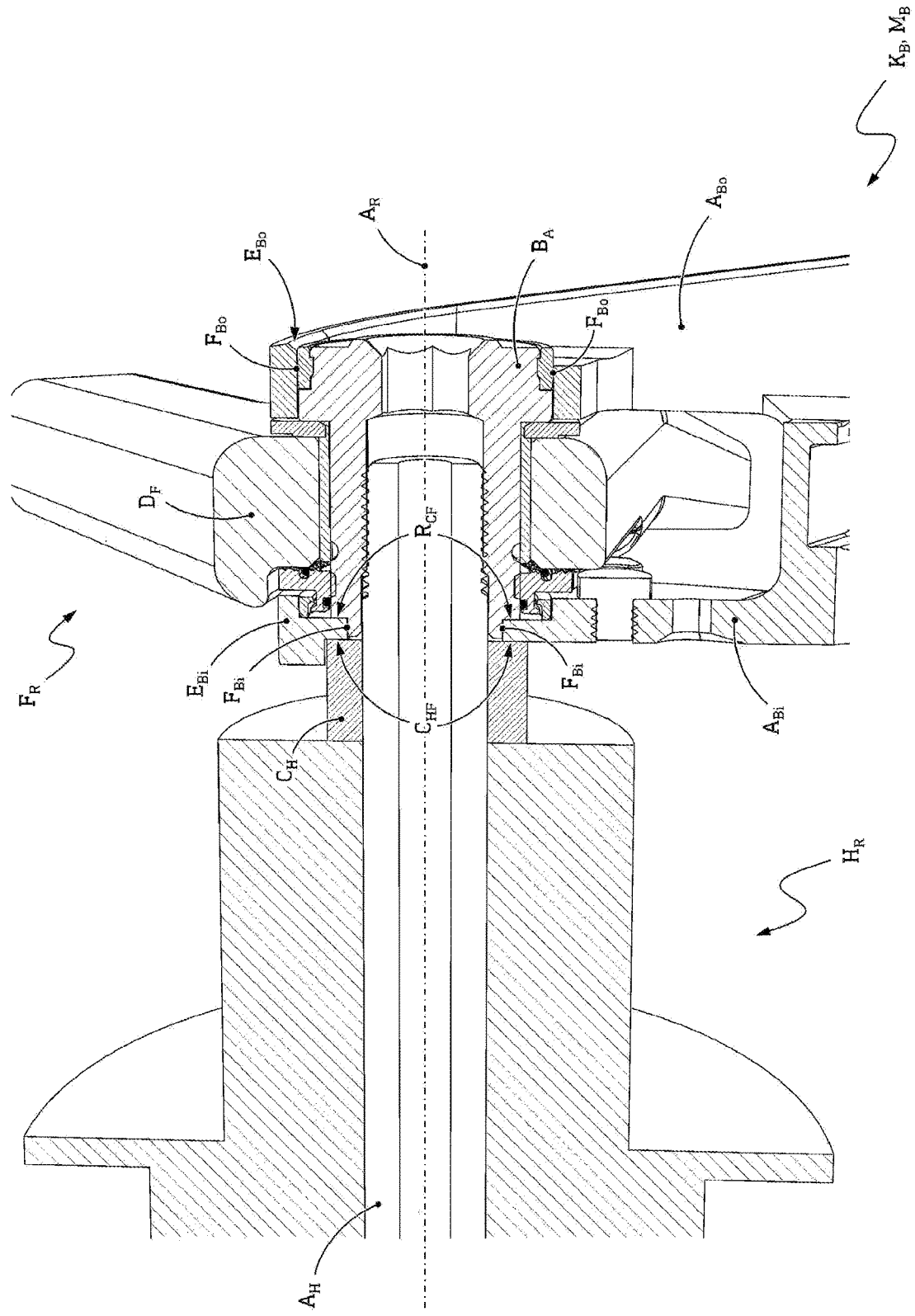
FIG. 4: shows a schematic axial section through frame dropout, rear wheel hub and base element of a bicycle derailleur according to FIGS. 2 and 3.

In the illustration of FIG. 4, the hub axle $A_H$ is screwed into the adapter bolt device $B_A$ and axially clamped to the adapter bolt device $B_A$ via the hub end cap face $C_H$. It can be seen that the two mounting arms $A_{Bi}$ and $A_{Bo}$ of the base element $K_B$ are fixed in the radial direction with practically no play and coaxially to the rear wheel axis $A_R$ by the fact that the pivot eyes $E_{Bi}$ and $E_{Bo}$ of the mounting arms $A_{Bi}$ and $A_{Bo}$ are slidingly mounted on corresponding, here essentially cylindrical bearing faces $F_{Bi}$, $F_{Bo}$ of the adapter bolt device $B_A$.

In particular, FIG. 4 shows how the inboard or left-hand fastening arm $A_{Bi}$ is clamped in the axial direction when the hub axle $A_H$ is tightened, i.e. when the hub end cap $C_H$ is clamped axially between the right-hand end face $C_{HF}$ of the hub end cap shown only schematically here and a circumferential recess $R_{CF}$ of the adapter bolt device $B_A$, and thus assumes the role of the fixed bearing of the base element $K_B$ and thus of the rear derailleur in the axial direction of the rear wheel axis $A_R$, while the outboard or right-hand side mounting arm $A_{Bo}$ is not fixed in the axial direction at $F_{Bo}$ and thus forms the floating bearing of the base element $K_B$ and thus of the rear derailleur with respect to the axial direction of the rear wheel axis $A_R$.

Figure 16:
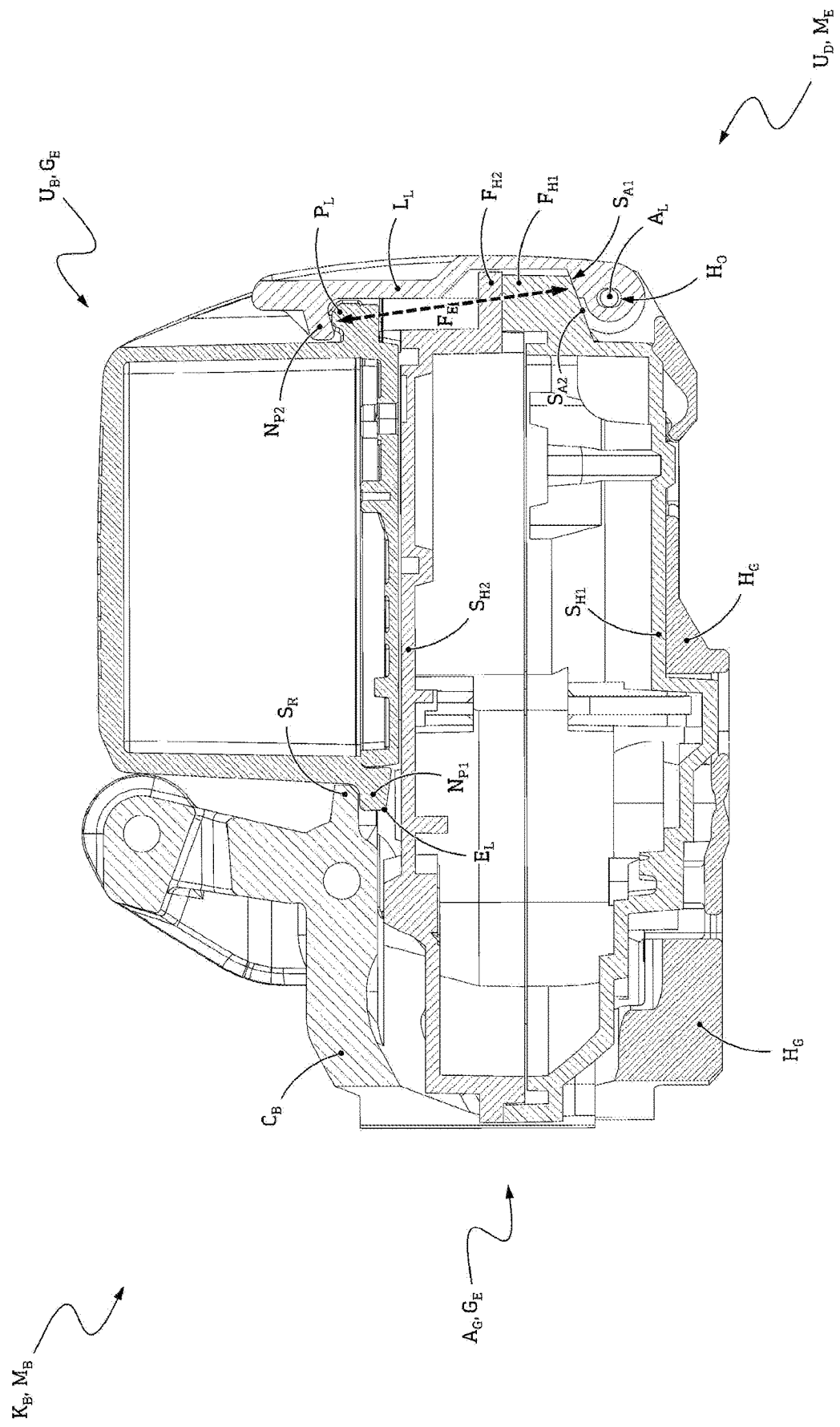
FIG. 16: shows a motor-gearbox sub-assembly according to FIG. 14 or 15 together with a battery device according to FIG. 15 in longitudinal section viewed from inboard.
Figure 34:
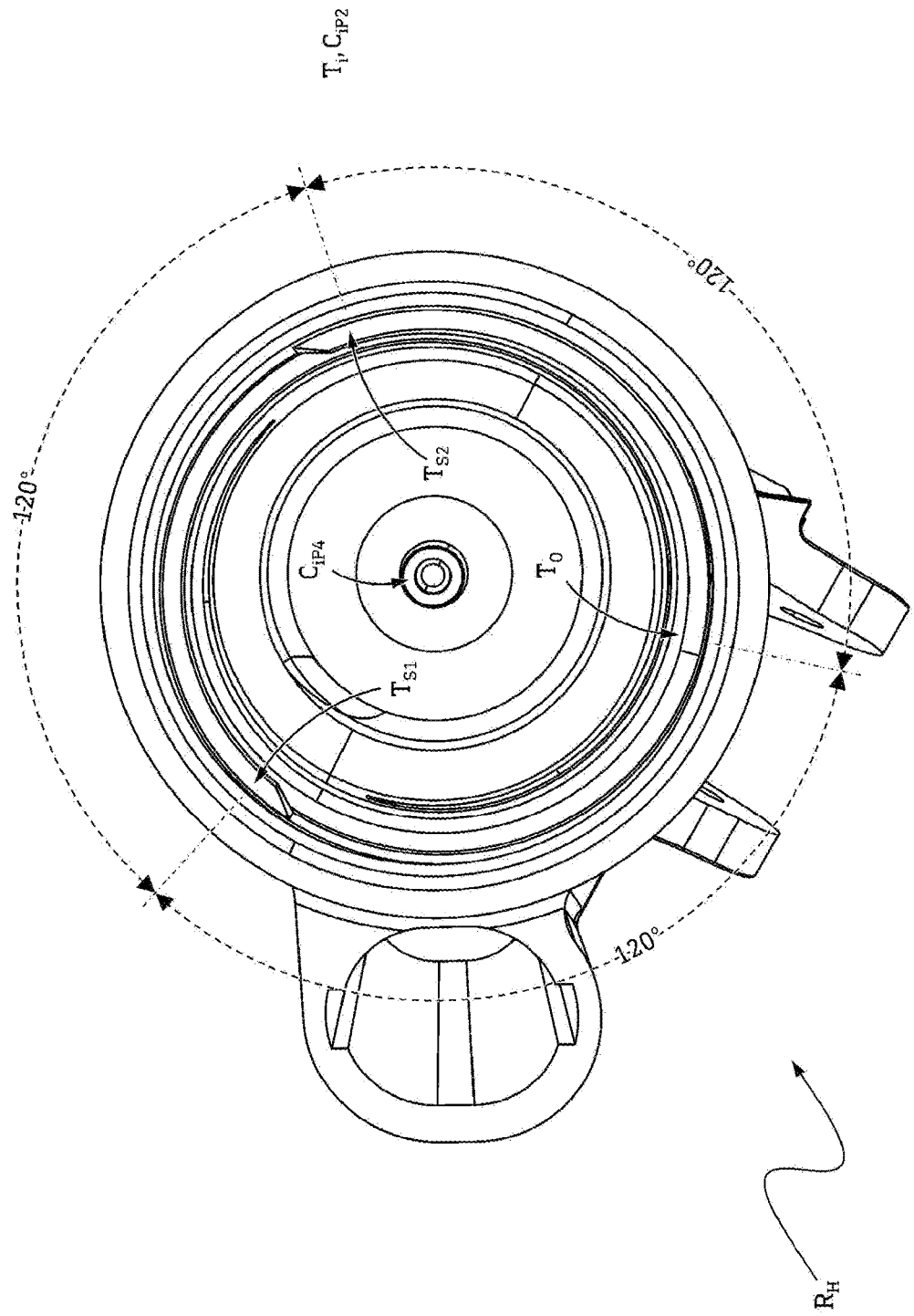
FIG. 34: shows a receptive housing of the shifting element or P-knuckle according to FIG. 31 in perspective view of the receptive thread.

The resulting power flow of such a two-armed, coaxially mountable rear derailleur $R_D$ is shown in more detail in the German patent application DE102020132208.9 in FIG. 34 and the associated description, in the European patent application EP3388324A2 in paragraph [0082] and the associated FIG. 16, and in U.S. Pat. No. 10,870,464 B2 in Col. 19 Para. 2 and FIG. 16.

From this and from FIGS. 2 to 4, it can be seen that this two-arm and two-sided mounting or attachment of the rear derailleur $R_D$ is up to orders of magnitude more stable and more resistant to bending, or can be designed to be so, than the previously common one-sided attachment of bicycle derailleurs by means of a derailleur hanger, see FIG. 1 as well as the detailed description of the disadvantages of the rear derailleur attachment with a derailleur hanger in the introduction to the description.

Furthermore, it can be seen in particular from FIG. 4 that the position of the base element $K_B$ and thus of the rear derailleur $R_D$, is exactly fixed both in the radial direction, relative to the rear wheel axis $A_R$, and in particular also in the axial direction, relative to the hub end cap $C_H$, due to the two-arm fixed/floating bearing $C_{HF}$, $R_{CF}$, $F_{Bi}$, $F_{Bo}$.

However, since the position of the sprocket cassette $C_S$ (not shown in FIG. 4, cf. FIG. 1) is also fixed exactly in the radial direction with respect to the rear wheel axis $A_R$ and usually also in the axial direction with respect to the hub end cap end face $C_H$, this two-arm fixed/floating bearing $C_{HF}$, $R_{CF}$, $F_{Bi}$, $F_{Bo}$ of the bicycle rear derailleur $R_D$ directly in the area of the frame dropout $D_F$ and directly in relation to the rear wheel axis $A_R$ and hub end cap $C_H$ leads to an extremely short tolerance chain between the position and location of the bicycle derailleur $R_D$ and the position and location of the sprocket cassette $C_S$.

Figure 5:
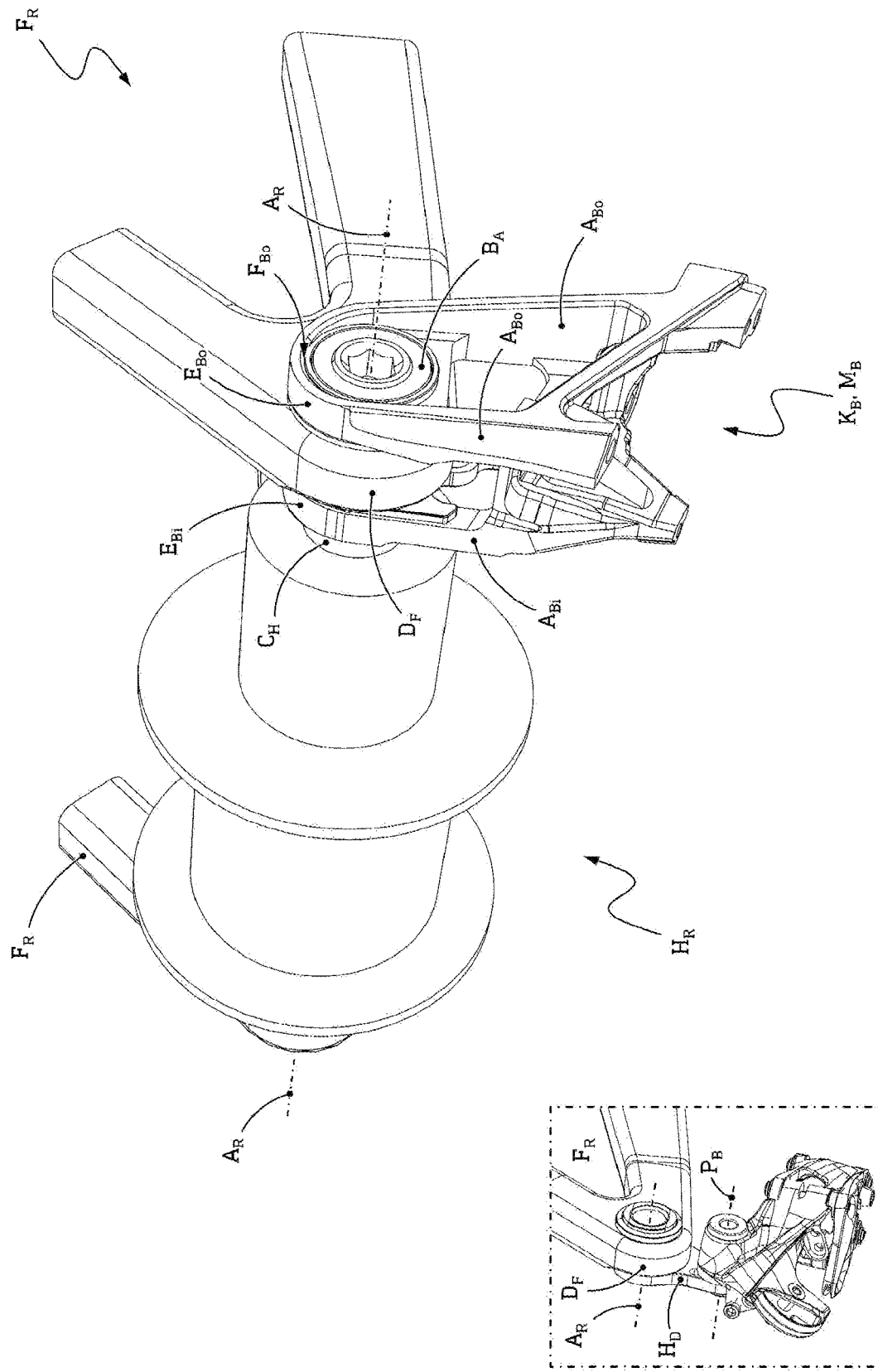
FIG. 5: shows a rear frame and rear hub as well as bicycle derailleur base element of the bicycle derailleur according to FIGS. 2 and 3 in perspective oblique view.

FIG. 5 shows the rear frame $F_R$ and the rear hub $H_R$ as well as the bicycle derailleur base element $K_B$ according to FIGS. 2 to 4 of the bicycle derailleur $R_D$ according to FIGS. 2 and 3 once again in perspective oblique view from outboard.

In comparison to the conventional derailleur hanger (see detail "A" of FIG. 1 with derailleur hanger $H_D$ and the detailed description of the disadvantages of fastening the rear derailleur by means of derailleur hanger $H_D$ in the introduction to the description), it can be seen how the two-armed, particularly rigid fastening of the bicycle rear derailleur $R_D$ as well as the shortened, direct tolerance chain between rear derailleur $R_D$ and sprocket cassette $C_S$, as described above with reference to FIG. 4, contributes to decisive improvements in shifting performance and shifting precision of the bicycle derailleur $R_D$ which is coaxially referenced to the rear wheel axis $A_R$ and connected on both sides of the frame dropout $D_F$.

This improved performance and precision is also maintained permanently because the rigid two-arm attachment $A_{Bi}$, $A_{Bo}$ of the bicycle rear derailleur $R_D$ does not deform even under high load, which is otherwise common with traditional derailleur hangers $H_D$.

Figure 6:
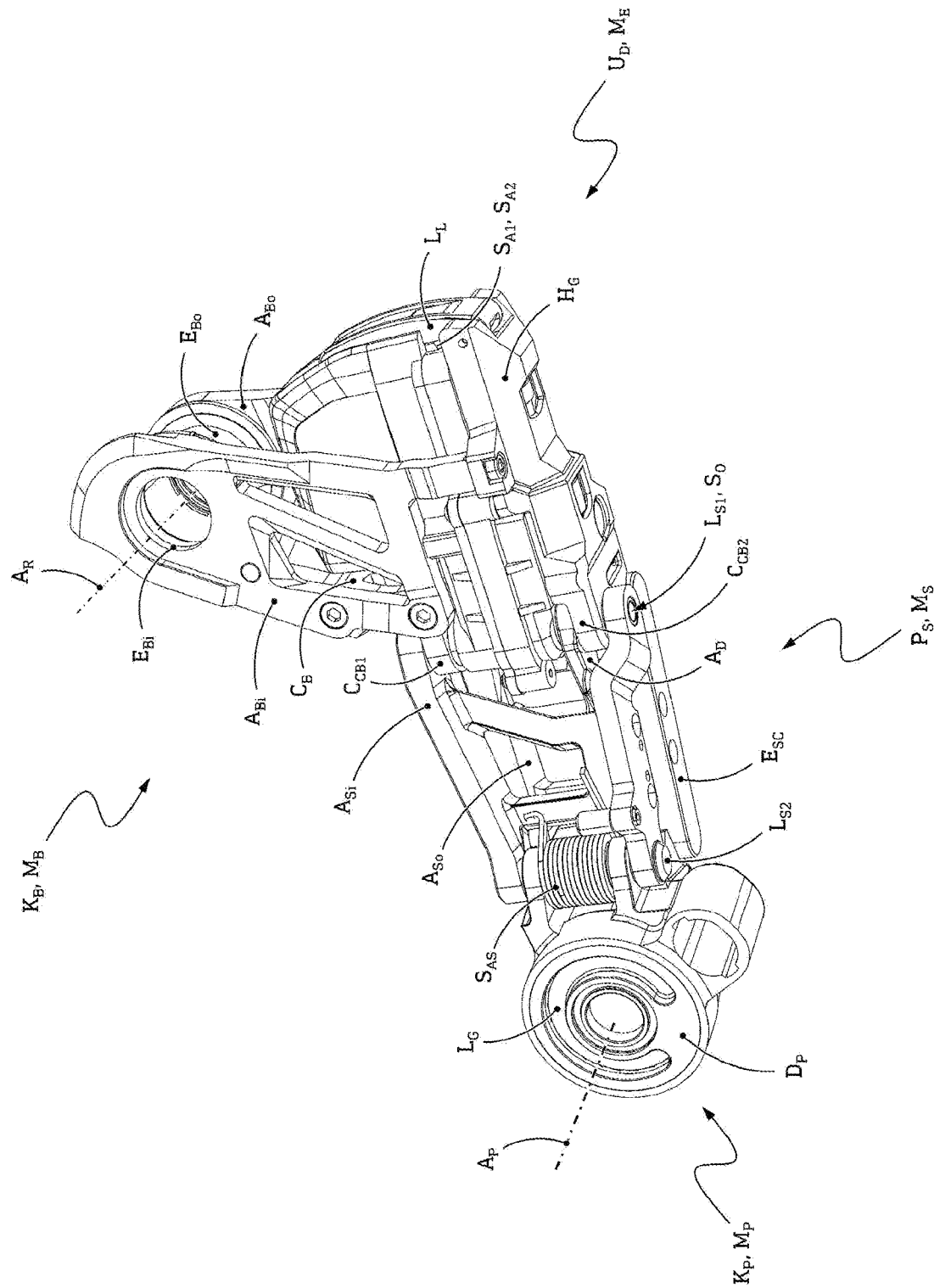
FIG. 6: shows the body of the bicycle derailleur according to FIGS. 2 and 3 in an oblique perspective side view from inboard.

FIG. 6 shows the body of the bicycle rear derailleur $R_D$ according to FIGS. 2 and 3 in an oblique perspective side view from inboard, with a view of the inside of the rear derailleur and the underside of the rear derailleur. Essential components of the rear derailleur are again shown, including the base element $K_B$ with inner and outer mounting arms $A_{Bi}$, $A_{Bo}$ and with inner and outer mounting eyes $E_{Bi}$ and $E_{Bo}$, respectively, as well as the electric motor drive unit $U_D$, rear derailleur parallelogram and rear derailleur bottom side, respectively. swivel formation $P_S$ with inner swivel arm $A_{Si}$, link pins $L_{S1}$ and $L_{S2}$, outer swivel arm $A_{So}$ and swivel arm cover element $E_{SC}$, and with P-knuckle or shifting element $K_P$ and a spring/damper sub-assembly $D_P$ arranged therein (cf. FIGS. 7 and 31).

Figure 7:
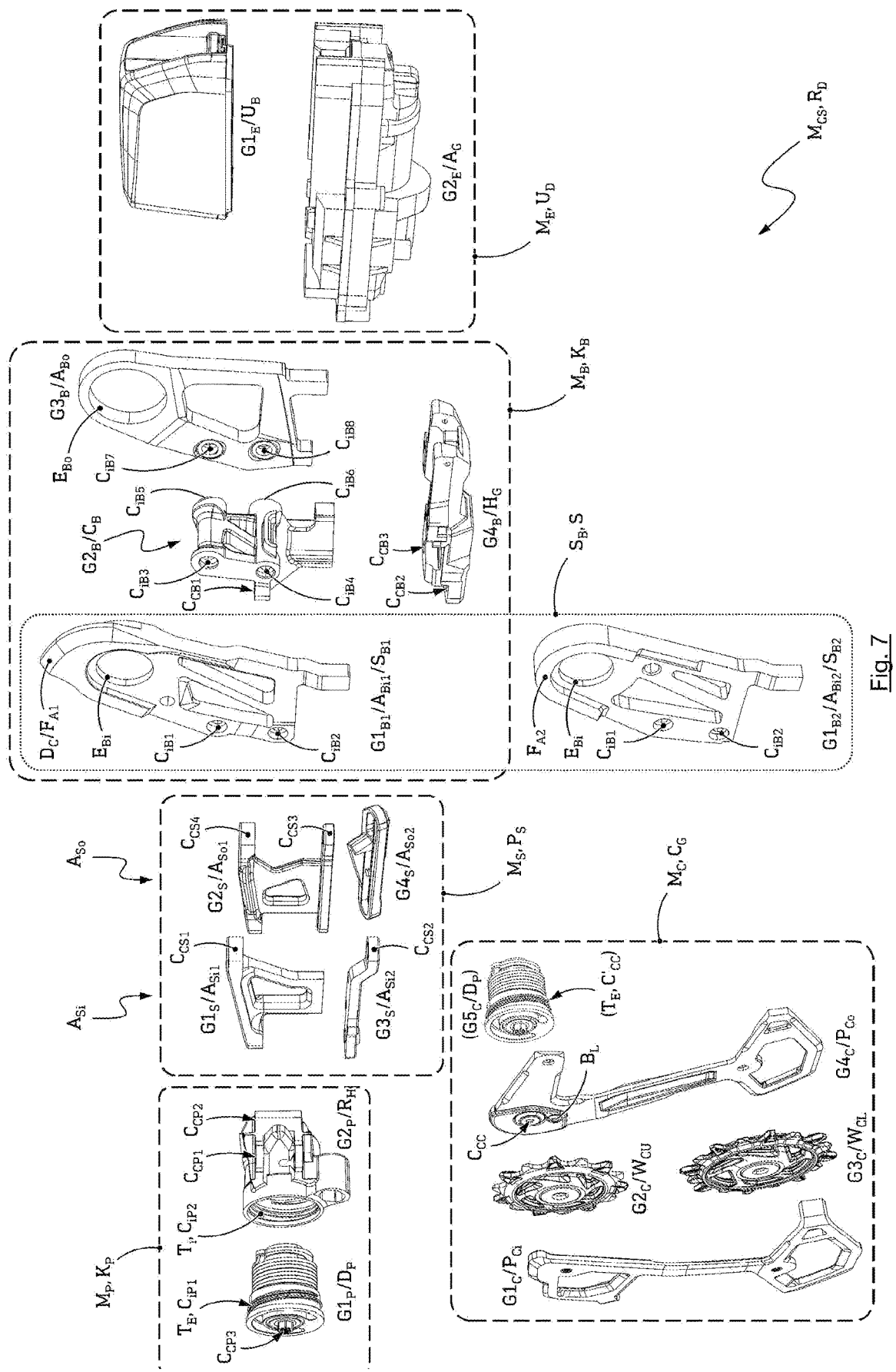
FIG. 7: shows the bicycle rear derailleur according to FIGS. 2 and 3 in a perspective exploded view with schematic representation of the modular rear derailleur construction system according to the present disclosure.

FIG. 7 shows the bicycle rear derailleur $R_D$ according to FIGS. 2, 3 and 6 in a perspective exploded view, whereby FIG. 7 particularly also visualizes an embodiment of the modular rear derailleur construction system $M_{CS}$ according to the present disclosure. For the sake of clarity, various connecting elements such as screws, pins, bolts, bearing sleeves, shafts, etc. are omitted in the illustration of FIG. 7.

In FIG. 7, it can be seen that the bicycle rear derailleur $R_D$ according to the modular construction system $M_{CS}$ is composed of a number of modules M, each of which is outlined with a thick dashed line in FIG. 7. The design of the rear derailleur modular system $M_{CS}$ shown in FIG. 7 comprises the modules "base element module $M_B$", "swivel formation module $M_S$", "shifting element module $M_P$", "chain guiding device module $M_C$" and "electric module $M_E$".

Each of the modules $M_B$, $M_S$, $M_P$, $M_C$ and $M_E$ contains at least one sub-assembly G. In the example shown, each of the five modules $M_B$, $M_S$, $M_P$, $M_C$ and $M_E$ contains at least two sub-assemblies G each.

At least one sub-assembly G of at least one of the modules $M_B$, $M_S$, $M_P$, $M_C$ and $M_E$ is a family member $S_1$-$S_n$, for example the sub-assembly $A_{Bi}$ of the base element module $M_B$ family member $S_{B1}$-$S_{Bn}$ of a family $S_B$ of sub-assemblies $G_B$ comprising at least two family members $S_{B1}$, $S_{B2}$. Taking the example of the inboard-side mounting arm $A_{Bi}$ within the base element module $M_B$, in the embodiment under consideration there is a sub-assembly family $S_B$ comprising two inboard-side mounting arms $A_{Bi1}$ and $A_{Bi2}$. In this case, the sub-assembly family $S_B$ comprises the two sub-assemblies $G1_{B1}$ and $G1_{B2}$ (variant B1 and variant B2 of the first sub-assembly G1 of the base element module $M_B$), which thus represent sub-assembly family members $S_{B1}$ and $S_{B2}$, which in this case are two differently formed inboard-side mounting arms $A_{Bi}$.

In the embodiment shown, the two family members $S_{B1}$ and $S_{B2}$, i.e. the two interchangeable mounting arms $A_{Bi1}$ and $A_{Bi2}$ on the inboard side of the base element module $M_B$, which each form one of the sub-assemblies $G_B$ of the base element module $M_B$, are made of different materials, for example, or have a different design, or have different sub-assembly features $F_{A1}$, $F_{A2}$. In this case, for example, the two interchangeable mounting arms $A_{Bi1}$ and $A_{Bi2}$ have a different design in the region above the pivot eye $E_{Bi}$ either with an additional chain deflector $D_C$ (see family member/mounting arm $A_{Bi1}$), or without additional chain deflector (see family member/mounting arm $A_{Bi2}$).

Thereby, for the at least one sub-assembly family $S_B$ (in case of several sub-assembly families S within the modular system $M_{CS}$ for each sub-assembly family S of the modular system $M_{CS}$) detachable connection interfaces $C_i$ of the sub-assembly family members $S_{Xn}$, $S_{Xm}$ (in the present example of a sub-assembly $G_B$ of the base element module $M_B$, thus, for example, the family members $S_{B1}$ and $S_{B2}$) to adjacent sub-assemblies G of the at least one module M (as well as, insofar as present at the respective sub-assembly G, connection interfaces $C_C$ to adjacent modules M) within the at least one sub-assembly family $S_B$ are configured uniformly across all family members $S_{Xn}$, $S_{Xm}$ in such a way that a family member $S_{Xn}$ of the at least one sub-assembly family $S_B$ of the at least one module M, while retaining the remaining sub-assemblies G of the at least one module M, is interchangeable for another family member $S_{Xm}$ of the same sub-assembly family $S_B$, but of different materials, of different design, with different functionalities, or with different surface properties.

Further referring to FIG. 7 and again using the example of an sub-assembly $G_B$ of the base element module $M_B$, specifically using the example of the sub-assembly $G_{1B}$ (inboard-side mounting arm $A_{Bi}$), this means that for the mounting arm sub-assembly family $S_B$ detachable connection interfaces $C_{iB1}$, $C_{iB2}$ of the sub-assembly family members $S_{B1}$, $S_{B2}$, i.e. of the two mutually interchangeable inboard side mounting arms $A_{Bi1}$ and $A_{Bi2}$ to the adjacent sub-assembly $G_{2B}$ of the base element module $M_B$, in this case to the connecting bracket $C_B$, the sub-assembly family members $S_{B1}$ and $S_{B2}$ are configured uniformly in such a way that the family member $S_{B1}$ of the sub-assembly family $S_B$ of the base element module $M_B$, in the example considered the mounting arm $A_{Bi1}$ on the inboard side, while retaining the other sub-assemblies $G_B$ of the base element module $M_B$, in this case thus retaining the connecting bracket $G_{2B}/C_B$, the outboard mounting arm $G3_B/A_{Bo}$ and the gearbox holder $G4_B/H_G$, are interchangeable with another family member of the same sub-assembly family $S_B$, but of a different material, of a different design, of a different design, of a different functionality or of a different surface property, in this case, for example, for the family member $S_{B2}$ of the sub-assembly family $S_B$ of the base element module $M_B$, which, in the present embodiment of the modular system $M_{CS}$, has a different design and, in the region above the pivot eye $E_{Bi}$, has a different feature $F_{A2}$ than the family member $S_{B1}$.

If, for example, the connecting bracket $C_B$ is considered, which, within the base element module $M_B$, particularly connects the inboard mounting arm $A_{Bi}$, the outboard mounting arm $A_{Bo}$ and the gearbox holder $H_G$ (cf. FIGS. 6 to 9), it can be seen that the connecting bracket $C_B$, in addition to the detachable connection interfaces $C_{iB3}$, $C_{iB4}$, $C_{iB5}$, $C_{iB6}$ to the respective adjacent sub-assemblies $G_B$ within the base element module $M_B$, also has connection interfaces $C_C$ to the adjacent swivel arm sub-assembly $M_S$, visible in FIG. 7, in particular the connection interface $C_{CB1}$ for connection to a corresponding, shape-corresponding interface $C_{CS4}$ of the swivel arm $A_{So}$ in the adjacent swivel formation module.

These connection interfaces $C_C$ to adjacent swivel formation modules M are also designed in such a way that a respective family member, here the sub-assembly $C_B$, i.e. the connecting bracket $C_B$, within a family $S_B$ comprising at least two family members $S_{B1}$, $S_{B2}$ of connecting bracket sub-assemblies $C_B/G_B$ of the base element module $M_B$, while retaining the remaining sub-assemblies $G_B$ of the base element module $M_B$, in this case while retaining the gearbox holder sub-assembly $G_B/H_G$, the inboard mounting arm sub-assembly $G_B/A_{Bi}$ and the outboard mounting arm sub-assembly $G_B/A_{Bo}$, for another family member of the same sub-assembly family S, but made of a different material, of a different shape, of a different functionality or of a different surface property.

Figure 35:
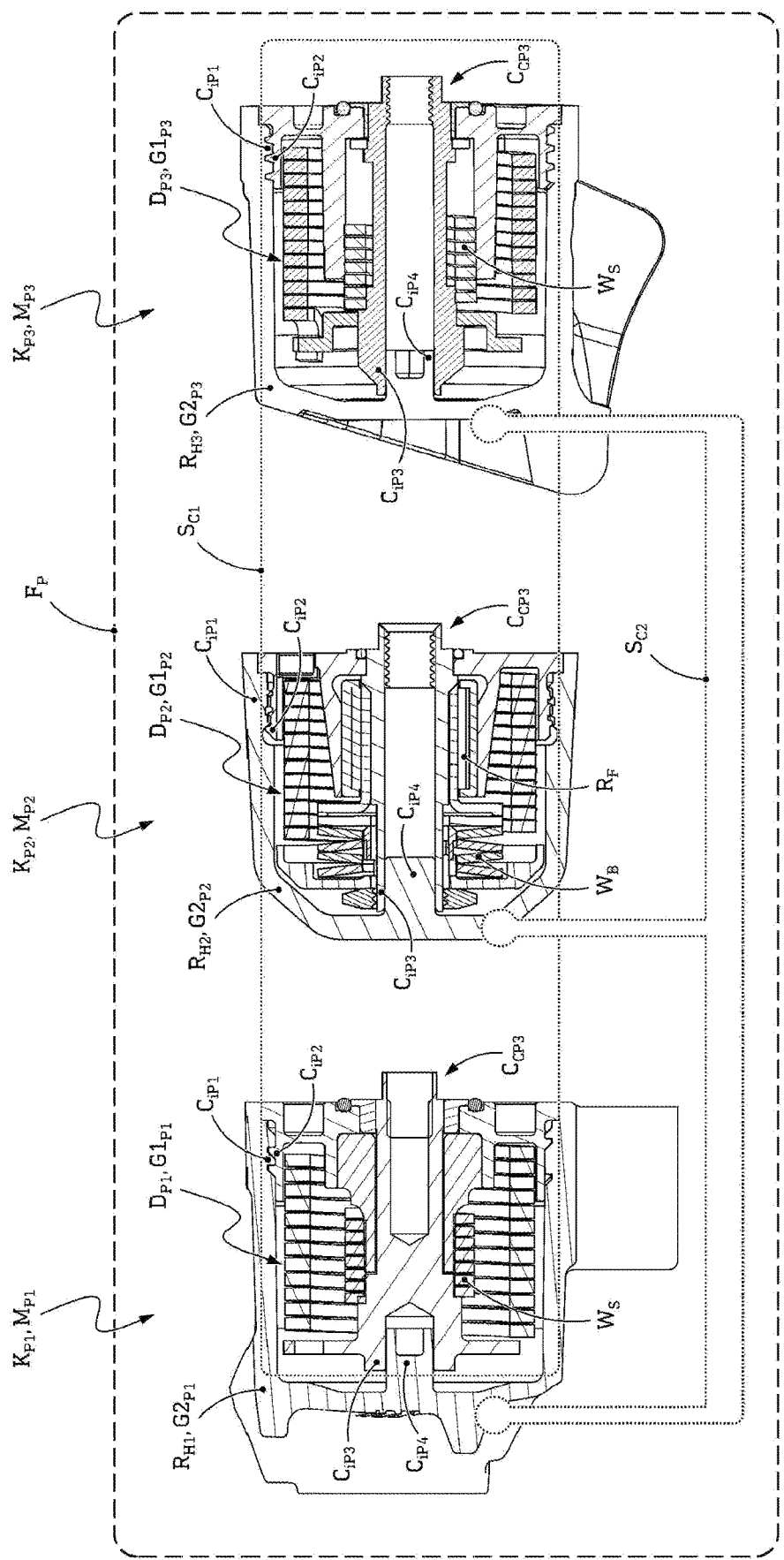
FIG. 35: shows various spring/damper devices in the form of modularly interchangeable, one-piece manageable sub-assemblies for a modular rear derailleur similar to FIG. 2 or FIG. 26.

Analogously and alternatively, or in addition to the presence of sub-assembly families $S_B$ within modules M, the modular construction system $M_{CS}$ or the rear derailleur $R_D$ can also be set up to use at least one module family F comprising at least two family members M of modules M within the rear derailleur $R_D$. For this purpose, detachable connection interfaces $C_C$ of the family members M to respective adjacent modules M of the rear derailleur $R_D$ are provided for the at least one module family F, in the case of a plurality of module families for each module family, within the at least one module family F, the connection interfaces $C_C$ being configured uniformly across all family members in such a way that a family member M of the at least one module family F, for example a base element module $M_B$, a swivel formation module $M_S$, a shifting element module $M_P$ or a chain guiding device module $M_C$, e.g. a first base element module family member $M_{B1}$, while retaining the remaining modules M of the rear derailleur $R_D$, is exchangeable for another family member M of the same module family F, e.g., for a second base element module family member $M_{B2}$ with different properties, for example of different materials, of different design, of different functionality or of different surface properties. An example of this is shown in FIG. 35 and described further below in the associated figure description of FIG. 35.

This exchange of a family member for another family member of a sub-assembly G or a module M can, for example, already be provided for by the manufacturer during production planning, whereby a large number of different variants or quality levels of the rear derailleur $R_D$ can be more easily planned and produced by the manufacturer.

Due to the definition and configuration of uniform and easily detachable connection interfaces across all family members in the modular construction system $M_{CS}$ according to the present disclosure, this exchange of sub-assemblies G or modules M can also be carried out by members of the bicycle trade, by specialist workshops, or even by the end-user, with little effort.

This way, it is also possible to meet the increasing demands of society and legislature for improvements to the reparability of technical goods.

In this context, sub-assembly families S or module families F of the modular bicycle derailleur construction system $M_{CS}$ can also be designed in such a way that they can be replaced by the end user even without specialist tools or with standard household tools. This way it is possible for the customer or end user to repair their bicycle derailleur $R_D$ with little effort, or to renew worn parts, in order to increase the useful life of the bicycle derailleur $R_D$ with reduced costs and reduced resource consumption.

It also becomes possible for the end user to exchange family members, i.e. sub-assemblies G or modules S of the bicycle rear derailleur, for corresponding different sub-assemblies G or modules S of the same sub-assembly or module family, in particular of higher quality or with additional features, in order to achieve a higher-quality product at comparatively low cost without having to purchase a complete new rear derailleur $R_D$.

In the embodiment of the modular system $M_{CS}$ shown in FIG. 7, the P-knuckle or shifting element module $M_P$ can comprise a spring/damper device $D_P$ as shown for springing and vibration-damping pretensioning of the chain by means of the chain guiding device $C_G$. The spring/damper device $D_P$ then provides a connection interface $C_{CP3}$ across family members for connection to a corresponding, shape-corresponding and likewise cross-family member interface $C_{CC}$ of the outer chain cage guide plate device $P_C$, in the adjacent chain guiding device module $M_C$.

Alternatively, the spring/damper device $D_P$ can also be assigned to the chain guiding device module $M_C$, which is visualized in FIG. 7 by a spring/damper device $D_P$ arranged within the chain guiding device module $M_C$, drawn with dashes and provided with bracketed reference signs. In this case, the external thread $T_E$ of the receptive housing $R_H$ of the shifting element $K_P$ then forms a connection interface $C'_{CC}$ across family members for connection to a corresponding interface $T_i$, $C_{iP2}$ of the receptive housing $R_H$ in the adjacent shifting element module $M_P$, which corresponds in shape and is also across family members.

The background of a spring/damper device $D_F$ associated with the chain guiding device module $M_C$ is explained in more detail below with reference to FIGS. 33 and 34.

Figure 8:
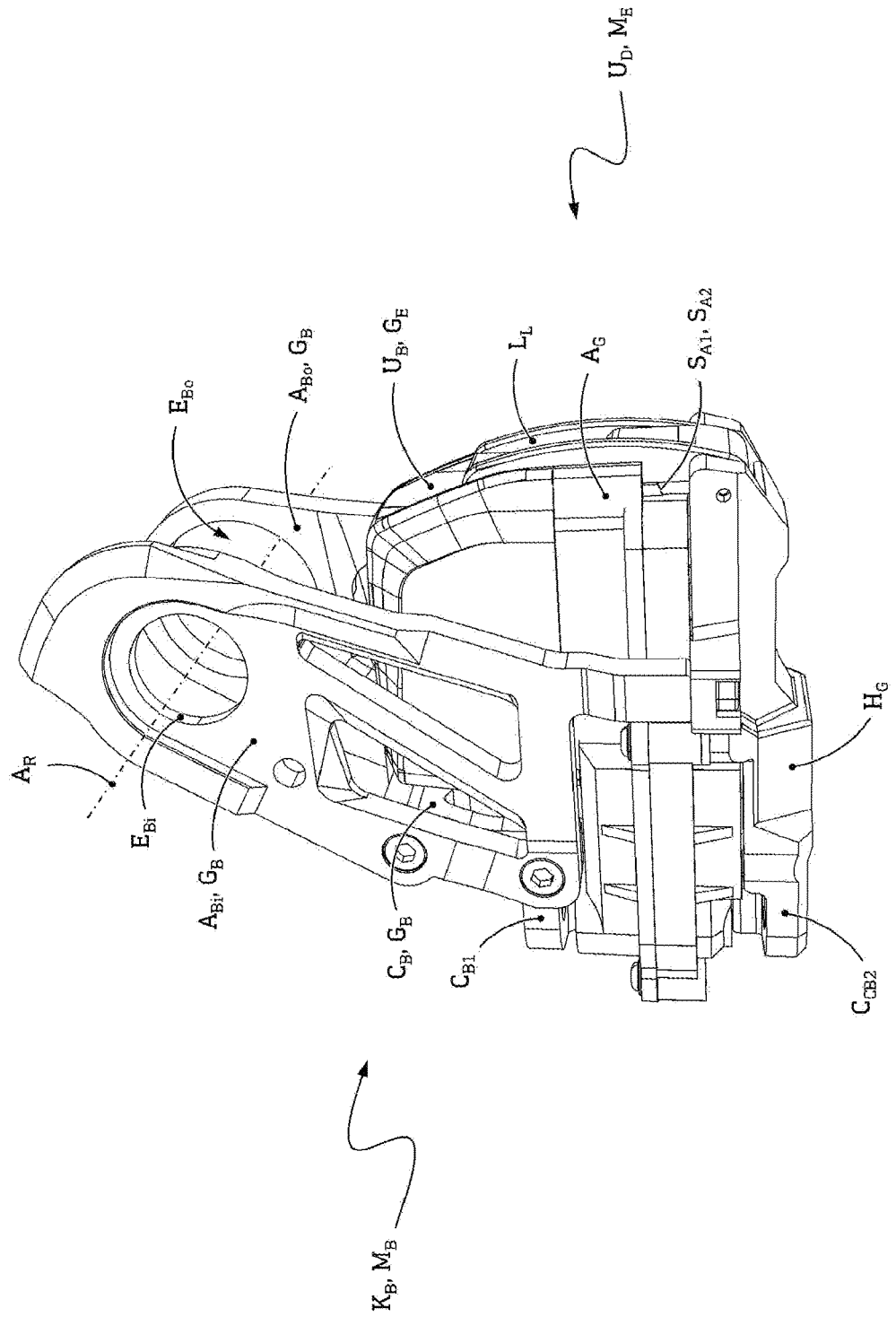
FIG. 8: shows a base element or B-knuckle of the rear derailleur according to FIGS. 2 and 3 in an oblique inboard view similar to FIG. 6.
Figure 9:
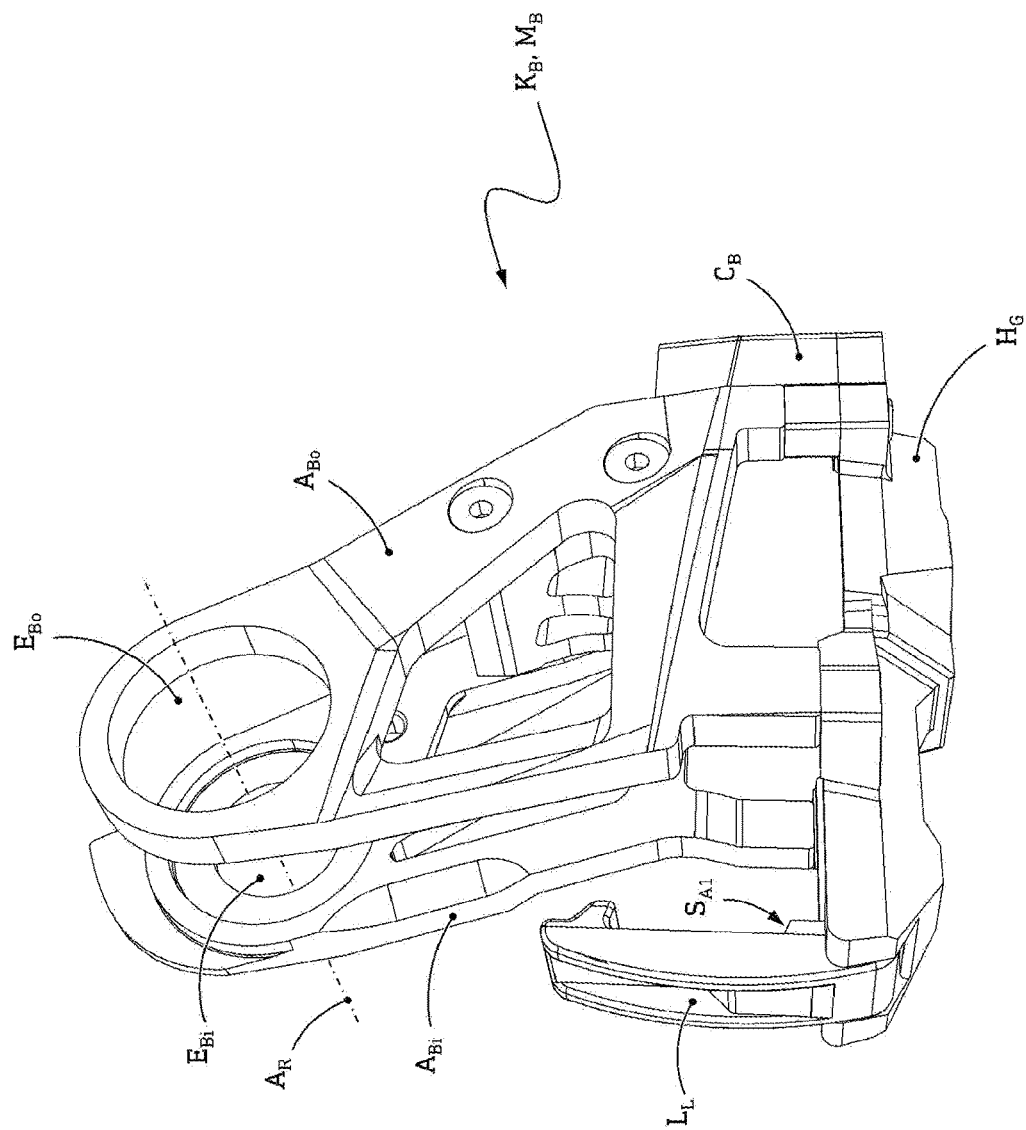
FIG. 9: shows the base element or B-knuckle according to FIG. 8 in a perspective view from diagonally outboard, with battery and motor/gearbox removed.

FIG. 8 and FIG. 9 show the base element or B-knuckle $K_B$ of the rear derailleur $R_D$ according to FIGS. 2 and 3 in views from diagonally inboard and diagonally outboard, respectively. In particular, the two-armed mounting with the mounting arms $A_{Bi}$, $A_{Bo}$ and the pivot eyes $E_{Bi}$, $E_{Bo}$ for coaxial mounting of the rear derailleur with respect to the rear wheel axis $A_R$ can be seen again. FIG. 8 additionally shows an electric drive unit $U_D$ of the bicycle rear derailleur $R_D$, comprising in particular a motor-gearbox sub-assembly $A_G$ as well as a replaceable battery unit $U_B$ held by a latching lever $L_L$, which is described in more detail below.

Figure 10:
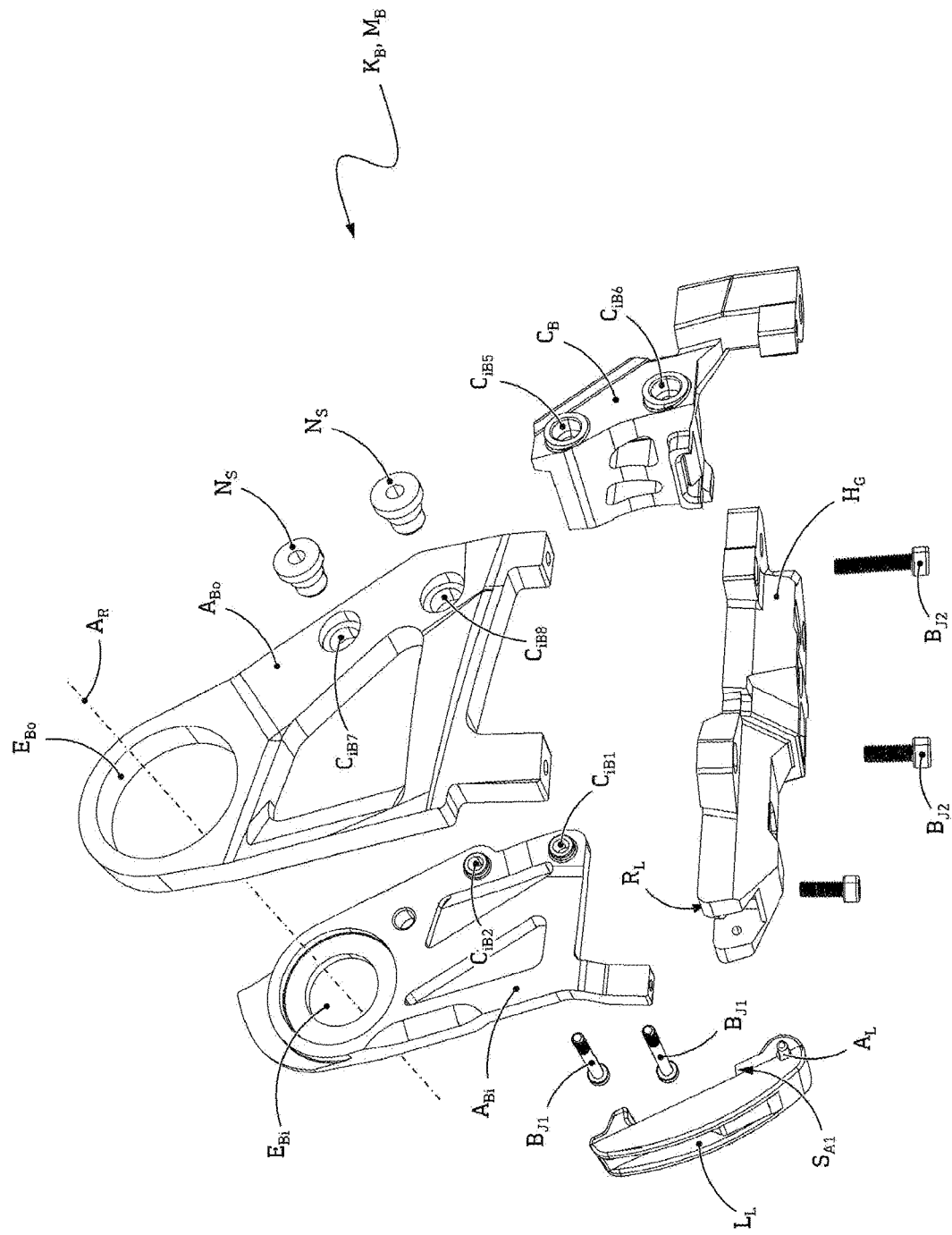
FIG. 10: shows the base element or B-knuckle according to FIGS. 8 and 9 in a perspective exploded view with a view direction according to FIG. 9.

FIG. 10 shows the base element or B-knuckle $K_B$ of the rear derailleur $R_D$ according to FIGS. 2 and 3 in a view identical to FIG. 9, but in exploded view. Here, too, the two-arm design of the base element $K_B$ with mounting arms $A_{Bi}$, $A_{Bo}$ and pivot eyes $E_{Bi}$, $E_{Bo}$ for coaxial mounting of the rear derailleur $R_D$ on the frame dropout $D_F$ of the rear frame in relation to the rear wheel axis $A_R$ can be seen.

As shown in FIG. 10, the base element or B-knuckle $K_B$ is divided into the two mounting arms $A_{Bi}$, $A_{Bo}$, a gearbox holder $H_G$, a connecting bracket $C_B$ and a latching lever $L_L$ for securing the battery or the exchangeable battery $U_B$ (see FIG. 8). It can be seen that for simple replacement of, for example, the outer mounting arm $A_{Bo}$, only the two screw nuts $N_S$ of the joining bolts $B_{J1}$ and the two further joining bolts $B_{J2}$ need to be loosened. The same applies analogously to the inner mounting arm $A_{Bi}$, to the gearbox holder $H_G$ with the battery latching lever $L_L$ pivotably attached to it, and to the connecting bracket $C_B$. All these parts of the base element $K_B$ are thus easily replaceable, which contributes to the desired comprehensive serviceability and repairability of the bicycle derailleur $R_D$.

Figure 11:
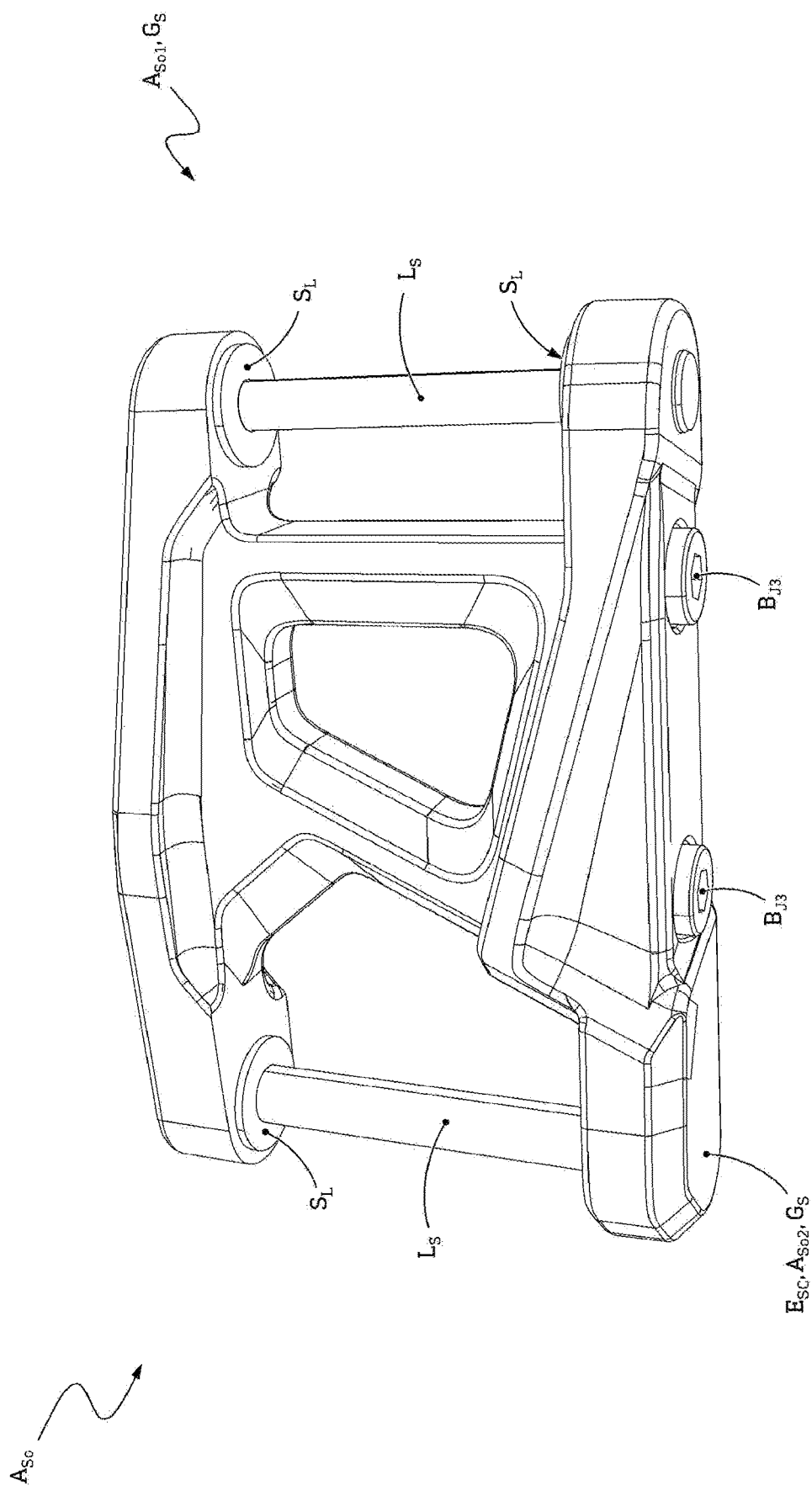
FIG. 11: shows a swivel arm or parallelogram arm of the derailleur according to FIGS. 2 and 3, viewed from outboard.
Figure 12:
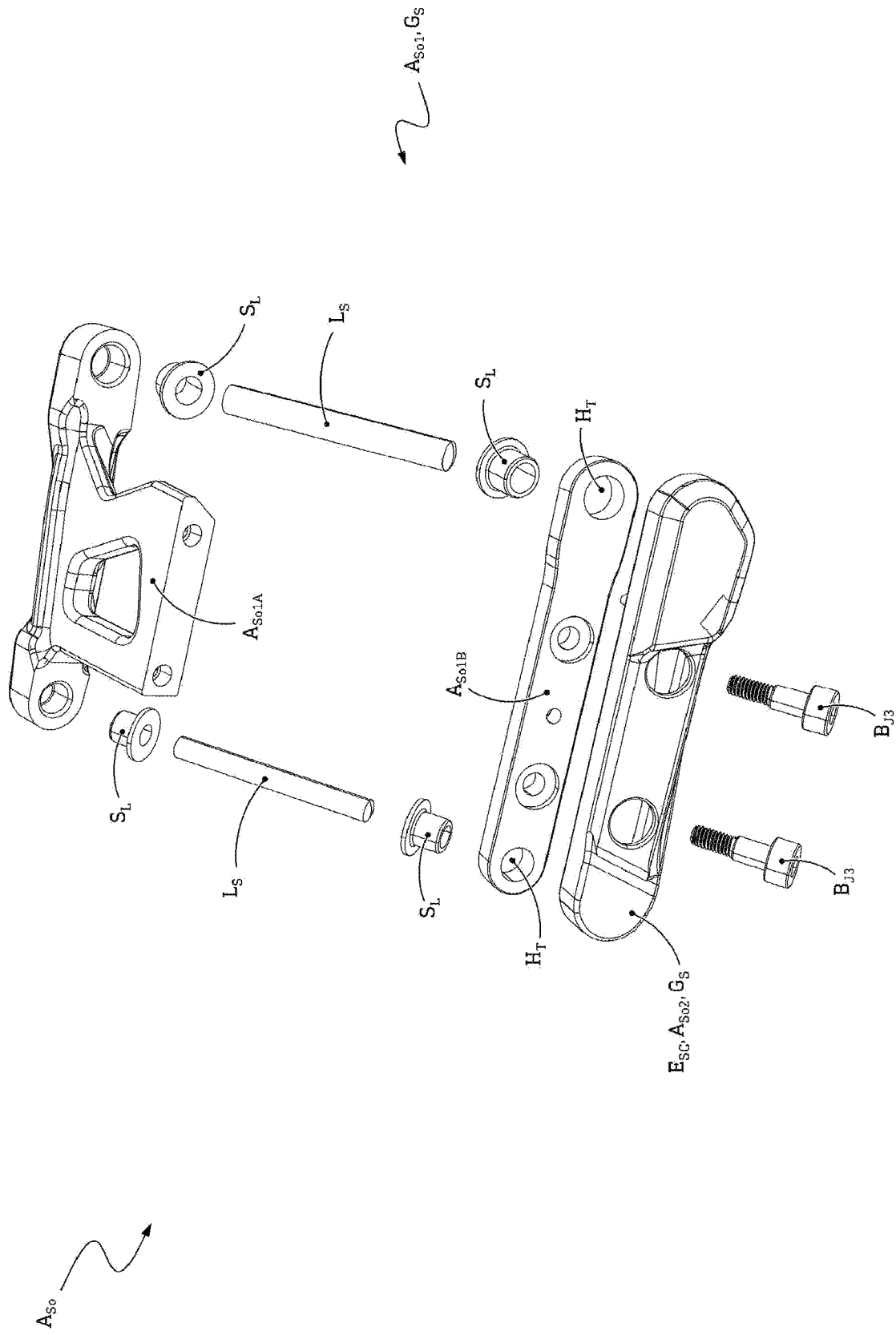
FIG. 12: shows an exploded, disassembled view of the swivel arm or parallelogram arm according to FIG. 11.
Figure 13:
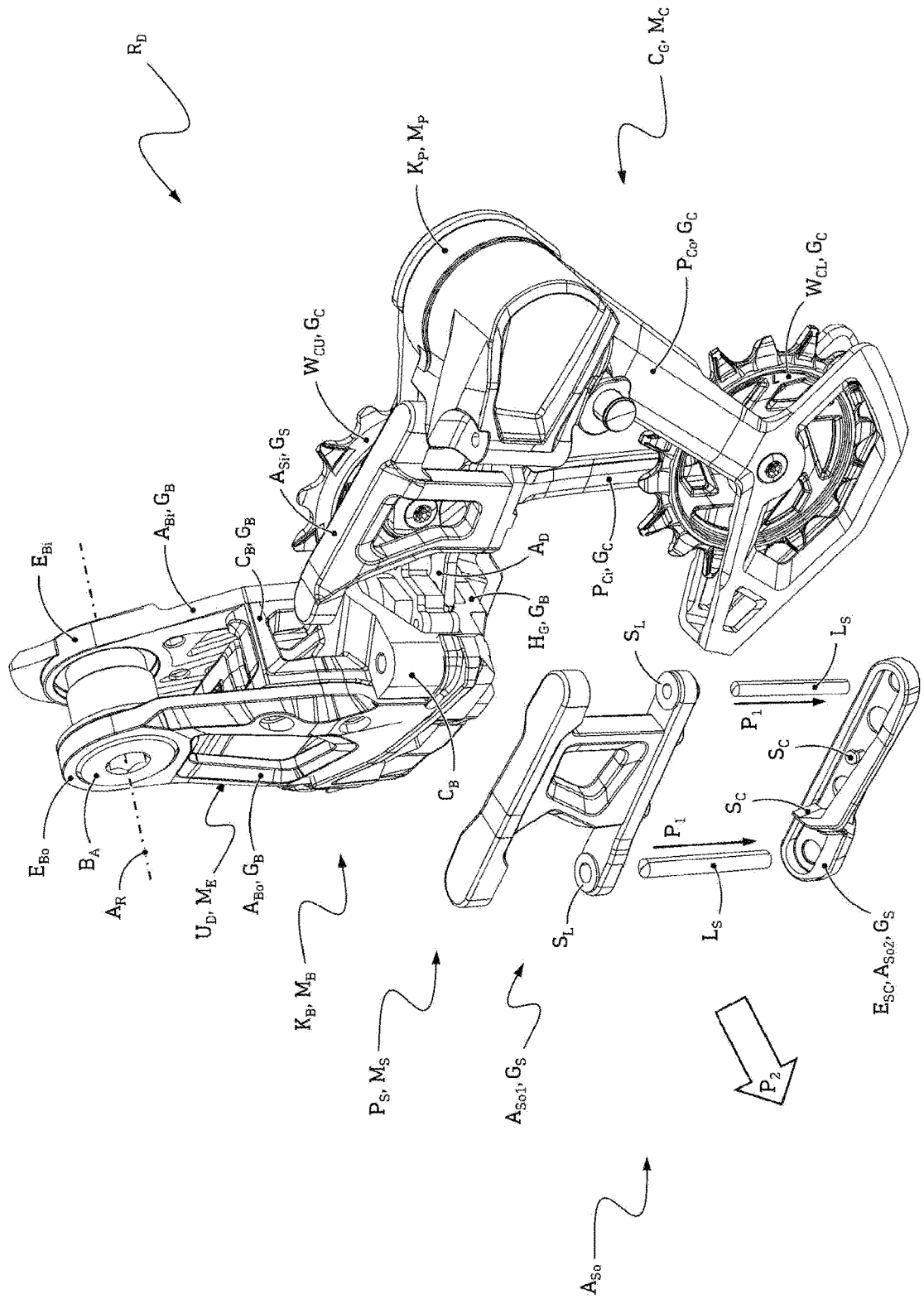
FIG. 13: shows the rear derailleur according to FIGS. 2 and 3, with removed swivel arm or parallelogram arm according to FIGS. 11 and 12 in a representation and view corresponding to FIG. 2.

FIGS. 11 to 13 show an outer parallelogram arm or swivel arm $A_{So}$ of the rear derailleur $R_D$ according to FIGS. 2, 3, 6 and 13, in each case with the direction of view from outboard, whereby FIGS. 12 and 13 show the parallelogram arm or swivel arm $A_{So}$ according to FIG. 11 in disassembled form. First of all, it can be seen that the outboard-side swivel arm $A_{So}$ comprises, in particular, the swivel arm sub-assemblies $A_{So1}$ and $A_{So2}$ as well as link pins $L_S$ accommodated in bearing sleeves $S_L$. In this case, the swivel arm sub-assembly $A_{So1}$ breaks down into further individual parts such as $A_{So1A}$, $A_{So1B}$, $S_L$, $L_S$, which are connected, i.e. bolted together, by means of two joining bolts $B_{J3}$.

The swivel arm sub-assembly $A_{So2}$ is here in the form of a cover element $E_{SC}$ protecting the parallelogram arm or swivel arm $A_{So}$, which can be connected to the swivel arm sub-assembly $A_{So1}$ by means of undercuts or snap connections $S_C$ shown in FIG. 13.

In the embodiment example of the modular multi-part outer swivel arm $A_{So}$ shown in FIGS. 11 to 13, the cover element $E_{SC}$ realizes an additional function.

As can be seen in particular from FIG. 13, this additional function of the swivel arm sub-assembly $A_{So2}$, or of the cover element $E_{SC}$, consists in the fact that after removing only the swivel arm cover element $E_{SC}$, without further disassembly of the swivel arm $A_{So}$, in particular without loosening the joining bolts $B_{J3}$, the link pins $L_S$ can be removed directly from the swivel arm $A_{So}$ downwards along the direction of the arrows $P_1$. Thereupon, the complete swivel arm $A_{So}$ can thus be removed from the rear derailleur $R_D$ without tools, as shown in FIG. 13 by means of the block arrow $P_2$, and thus easily repaired or replaced, for example. Only individual parts of the swivel arm $A_{So}$, such as axles, bearing sleeves or the swivel arm cover element $E_{SC}$, can also be easily replaced in this way.

FIGS. 14 to 25 show the motor-gearbox sub-assembly $A_G$ of the rear derailleur $R_D$ already mentioned above with reference to FIGS. 6 to 8 in various views and sectional views according to FIGS. 2, 3 and 6 to 8.

Figure 14:
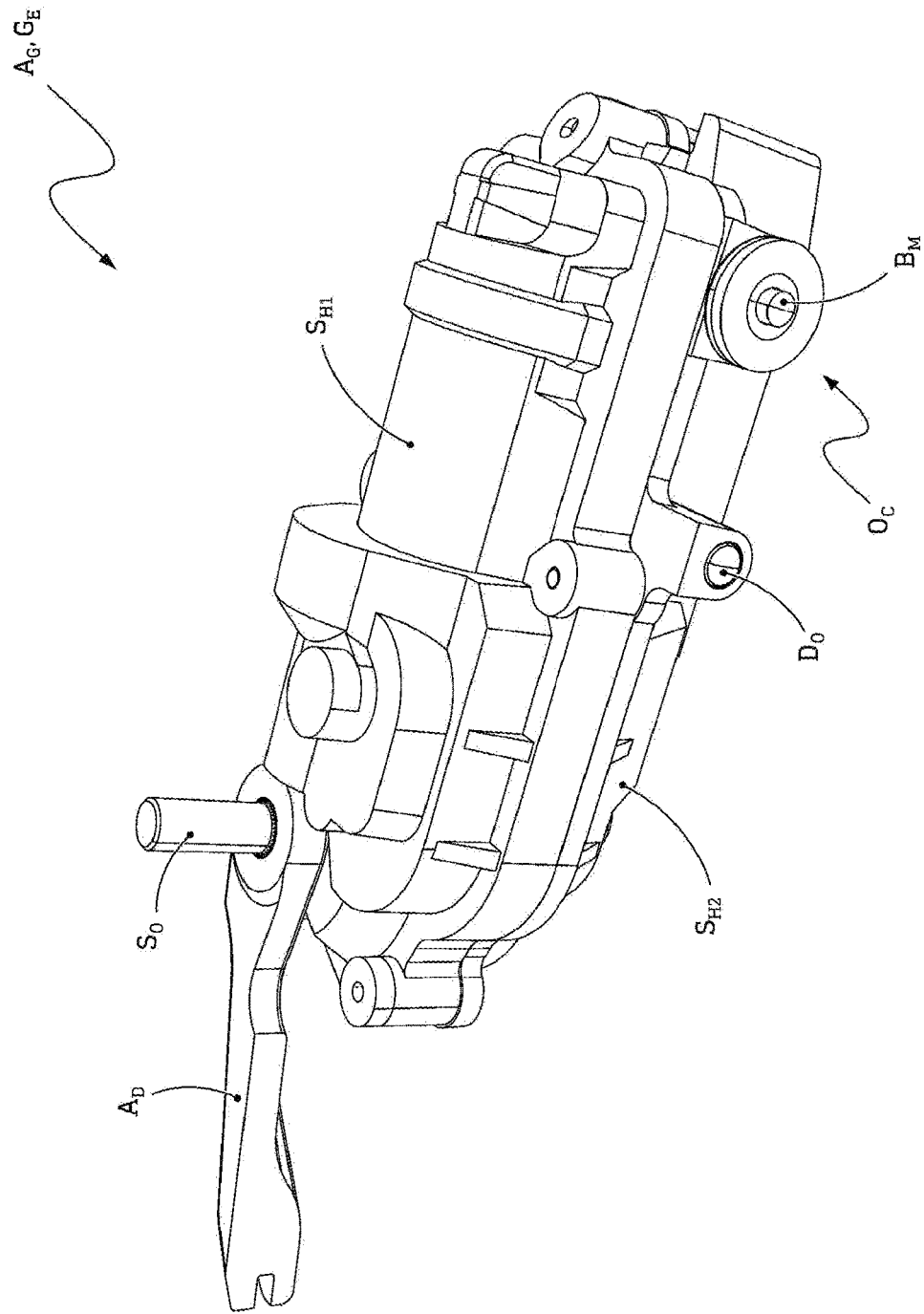
FIG. 14: shows a motor-gearbox sub-assembly of the rear derailleur according to FIGS. 2 and 3 in an oblique perspective view from outboard.

FIG. 14 shows the motor-gearbox sub-assembly $A_G$ in an oblique perspective view from outboard. Due to the illustration with a view of the underside of the motor-gearbox sub-assembly $A_G$, FIG. 14 shows the motor-gearbox sub-assembly $A_G$ upside down, relative to the illustration in FIGS. 2, 3 and 6 to 8. In particular, FIG. 14 shows an output shaft $S_O$, which in the illustration in FIG. 6 coincides or corresponds with the link pin $L_{S1}$ shown there.

Pressed onto a knurled section of the output shaft $S_O$ is a drive arm $A_D$, which is used to transmit the shifting forces from the motor-gearbox sub-assembly $A_G$ to the rear derailleur $R_D$, see also FIGS. 6 and 13, for example.

FIG. 14 also shows an operating control $O_C$ comprising a button $B_M$, which is used for the selection of certain operating modes of the electric derailleur $R_D$ by the user, as well as an operating display in the form of a light-emitting diode $D_O$, which signals certain operating states of the electric rear derailleur $R_D$ to the user.

Figure 22:
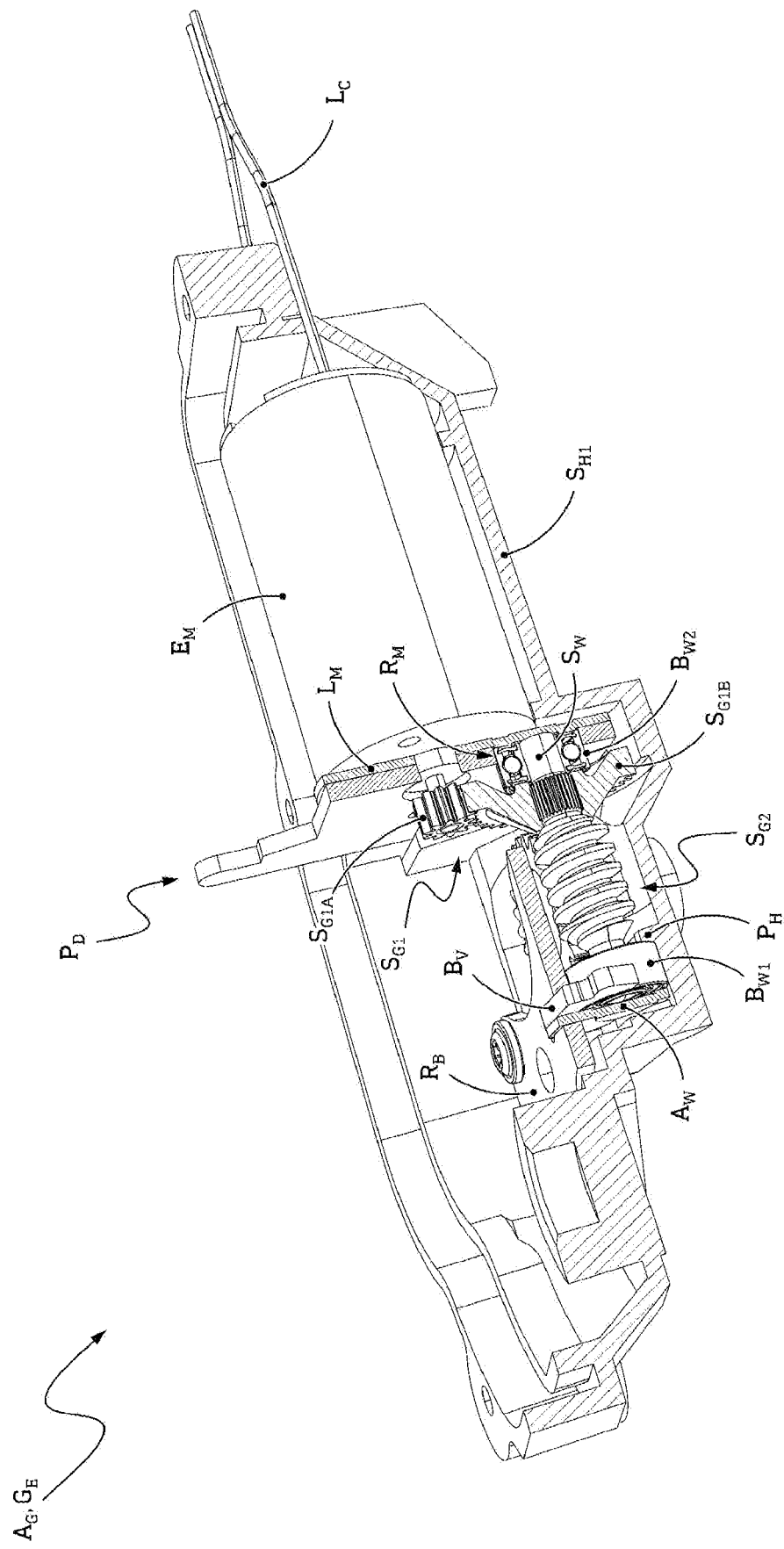
FIG. 22: shows a motor-gearbox sub-assembly according to FIG. 14 or 15 to 21 in the partially mounted state in a perspective longitudinal sectional view.
Figure 23:
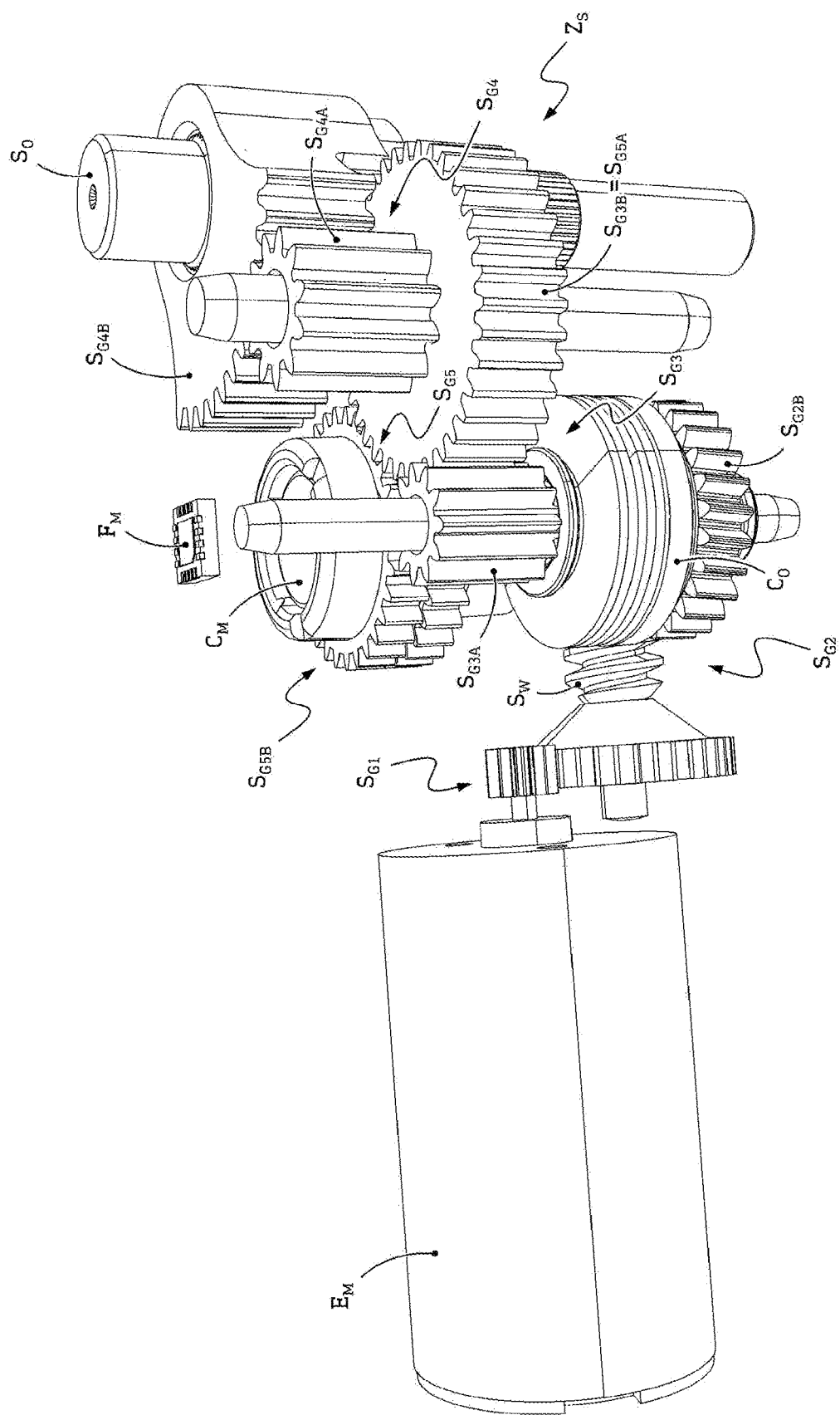
FIG. 23: shows a motor and gearbox of the motor-gearbox sub-assembly according to FIG. 14 or 15 to 22 in a perspective view.

In addition, it can be seen in FIG. 14 that the motor-gearbox sub-assembly $A_G$ is designed to be particularly space-saving in that the housing halves or housing sections $S_{H1}$, $S_{H2}$ are designed to fit as closely as possible to the inner parts of the motor-gearbox sub-assembly $A_G$, as can be seen, for example, from the shape of the upper housing half $S_{H1}$, which in the right-hand area of the drawing reproduces the shape of the electric motor $E_M$ contained therein (cf. FIGS. 16, 20 and 22) and in the drawing-related left-hand area closely follows the shapes of the gear parts contained in this area (cf. FIGS. 16, 22 and 23).

Figure 15:
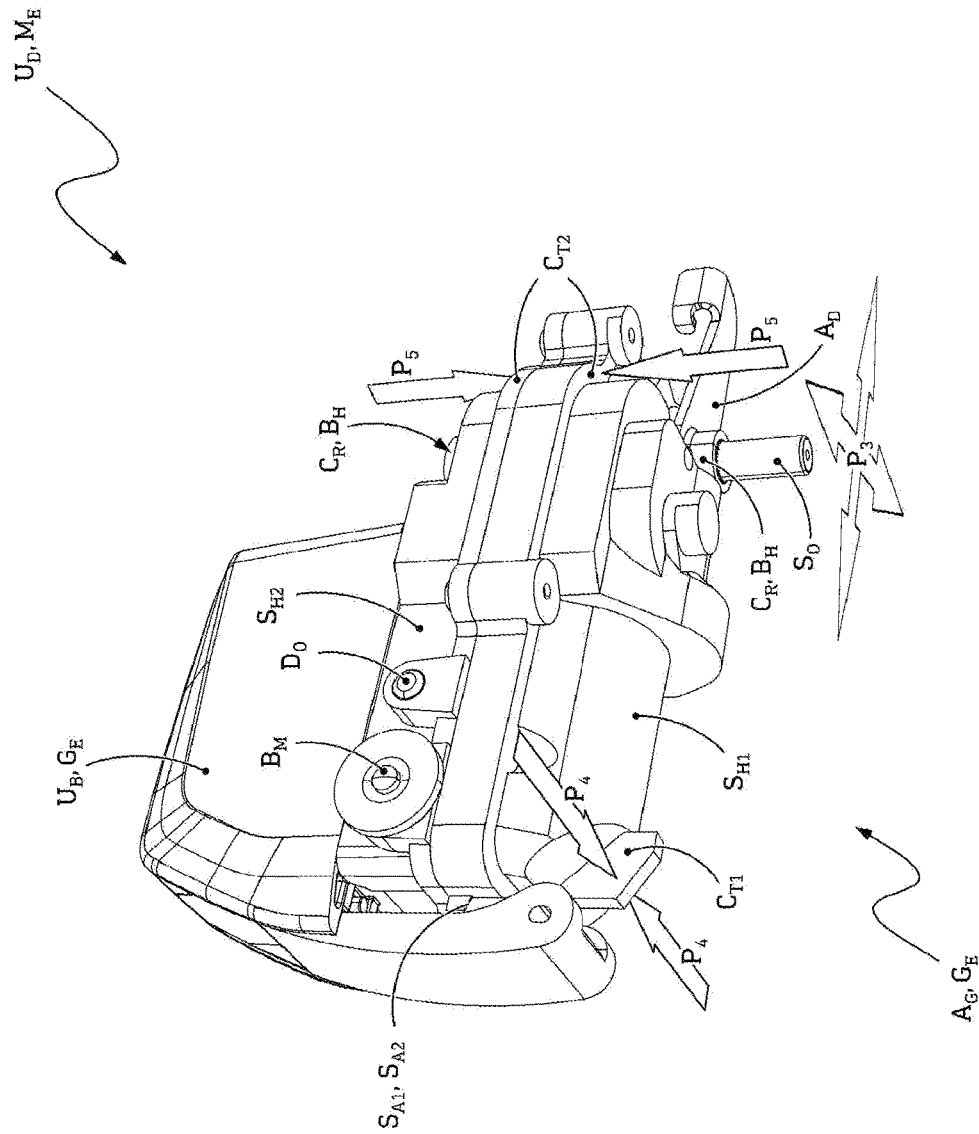
FIG. 15: shows a motor-gearbox sub-assembly similar to FIG. 14 (with different drive arm) together with a battery device in an oblique perspective view from outboard.

FIG. 15 shows a motor-gearbox sub-assembly $A_G$ similar to the one shown in FIG. 14, with inserted exchangeable battery $U_B$ in an oblique perspective view from outboard. The motor-gearbox sub-assembly $A_G$ differs from the motor-gearbox sub-assembly $A_G$ shown in FIG. 14 only by a structurally different drive arm $A_D$, which in the embodiment according to FIG. 15 is designed as a stamped and bent part, while the drive arm $A_D$ in the embodiment according to FIG. 14 can be designed, for example, as a milled part or injection molded part.

The block arrow groups $P_3$, $P_4$ and $P_5$ in FIG. 15 indicate how the motor-gearbox sub-assembly $A_G$ is fixed and secured in the B-knuckle or base element $K_B$ with respect to all six spatial degrees of freedom of movement without any geometric under- or overdetermination. This is done by means of a rotational axis connection $C_R$, the spatial fixation of which, for the motor-gearbox sub-assembly $A_G$, is visualized in FIG. 15 by the group of block arrows $P_3$, which can be realized, for example, by means of two housing beads $B_H$ arranged coaxially around the output shaft $S_O$, and of which one or both are fixed during assembly of the motor-gearbox sub-assembly $A_G$ in the base element $K_B$, e.g. in correspondingly shaped recesses of the gearbox holder $H_G$ and the connecting bracket $C_B$ of the base element $K_B$ (cf. FIGS. 6 and 8), and furthermore by means of two translational stop connections $C_{T1}$ and $C_{T2}$, whose force transmission and translational fixing of the motor-gearbox sub-assembly $A_G$ are indicated in FIG. 15 by the pairs of block arrows $P_4$ and $P_5$.

The rotational axis connection of the motor-gearbox sub-assembly $A_G$ with the base element $K_B$ can alternatively also be realized directly by engagement of the output shaft $S_O$ with a recess of corresponding shape in the base element $K_B$. This can be seen, for example, in FIG. 6, where the drawing-related lower end of the output shaft $S_O$ simultaneously supports the link pin $L_{S1}$ for the pivotable guidance of the inner swivel arm $A_{Si}$, and also forms the rotational axis connection $C_R$ between the motor-gearbox sub-assembly $A_G$ and the base element $K_B$ with respect to the fixation of the degrees of freedom of movement of the motor-gearbox sub-assembly $A_G$ visualized in FIG. 15 by means of the block arrows $P_3$, in that according to FIG. 6 the output shaft $S_O$ is in positive engagement at $C_{CB2}$ with the gearbox holder $H_G$ and possibly also at $C_{B1}$ with the connecting bracket $C_B$ (cf. also FIG. 8).

The horizontal translational stop connection $C_{T1}$, visualized in FIG. 15 by means of the block arrows $P_4$, comes into positive contact with a recess $R_L$ of the gearbox holder $H_G$ (cf. FIG. 10) when the motor-gearbox sub-assembly $A_G$ is mounted in the base element $K_B$ and thus forms the torque support for dissipating the engine counter-torque into the base element $K_B$. The further vertical translational stop connection $C_{T2}$, visualized in FIG. 15 by means of the block arrows $P_5$ is positively enclosed in the base element $K_B$, for example between the gearbox holder $H_G$ and the connecting bracket $C_B$, in the vertical direction as shown in the drawing, and thus fixes the motor-gearbox sub-assembly $A_G$ in the vertical direction in the base element $K_B$. The vertical fixing of the motor-gearbox sub-assembly $A_G$ in the base element $K_B$ can also be achieved by other stop surfaces arranged on the outside of the housing of the motor-gearbox sub-assembly $A_G$, which come into contact with corresponding mating stop surfaces of the base element $K_B$ when the motor-gearbox sub-assembly $A_G$ is mounted in the base element $K_B$.

FIG. 16 shows a motor-gearbox sub-assembly $A_G$ according to FIG. 14 or FIG. 15, together with battery device or exchangeable battery $U_B$ according to FIG. 2, 6, 7, 8 or 15 in longitudinal section. In addition to some parts of the base element $K_B$, namely gearbox holder $H_G$ and connecting bracket $C_B$, it is possible to see in particular the positive fixing of the exchangeable battery $U_B$, which, as shown in the drawing, takes place on the left-hand side by means of a nose protrusion $N_{P1}$ formed on the housing of the exchangeable battery $U_B$, which engages under a retaining sleeve $S_R$ formed on the connecting bracket $C_B$. On the right-hand side as shown in the drawing, the interchangeable battery $U_B$ is secured in the base element $K_B$ by means of the latching lever $L_L$, which is connected to the gearbox holder $H_G$ so that it can pivot about a latching lever pivot axis $A_L$ arranged on the gearbox holder $H_G$, and engages positively by means of an integrally formed nose protrusion $N_{P2}$ and by generating an elastic clamping force $F_E$ over a latching protrusion $P_L$ integrally formed on the interchangeable battery $U_B$. The elastic clamping force $F_E$ is generated by elastic deformation of both the latching lever $L_L$ and the housing of the interchangeable battery $U_B$ as well as the two housing halves $S_{H1}$ and $S_{H2}$ of the motor-gearbox sub-assembly $A_G$.

However, the latching lever $L_L$ has a vertically extending oblong hole $H_O$ as shown in the drawing for pivotable connection to the latching lever pivot axis $A_L$, which in turn is rigidly connected to the gearbox holder $H_G$ (see FIG. 10). This means that the positive elastic tensioning $F_E$ of the latching lever $L_L$ is not initially introduced via the pivot axis $A_L$ into the gearbox holder $H_G$ and is only transferred from the latter to the lower housing half $S_{H1}$ of the motor-gearbox sub-assembly $A_G$, from there to the upper housing half $S_{H1}$, and finally back to the housing of the interchangeable battery $U_B$, resulting in a long tolerance chain with the risk of either too tight or too loose tensioning $F_E$ of the interchangeable battery $U_B$, or undesirably large changes in this clamping force $F_E$ over time.

Due to the oblong hole $H_O$, however, the latching lever $L_L$ can move up and down in a vertical direction relative to the drawing. The elastic clamping force $F_E$ is thus generated only shortly before the final latching of the latching lever $L_L$ due to direct contact of an inclined attachment surface $S_{A1}$, arranged for this purpose on the latching lever $L_L$, with a counter-pressure surface $S_{A2}$, arranged in a corresponding shape on the gearbox holder $H_G$ (cf. FIGS. 6, 8, 9, 10 and 15). In this way, a maximum shortened tolerance chain results for the attachment of the exchangeable battery $U_B$ by the latching lever $L_L$ on the direct path of the force $F_E$ between the attachment surface $S_{A1}$ of the latching lever $L_L$ over lower and upper housing flanges $F_{H1}$, $F_{H2}$ of the housing halves $S_{H1}$ and $S_{H2}$ of the motor-gearbox sub-assembly $A_G$, and via the housing of the exchangeable battery $U_B$ and its nose protrusion $N_{P2}$ back onto the latching lever $L_L$. This leads to a minimum addition of tolerances and thus to a secure and permanently reproducible mounting of the interchangeable battery $U_B$ on the motor-gearbox sub-assembly $A_G$. or in the base element $K_B$.

Figure 17:
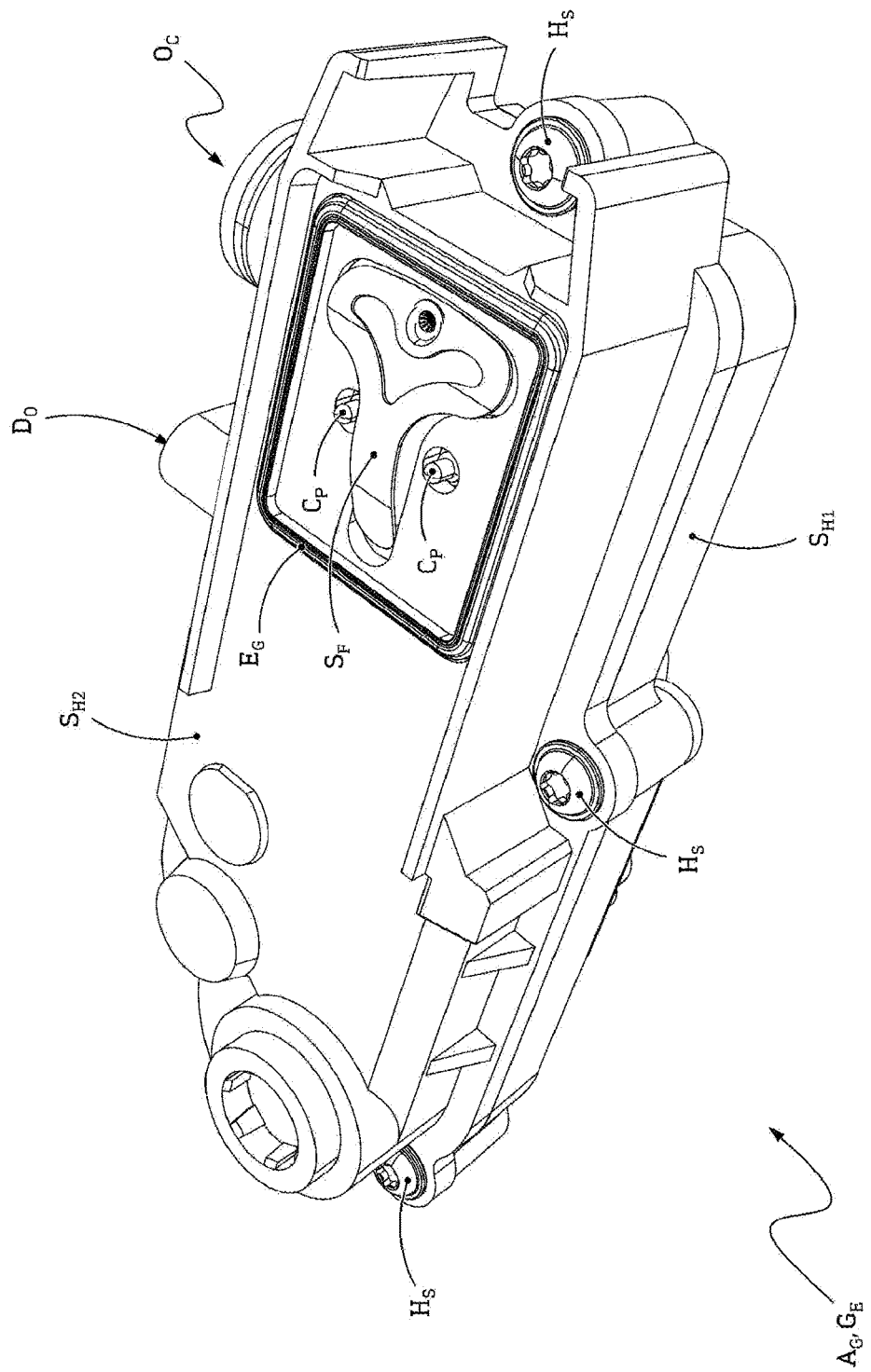
FIG. 17: shows a motor-gearbox sub-assembly according to FIG. 14 or 15 or 16 in an oblique perspective top view from inboard onto the battery contacts.
Figure 18:
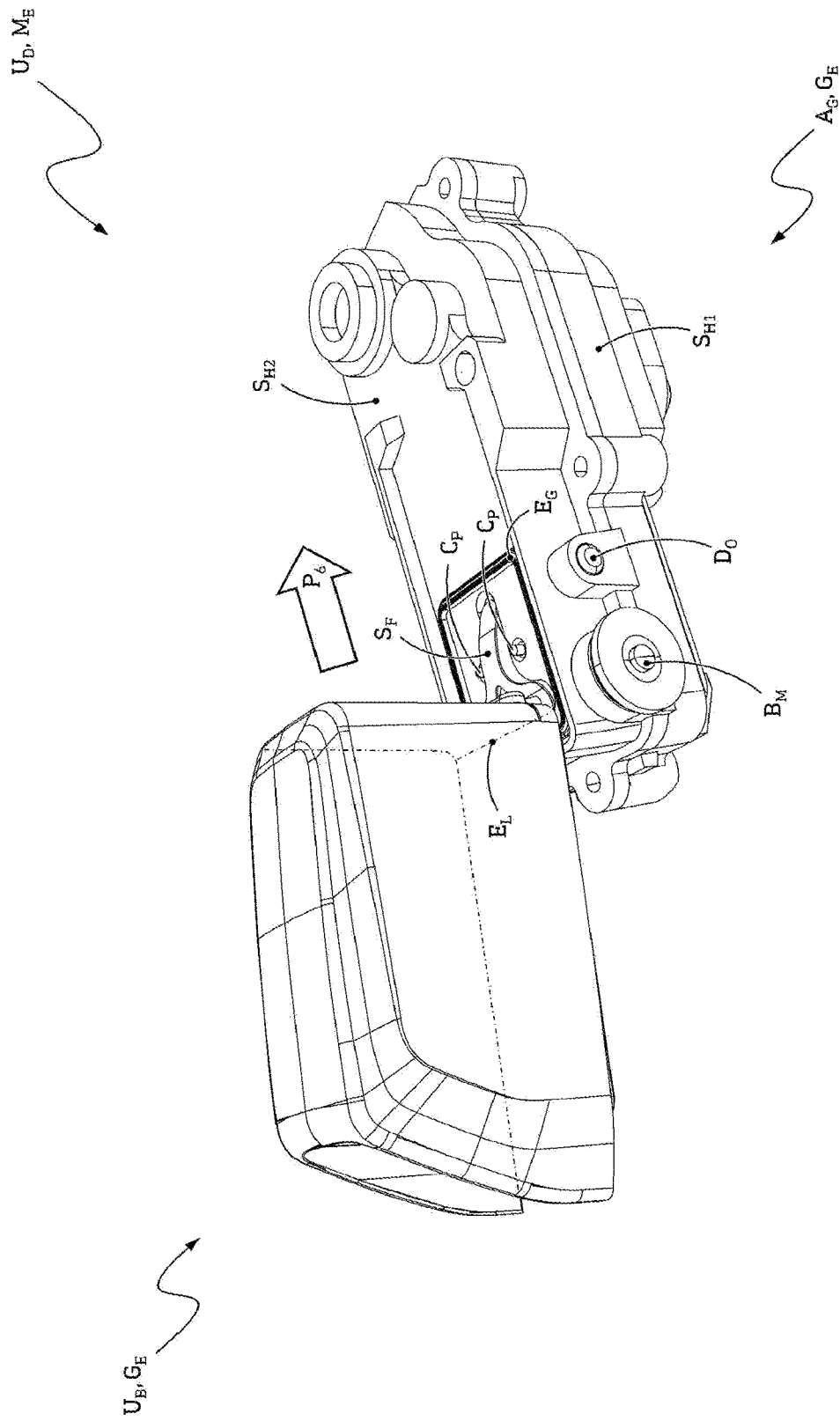
FIG. 18: shows a motor-gearbox sub-assembly according to FIG. 14 or 15 to 17 together with a battery device partially separated from the motor-gearbox sub-assembly according to FIG. 15 in an oblique perspective view from outboard.

FIGS. 17 and 18 show the motor-gearbox sub-assembly according to FIG. 14 or 15 or according to FIG. 16, respectively, in oblique perspective top views of the electrical contact device of the motor-gearbox sub-assembly, which has contact pins $C_P$ on its upper side for electrical contact between the exchangeable battery $U_B$ and the motor-gearbox sub-assembly $A_G$.

In addition to the two housing halves $S_{H1}$ and $S_{H2}$ of the motor-gearbox sub-assembly $A_G$ and the contact pins $C_P$ arranged on the upper housing half $S_{H2}$, a circumferential elastomer gasket $E_G$ can be seen, which ensures reliable protection of both the drive-side contact pins $C_P$ and the corresponding mating contact surfaces on the exchangeable battery $U_B$. The contact pins $C_P$ on the drive side are spring-loaded metal pins whose spring loading ensures reliable current transmission.

To prevent damage or bending of the contact pins $C_P$, for example by contact with the leading edge $E_L$ of the exchangeable battery $U_B$, when the battery is pushed on, which according to FIG. 18 takes place in the longitudinal direction as shown by the block arrow $P_6$, i.e. essentially horizontally in the illustrations of FIGS. 15 to 19 (see also FIG. 16), the contact pins $C_P$ are protected by a flexion spring $S_F$, which ensures that the leading edge $E_L$ of the interchangeable battery $U_B$ is slightly raised when the battery is pushed on and can thus slide over the contact pins $C_P$ without risk of bending.

When the interchangeable battery $U_B$ is finally locked by means of the latching lever $L_L$ (cf. FIG. 18), the flexion spring $S_F$ is pressed down accordingly, and the contact pins $C_P$ can contact corresponding mating contact surfaces on the underside of the interchangeable battery $U_B$ without any problems. The protection provided by the flexion spring $S_F$ for the contact pins $C_P$ against bending when the interchangeable battery $U_B$ is pushed on can also be seen particularly well in FIG. 21.

Figure 19:
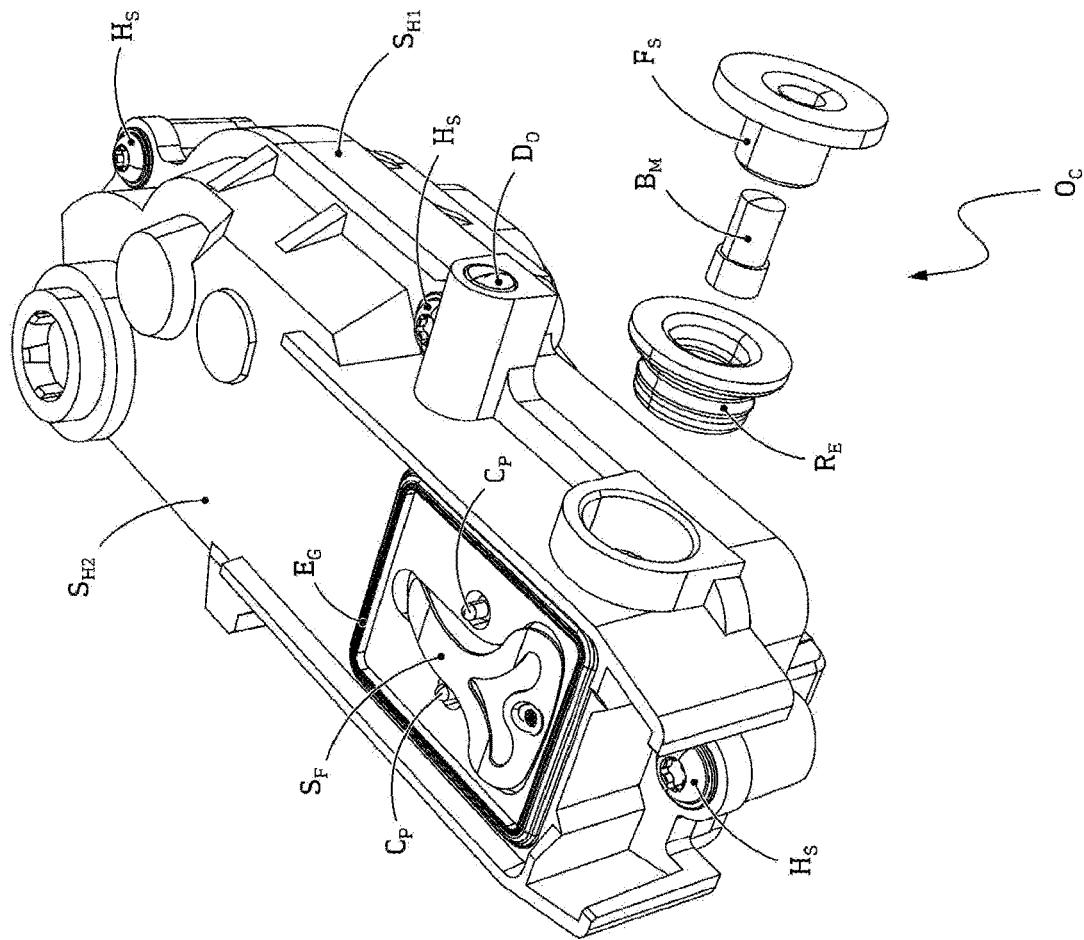
FIG. 19: shows a motor-gearbox sub-assembly according to FIG. 14 or 15 to 18 in an oblique perspective view from outboard with exploded view of an actuating element.

FIG. 19 shows the motor-gearbox sub-assembly according to FIG. 14 or FIGS. 15 to 18 in an oblique perspective view from above/outboard, with an exploded view of the actuating device $O_C$. It can be seen that the actuating device $O_C$ is characterized by the small number of only three individual parts, namely by the actuating button $B_M$, furthermore a rigid cover sleeve $F_S$ and an elastomer receptacle $R_E$. In addition to the resulting low-cost production and assembly, the individual parts $B_M$, $F_S$ and $R_E$ of the operating control $O_C$ are designed to ensure both the movable, captive enclosure of the operating control $B_M$ in the cover sleeve $F_S$ and a permanently sealed mechanical connection of the operating control $O_C$ to the housing $S_{H2}$ of the motor-gearbox sub-assembly $A_G$. This saves production and assembly costs and ensures that the operating control $O_C$ functions reliably over the long term.

Figure 20:
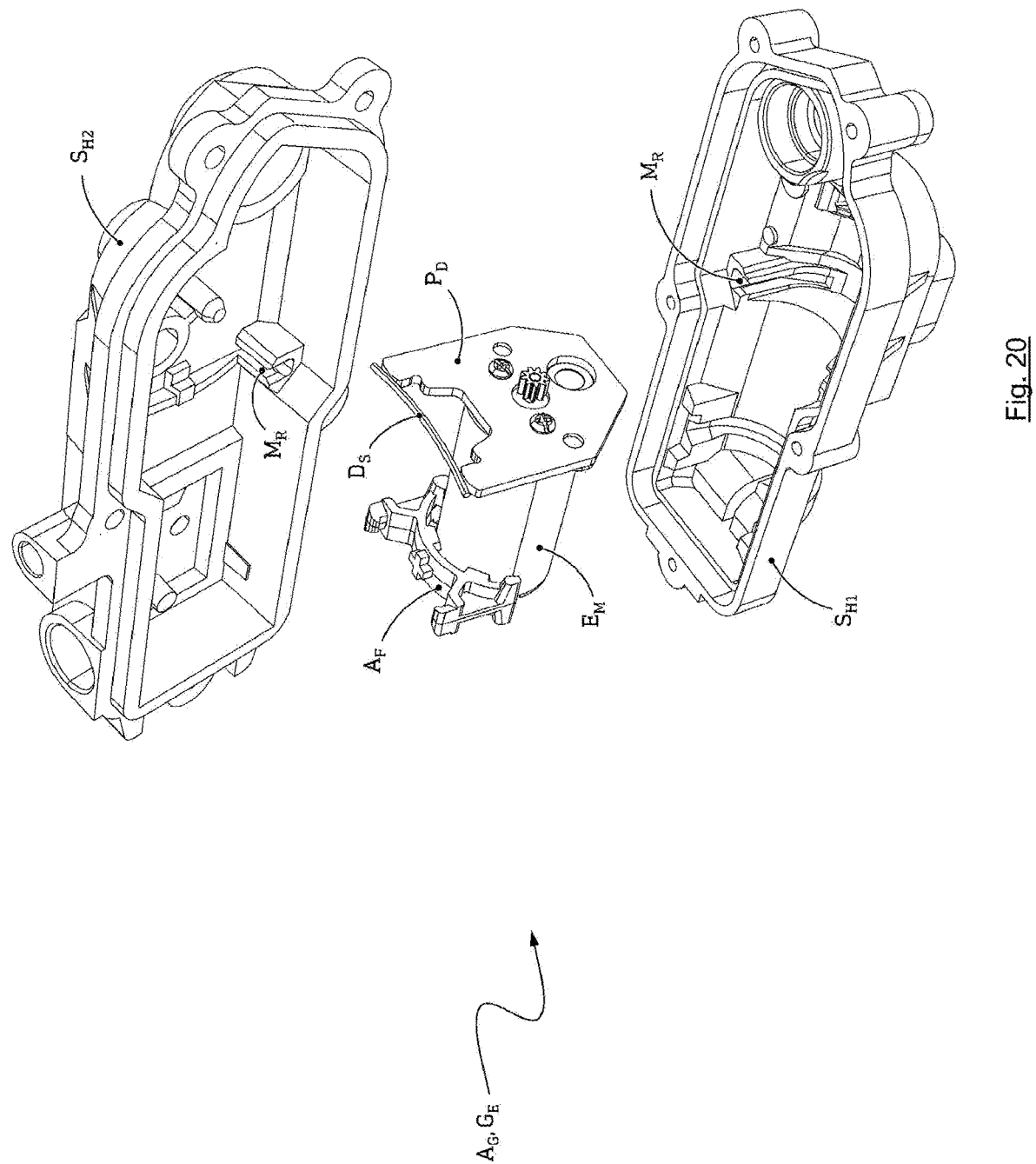
FIG. 20: shows a motor-gearbox sub-assembly according to FIG. 14 or 15 to 19 in perspective view in a partially disassembled state.

In FIG. 20, the motor-gearbox sub-assembly $A_G$ according to FIG. 14 or FIGS. 15 to 19 is shown in an oblique perspective view in a partially disassembled state. For the sake of clarity, various parts or assemblies have been omitted from the illustration in FIG. 20, in particular connecting elements between the two housing halves $S_{H1}$ and $S_{H2}$ of the motor-gearbox unit $A_G$ as well as most of the electronic and gearbox components contained in the motor-gearbox unit $A_G$.

It can be seen that the electric motor $E_M$ is mounted in the housing $S_{H1}$, $S_{H2}$ of the motor-gearbox sub-assembly $A_G$ by means of a carrier plate device $P_D$ (cf. FIG. 21), whereby the electric motor $E_M$ is first screwed to the carrier plate device $P_D$ for assembly, and then the unit comprising the electric motor $E_M$ and the carrier plate device $P_D$ is merely inserted into corresponding, essentially prismatically shaped mating receptacles $M_R$, which are molded into the two housing halves $S_{H1}$, $S_{H2}$ of the motor-gearbox sub-assembly $A_G$. A spring device $D_S$ ensures that the unit comprising the electric motor $E_M$ and the carrier plate device $P_D$ is fixed in the housing $S_{H1}$, $S_{H2}$ of the motor-gearbox sub-assembly $A_G$ in a dimensionally defined and permanently backlash-free manner.

Figure 21:
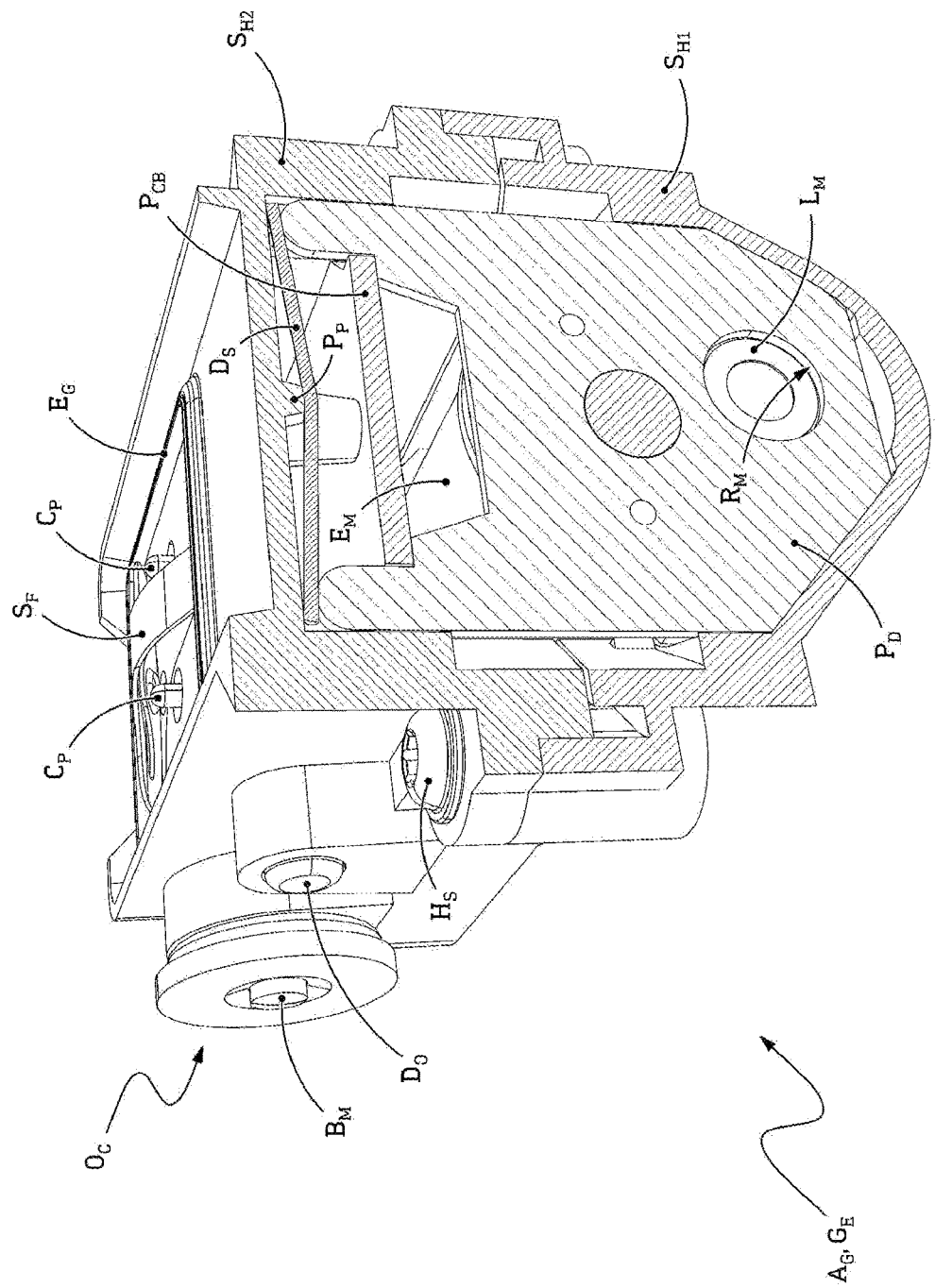
FIG. 21: shows a motor-gearbox sub-assembly according to FIG. 14 or 15 to 20 in the mounted state in a perspective cross-sectional view.

The latter can be seen particularly clearly in the illustration of FIG. 21, which shows the motor-gearbox sub-assembly $A_G$ according to FIG. 14 or FIGS. 15 to 20 in the mounted state in a sectional perspective view, in which, among other things, the carrier plate device $P_D$ and the spring device $D_S$ are shown in section. It can be seen that a push projection $P_P$ arranged in the interior of the upper housing half $S_{H2}$ pretensions the spring device $D_S$ downwards when the housing $S_{H1}$, $S_{H2}$ is closed by the housing screws $H_S$ as shown in the drawing, as a result of which the carrier plate device $P_D$ and the electric motor $E_M$ screwed to the carrier plate device $P_D$ are exactly defined in terms of their position in the gear housing $S_{H1}$, $S_{H2}$ and fixed without play. The electric motor $E_M$ is also fixed in its rear area by the auxiliary fixture $A_F$.

FIG. 21 further shows the position of the electronic circuit board $P_{CB}$, on which the components (not shown) of the electronic control of the bicycle derailleur $R_D$ are arranged.

FIG. 22 shows the motor-gearbox sub-assembly $A_G$ according to FIG. 14 or FIGS. 15 to 21 in a partially mounted state in a perspective longitudinal sectional view. Here, among other things, the upper housing half $S_{H2}$ and the majority of the gearbox components (cf. FIGS. 23 to 25) are omitted for clarity. The electrical connection line $L_C$ of the electric motor $E_M$ visible in FIG. 22 is merely symbolic with regard to the embodiments shown in the figures, since in these embodiments the control electronics $P_{CB}$ of the rear derailleur $R_D$ (cf. FIG. 21), and thus also the electrical connection line $L_C$, like the electric motor $E_M$ itself, is arranged completely in the housing of the motor-gearbox sub-assembly $A_G$.

FIG. 22 again shows the motor mounting in the gearbox housing $S_{H1}$, $S_{H2}$ by means of the carrier plate device $P_D$, as well as the design of the first two gear stages $S_{G1}$, $S_{G2}$ of the motor-gearbox sub-assembly $A_G$, in particular the bearing of the worm shaft $S_W$. This comprises two shaft bearings $B_W$, which in the embodiment shown are designed as ball bearings but can also be in the form of plain bearings, in particular sintered bearings.

The bearing arrangement shown, using two ball bearings $B_{W1}$, $B_{W2}$, is configured in the axial direction of the worm shaft $S_W$ as a locating/non-locating bearing arrangement. The drawing-related left-hand ball bearing $B_{W1}$ is fixed by means of a plate-shaped bearing seat retainer $R_B$ screwed to the lower housing half $S_{H1}$, and in the axial direction by means of an axial stop $A_W$, which is also plate-shaped and is held at the top by the bearing seat retainer $R_B$ and at the bottom in a mounting recess of the lower housing half $S_{H1}$, and by means of a housing protrusion $P_H$ of the lower housing half $S_{H1}$. In the radial direction, the left ball bearing $B_{W1}$ is clamped between the bearing seat retainer $R_B$ and the lower housing half $S_{H1}$ by means of a vertical bracket $B_V$. This way, the left ball bearing $B_{W1}$ is fixed in the lower housing half $S_{H1}$ without play both in the axial direction and in the radial direction, relative to the worm shaft $S_W$.

The drawing-related left-hand ball bearing $B_{W1}$ can, for example, form a floating bearing arrangement of the worm shaft $S_W$ in that, for example, a transition fit is selected for receiving the drawing-related left-hand bearing journal of the worm shaft $S_W$ in the bearing inner ring of the left-hand ball bearing $B_{W1}$, so that the left-hand bearing journal of the worm shaft $S_W$ can move in the axial direction relative to the left-hand ball bearing $B_{W1}$ and can thus, for example, compensate for axial stresses occurring due to tolerances or temperature changes.

The ball bearing $B_{W2}$ on the right in relation to the drawing is pressed without play in the radial direction into a mounting recess $R_M$ of the motor carrier plate device $P_D$ (cf. FIG. 3), and its position in the axial direction to the right in relation to the drawing is fixed in the embodiment shown by a second material layer $L_M$ of the motor carrier plate device $P_D$ covering the area of the ball bearing at the rear (cf. also FIG. 21). The bearing journal of the worm shaft $S_W$ on the right-hand side as shown in the drawing is, for example, pressed firmly into the bearing inner ring of the associated ball bearing $B_{W2}$, in the sense of a fixed bearing of the worm shaft $S_W$ in the axial direction.

In this way, the worm shaft $S_W$ is fixed with exactly defined dimensions relative to the gear housing $S_{H1}$ and in particular relative to the respective adjacent gear components of the two gear stages $S_{G1}$, $S_{G2}$. The maximum forces occurring in the gearbox during operation of the rear derailleur $R_D$ act to the right on the worm shaft $S_W$ due to the shift logic of the rear derailleur $R_D$ in the gearbox as shown in FIG. 22, and can thus be transmitted reliably and with minimum backlash into the transmission housing $S_{H1}$, $S_{H2}$ via the component chain "right end of worm shaft $S_W$"→"second gearwheel $S_{G1B}$ of the first gear stage $S_{G1}$"→"ball bearing $B_{W2}$"→"carrier plate device $P_D$". Alternatively or additionally, such reaction forces acting on or in the worm shaft $S_W$ to the right can also be introduced directly into the second material layer $L_M$ of the motor carrier plate device $P_D$ through a right-hand spherical end of the worm shaft $S_W$.

Simpler, less expensive designs of the gear unit can also use sintered sleeve bearings instead of the ball bearings $B_{W1}$, $B_{W2}$, for example. In this case in particular, the worm shaft $S_W$ can also be mounted axially on both sides in a floating bearing arrangement and thus axially cantilevered, with the ends of the worm shaft $S_W$, which are crowned on both sides for example, abutting either on the right side against the motor carrier plate device $P_D$ or on the left side against the axial stop $A_W$ of the bearing seat retainer $R_B$, depending on the force effect.

When considering the transmission of the bicycle derailleur $R_D$, it should also be noted that the illustrations according to FIGS. 14 to 25 are all enlarged, in some cases greatly enlarged. In the embodiment of the transmission shown, for example, the bearing journals of the worm shaft $S_W$ have a diameter of only 2 mm, which means that the bicycle derailleur $R_D$ in question clearly falls into the field of precision mechanics for the person skilled in the art.

FIG. 23 again shows the electric motor as well as the complete gearbox of the motor-gearbox sub-assembly $A_G$ according to FIG. 14 or FIGS. 15 to 22 in a perspective view without housing. The first gear stage $S_{G1}$ already described above with reference to FIG. 22 and the worm shaft $S_W$ of the second gear stage $S_{G2}$ are again visible. In the second gear stage $S_{G2}$, the worm shaft $S_W$ acts on a helical spur gear $S_{G2B}$, which acts on a spur gear $S_{G3A}$ of the third gear stage $S_{G3}$ via an overload detent coupling $C_O$ indicated schematically here. From there, the drive torque is transmitted via a fourth gear stage $S_{G4}$ comprising a stepped gear $Z_S$ with toothing $S_{G3B}=S_{G5A}$ and $S_{G4A}$ to a segmented gear $S_{G4B}$, which is pressed onto the output shaft $S_O$. As described above and shown in particular in FIGS. 6 and 13 to 15, the output shaft So drives the drive arm $A_D$ by means of a direct connection, thus driving the shifting element parallelogram $P_S$ and thus the translatory pivoting movement of the shifting element or P-knuckle $K_P$.

FIG. 23 further shows a fifth gear stage $S_{G5}$ arranged on a fifth (not shown) gear shaft with a double spur gear $S_{G5B}$. The fifth gear stage $S_{G5}$ is used for backlash-free transmission of the rotational angle position of the segment gear wheel $S_{G4B}$, thus the angular position of the drive arm $A_D$, and thus in turn of the rear derailleur parallelogram $P_S$, ultimately thus an exact transmission of the horizontal shifting position of shifting element $K_P$ and chain cage $C_G$ relative to the sprocket cassette $C_S$ of the bicycle (cf. FIGS. 1 and 3) to a corresponding angular position of the double spur gear $S_{G5B}$.

For this purpose, a magnetic component $C_M$ is accommodated, for example pressed, in the double spur gear $S_{G5B}$, which communicates its rotational position via (not drawn) magnetic field lines to an electronic magnetic field sensor $F_M$, which is fixed relative to the housing $S_{H1}$, $S_{H2}$ of the motor-gearbox sub-assembly $A_G$, for example arranged on the circuit board $P_{CB}$, which is accommodated in the gearbox housing $S_{H1}$, $S_{H2}$, cf. the electronics circuit board $P_{CB}$ shown in section in FIG. 21. Gearbox housing $S_{H1}$, $S_{H2}$ and electronics circuit board $P_{CB}$ are omitted for clarity in the illustration of FIG. 23.

Since the gear stages $S_{G4}$, $S_{G3}$ and $S_{G2}$ are generally under a force preload resulting from the spring effect of the swivel arm spring $S_{AS}$ in the direction of rotation resulting from the winding direction of the swivel arm spring $S_{AS}$ (cf. FIG. 6), any backlash of these gear stages $S_{G4}$ to $S_{G2}$ up to the corresponding stop of the tooth flanks of the helical gear $S_{G2B}$ on the corresponding mating tooth flanks of the worm shaft $S_W$ is already eliminated both at standstill and in normal operation of the rear derailleur $R_D$.

The fifth gear stage $S_{G5}$ with the double spur gear $S_{G5B}$ used for the rotational drive of the magnetic component $C_M$ thus only has to eliminate its own backlash with respect to the stepped gear $Z_S$ in order to map the swivel or horizontal position $L_P$ of the chain cage $C_G$ (cf. FIG. 3) to a corresponding angular position of rotation of the magnetic component $C_M$ with a high degree of precision and without backlash.

Figure 24:
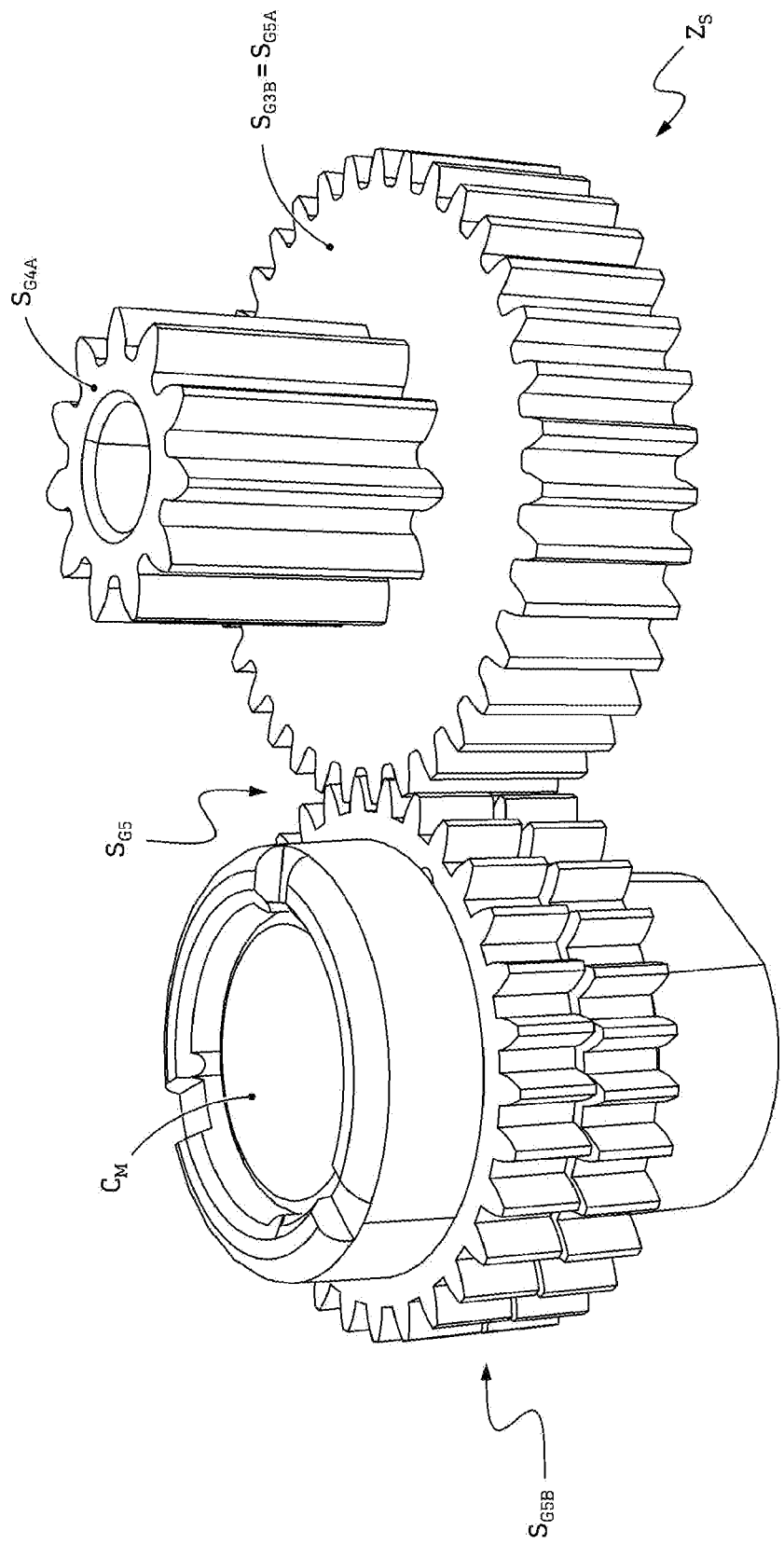
FIG. 24: shows a backlash-free gear pair of the gear unit according to FIG. 23 in perspective view.
Figure 25:
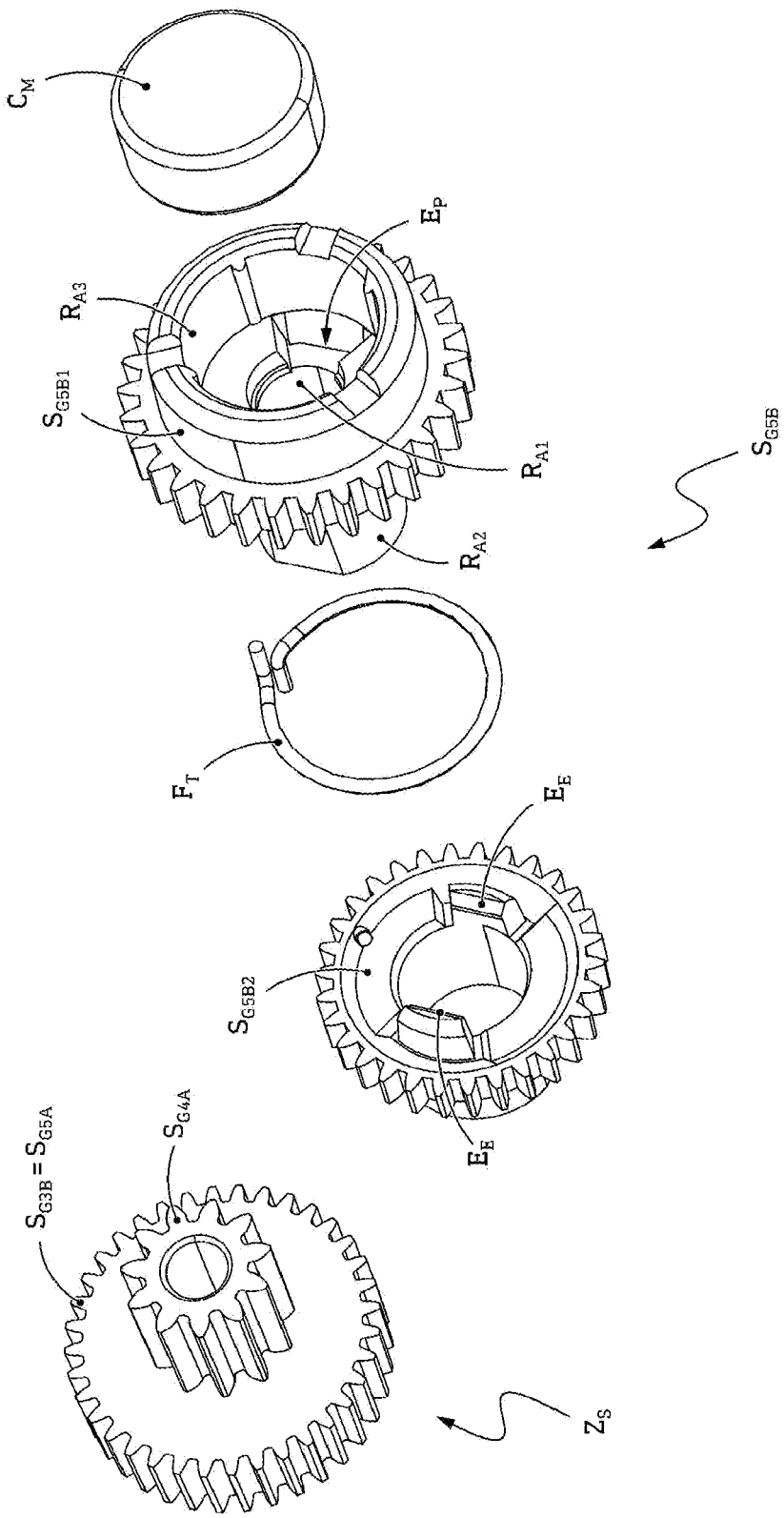
FIG. 25: shows the backlash-free gear pairing according to FIG. 24 in a perspective exploded view.

FIGS. 24 and 25 show the double helical gear $S_{G5B}$ again in a further enlarged view, whereby the stepped gear $Z_S$ is additionally shown in each case, with whose toothing $S_{G3B}=S_{G5A}$ the double helical gear $S_{G5B}$ meshes without backlash.

FIG. 25 shows the configuration of the double spur gear $S_{G5B}$ consisting of only exactly three individual parts $S_{G5B1}$, $S_{G5B2}$ and $F_T$, which comprises a main gear $S_{G5B1}$, an auxiliary gear $S_{G5B2}$ and a tensioning spring $F_T$.

The main gear $S_{G5B1}$ provides both an inner cylindrical bearing face $R_{A1}$ for rotational mounting of the double spur gear $S_{G5B}$ on an associated (not shown) fifth gear shaft, and an outer cylindrical bearing face $R_{A2}$ for rotational mounting of the auxiliary gear $S_{G5B2}$ on the main gear $S_{G5B1}$, and also an inner cylindrical bearing face $R_{A3}$, in which the magnetic component $C_M$ is press-fitted, cf. FIG. 24.

The main gear $S_{G5B1}$ and auxiliary gear $S_{G5B2}$ of the double spur gear $S_{G5B}$ are locked together with respect to their relative axial position shown in FIG. 24 by a snap-in connection $E_E$, $E_P$ by means of two elastic snap-in elements $E_E$ arranged on the auxiliary gear $S_{G5B2}$ and pointing radially inwards, in that the elastic snap-in elements $E_E$ snap into shape-corresponding, radially outward-pointing snap-in projections $E_P$ of the main gear $S_{G5B1}$ when the main gear $S_{G5B1}$ and auxiliary gear $S_{G5B2}$ are axially joined. The elastic snap-in elements $E_E$ and the shape-corresponding snap-in projections $E_P$ are shaped and their extent in the circumferential direction of the main gear $S_{G5B1}$ and auxiliary gear $S_{G5B2}$ is selected such that the main gear $S_{G5B1}$ and auxiliary gear $S_{G5B2}$ can still rotate relative to each other by a few angular degrees even in the locked state.

When main gear $S_{G5B1}$ and auxiliary gear $S_{G5B2}$ are joined, the tensioning spring $F_T$ is also received in a cavity formed by main gear $S_{G5B1}$ and auxiliary gear $S_{G5B2}$, with the two spring ends of the tensioning spring $F_T$ being received in corresponding recesses of main gear $S_{G5B1}$ and auxiliary gear $S_{G5B2}$, respectively, in such a way that the tensioning spring $F_T$ is under a certain preload which tends to rotate the main gear $S_{G5B1}$ and auxiliary gear $S_{G5B2}$ relative to one another.

This preload or spring-loaded relative rotation of main gear $S_{G5B1}$ or $S_{G5B2}$ ensures that, in the case of the gear pair $S_{G5}$ between the double spur gear $S_{G5B}$ and the stepped gear $Z_S$ meshing with it, not only one of the two tooth flanks of the gear pair $S_{G5}$ is in contact with the corresponding mating flank of the other gear, but that both tooth flanks of this gear pair $S_{G5}$ are in contact with each other, eliminating the backlash. In this way, an exact and backlash-free mapping of the horizontal position $L_P$ of the chain cage $C_G$ of the bicycle derailleur $R_D$ (cf. FIG. 3) to a corresponding rotational angle position of the double spur gear $S_{G5B}$ and thus of the magnetic component $C_M$ is ensured.

As can be seen in particular from the illustration in FIG. 23, the electronic control of the rear derailleur, which in an embodiment is located on the circuit board $P_{CB}$ in the transmission housing $S_{H1}$, $S_{H2}$ (cf. FIG. 21), knows the exact horizontal or swivel position $L_P$ of the chain cage $C_G$ at all times (cf. FIG. 3). Since the overload clutch $C_O$ of the gear unit according to FIG. 23 is arranged between the stepped gear $Z_S$ and the worm gear stage $S_{G2}$, this also applies in principle if the shift position $L_P$ of the rear derailleur $R_D$ should be adjusted by strong external forces, for example in the event of a fall or by hitting an obstacle.

In such a case, the electronic control $P_{CB}$ of the rear derailleur $R_D$ can, after a short pause or triggered by the user, be moved again exactly to the previously assumed shift position $L_P$, or also to any other desired gear or shift position, without any loss of shifting precision being associated with the previously occurring, adjustment of the rear derailleur $R_D$ by massive external forces.

FIGS. 26 to 30 show a further embodiment of a bicycle rear derailleur $R_D$ according to the present disclosure. As can be seen from FIGS. 26 to 28, this rear derailleur $R_D$ has a cover element $E_{BC}$ which can also be easily replaced by the user and in an embodiment is made of a polymer material. In the embodiment shown, the cover element $E_{BC}$ is penetrated by the button $B_M$ of the operating control $O_C$, which is used for the selection of certain operating modes of the electric rear derailleur $R_D$ by the user. In the embodiment shown, the cover element $E_{BC}$ is connected to the structure of the base element $K_B$ by means of snap-in elements formed by elastic rear grips, which can be seen in particular in FIG. 28, and is additionally secured by means of a retaining screw $R_S$, which in the embodiment shown can be screwed into a lower component of the base element $K_B$.

The cover element $E_{BC}$ is shaped and arranged in such a way that it can absorb the typical damage that frequently occurs to bicycle rear derailleurs $R_D$ during operation, for example due to falls, due to the bicycle falling over or due to contact with obstacles such as tree branches, roots or stones during sporting use, and thus protect the other parts of the rear derailleur $R_D$, in particular metallic parts, painted or polished parts or high-quality plastic parts, for example made of fiber composites, such as carbon materials, from such damage. In this way, proper functioning and a high-quality appearance of the bicycle rear derailleur $R_D$ can be preserved for a longer period of time or permanently, and in the event of damage, the cover element $E_{BC}$, in particular by the end user himself, can be easily replaced.

Likewise, it is possible and intended to provide cover elements $E_{BC}$ made of varied materials, with different shaping, with different surface design or with additional functions, such as tool receptacles, etc. In this way, the user can upgrade the bicycle rear derailleur $R_D$ again even after a longer period of time or, similar to the replacement of other modules or sub-assemblies described in the present disclosure, upgrade to a higher-quality version of the rear derailleur $R_D$.

In this way, resources can be saved again, the service life of the bicycle derailleur $R_D$ can be increased and the reparability by the end customer himself or by specialist workshops is facilitated and improved.

Figure 26:
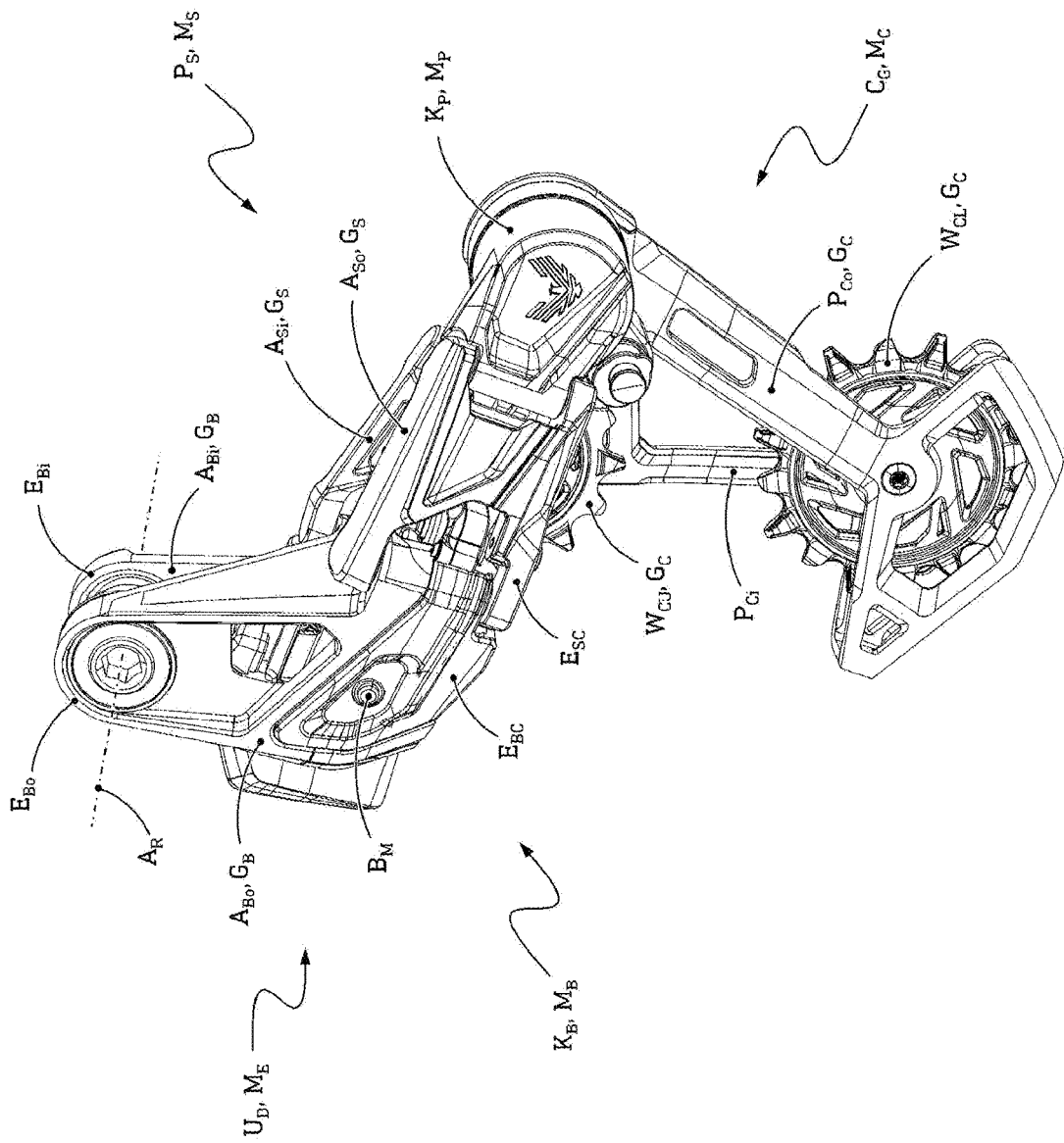
FIG. 26: shows another embodiment of a bicycle derailleur in an oblique side view enlarged with respect to FIG. 1.
Figure 27:
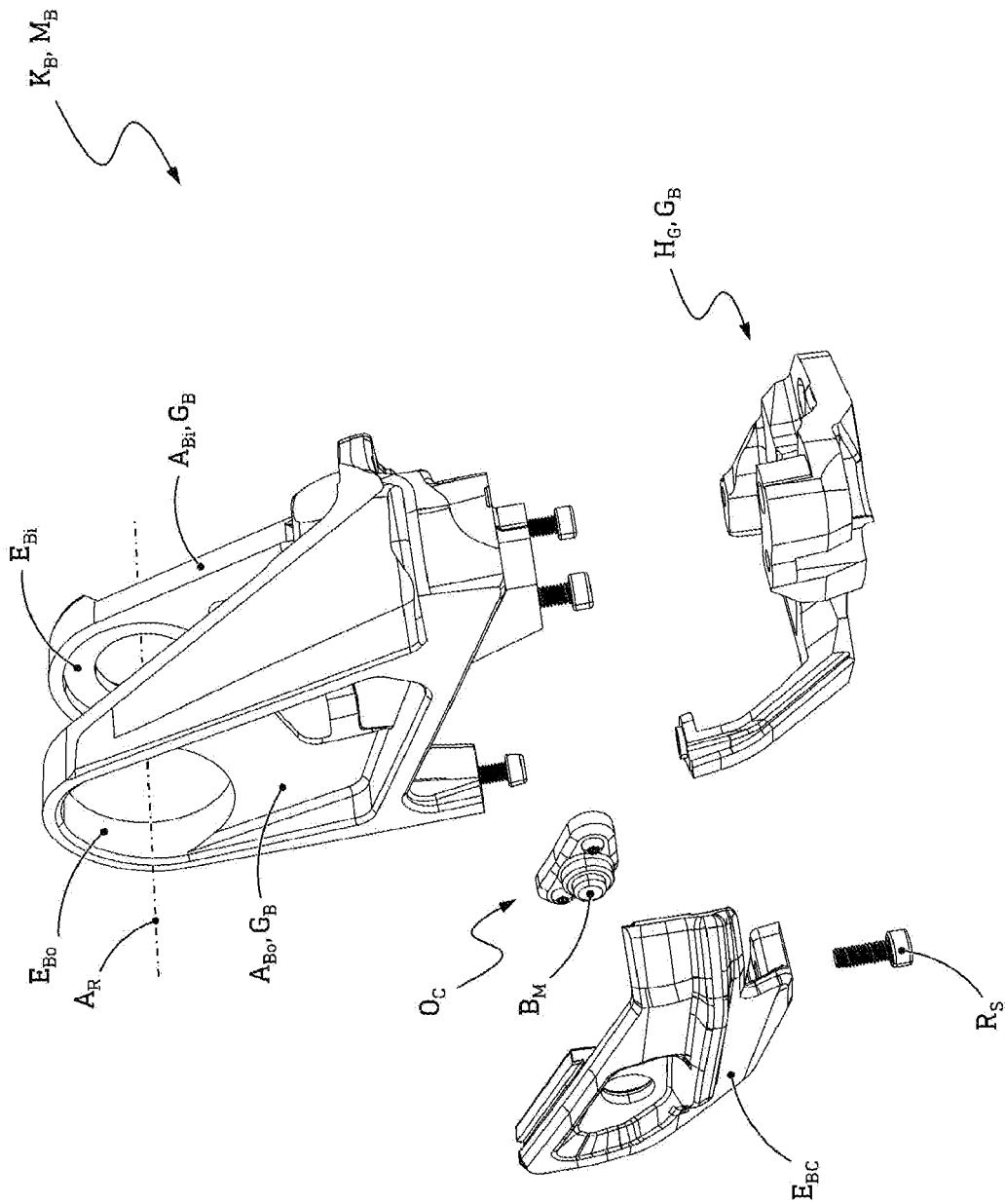
FIG. 27: shows a base element or B-knuckle of the bicycle derailleur according to FIG. 26 in a perspective exploded view diagonally from outboard.
Figure 28:
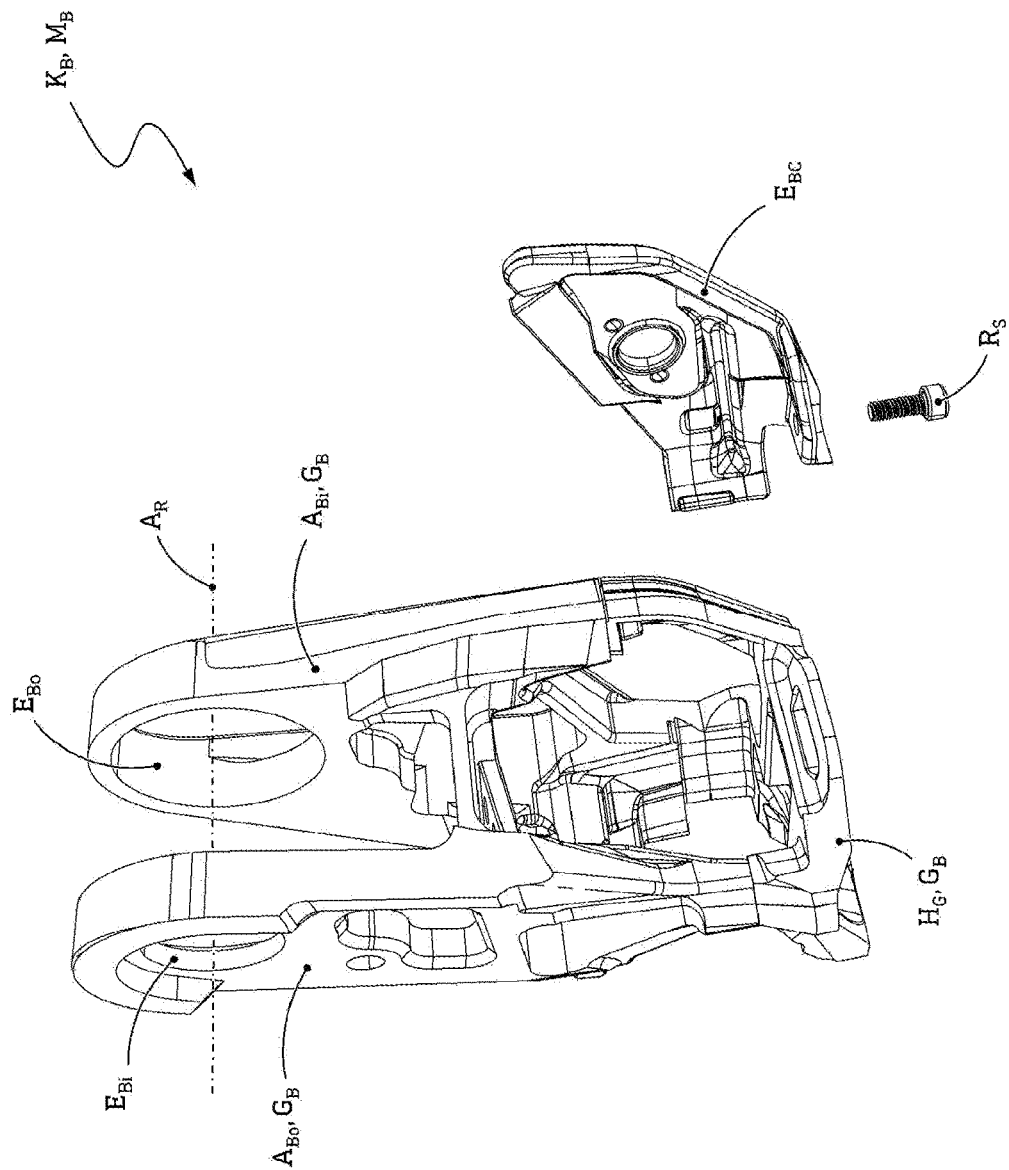
FIG. 28: shows the base element or B-knuckle according to FIG. 27 in a perspective view diagonally from inboard.
Figure 29:
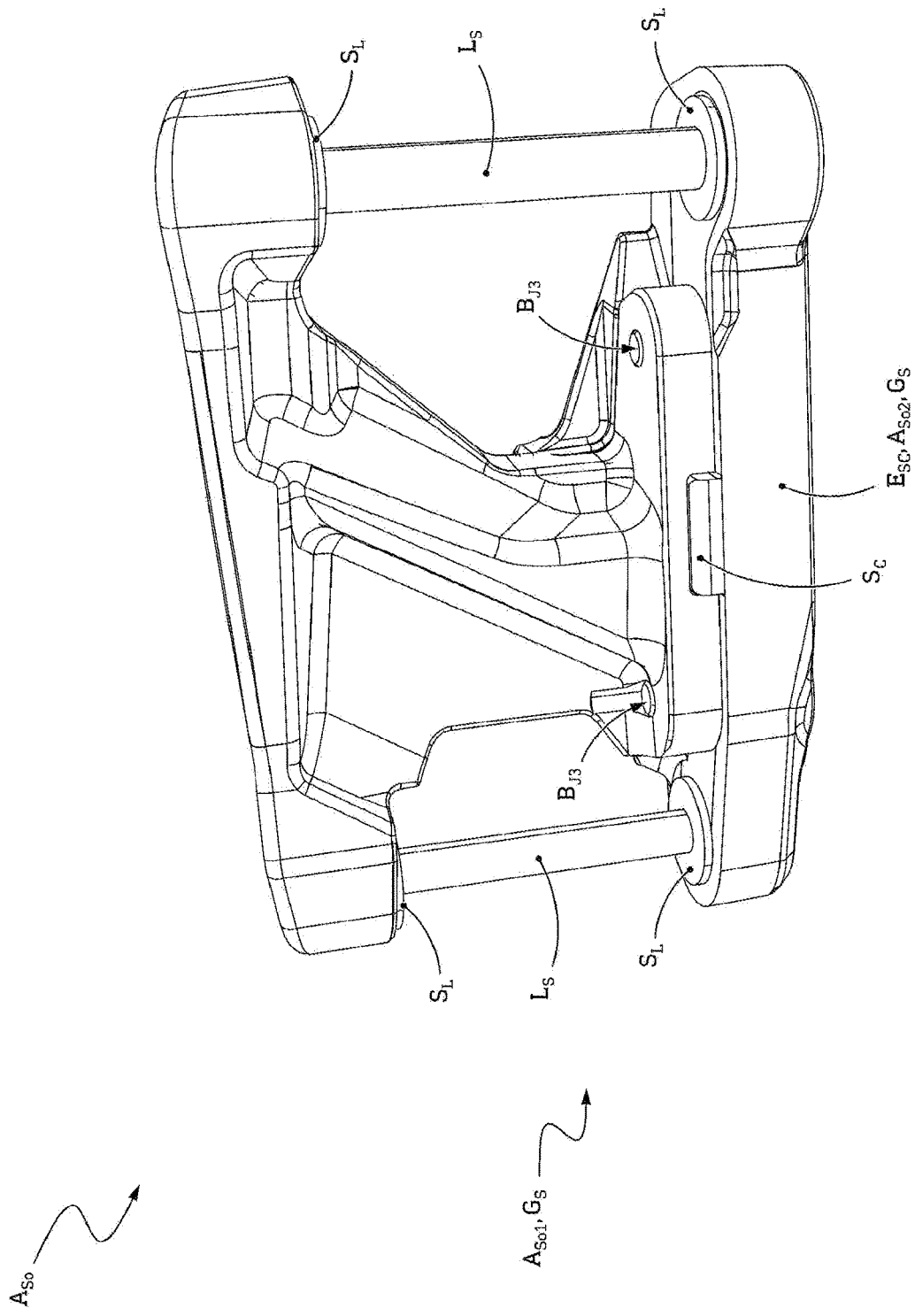
FIG. 29: shows a swivel arm or parallelogram arm of the rear derailleur according to FIGS. 26 to 28 in perspective view from inboard.
Figure 30:
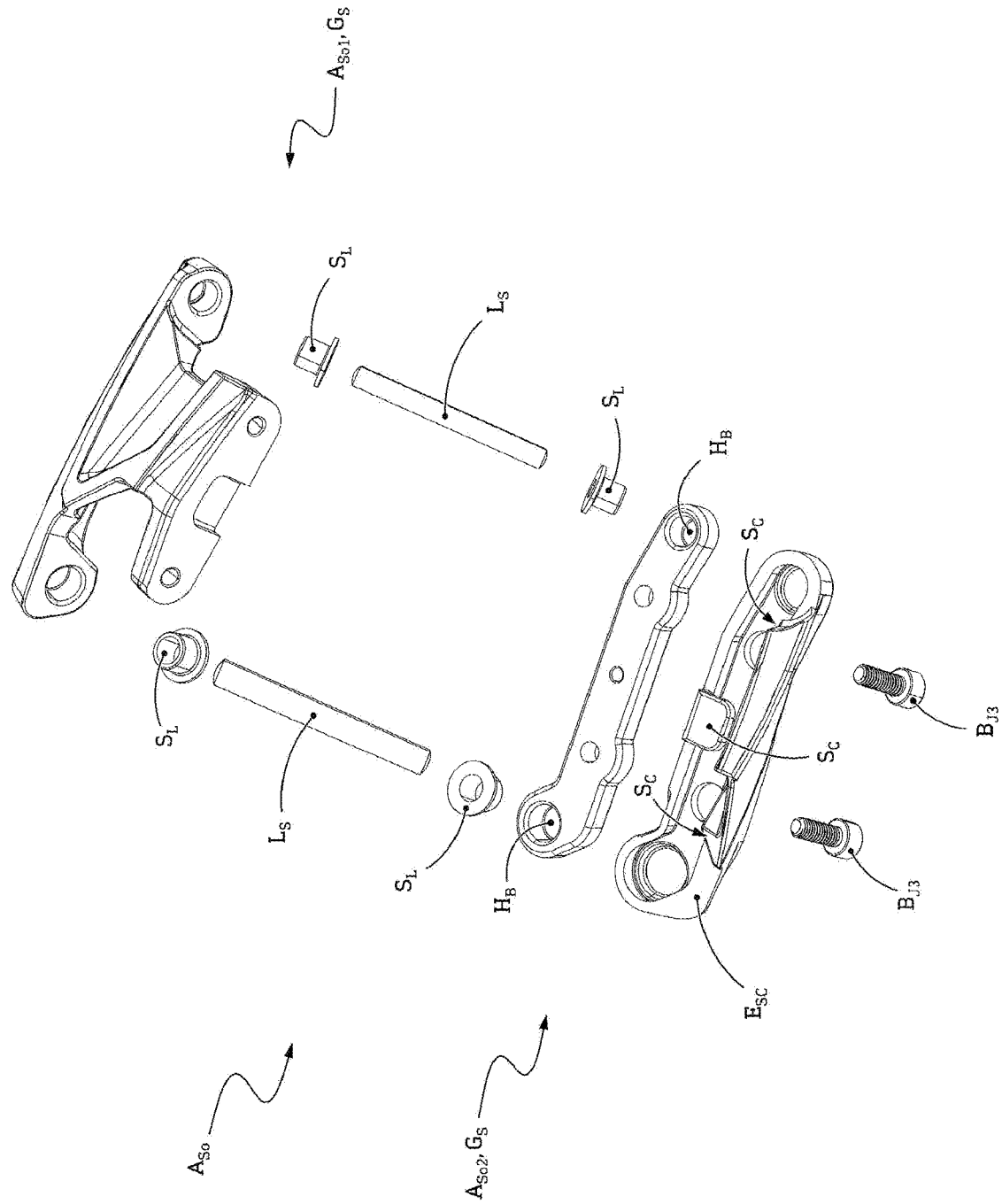
FIG. 30: shows the swivel arm or parallelogram arm according to FIG. 29 in a disassembled exploded view from inboard.

FIG. 29 shows an outer swivel arm or parallelogram arm $A_{So}$ of the rear derailleur $R_D$ according to FIGS. 26 to 28 in perspective view from inboard, while the parallelogram arm $A_{So}$ in FIG. 30 is shown in a disassembled exploded view.

The parallelogram arm $A_{So}$ of the rear derailleur $R_D$ according to FIGS. 26 to 28 shown in FIGS. 29 and 30 is initially of similar structure as the parallelogram arm $A_{So}$ described above with reference to FIG. 12. The parallelogram arm $A_{So}$ according to FIGS. 29 and 30 is also essentially composed of two parts, swivel arm sub-assemblies $A_{So1}$ and $A_{So2}$, and further comprises link pins $L_S$ accommodated in bearing sleeves $S_L$.

The swivel arm sub-assemblies $A_{So1}$ and $A_{So2}$ are connected or bolted together by means of two connecting bolts $B_{J3}$. The lower swivel arm sub-assembly $A_{So2}$ again has a cover element $E_{SC}$ protecting the parallelogram arm, or swivel arm $A_{So}$, which can be connected to the lower swivel arm sub-assembly $A_{So2}$ by means of undercuts and/or snap connections $S_C$, similar to FIG. 13. The cladding element $E_{SC}$ protects the other (and in an embodiment metallic) components of the parallelogram arm $A_{So}$ from damage and can be easily replaced in the event of damage or wear, in particular also by the end user.

In contrast to the parallelogram arm $A_{So}$ shown in FIGS. 11 to 13, which can be removed without tools from the rear derailleur $R_D$ according to FIG. 13, the parallelogram arm $A_{So}$ according to FIGS. 29 and 30 must first be removed from the rear derailleur $R_D$ by loosening the joining bolts $B_{J3}$ and separating the upper swing arm sub-assembly $A_{So1}$ from the lower swing arm $A_{So2}$, since the parallelogram arm $A_{So}$ according to FIGS. 26 and 30 does not have through holes $H_T$ for the link pins $L_S$ in its lower swing arm sub-assembly $A_{So2}$, as does the parallelogram arm $A_{So}$ according to FIGS. 11 to 13, but is provided with blind holes $H_B$ at this position.

FIG. 31 shows a shifting element or P-knuckle $K_P$ of a rear derailleur $R_D$ according to FIG. 2 or according to FIG. 26, whereby according to FIG. 31 the spring/damper device $D_P$ of the rear derailleur $R_D$ is removed from the receptive housing $R_H$ of the shifting element $K_P$.

Figure 32:
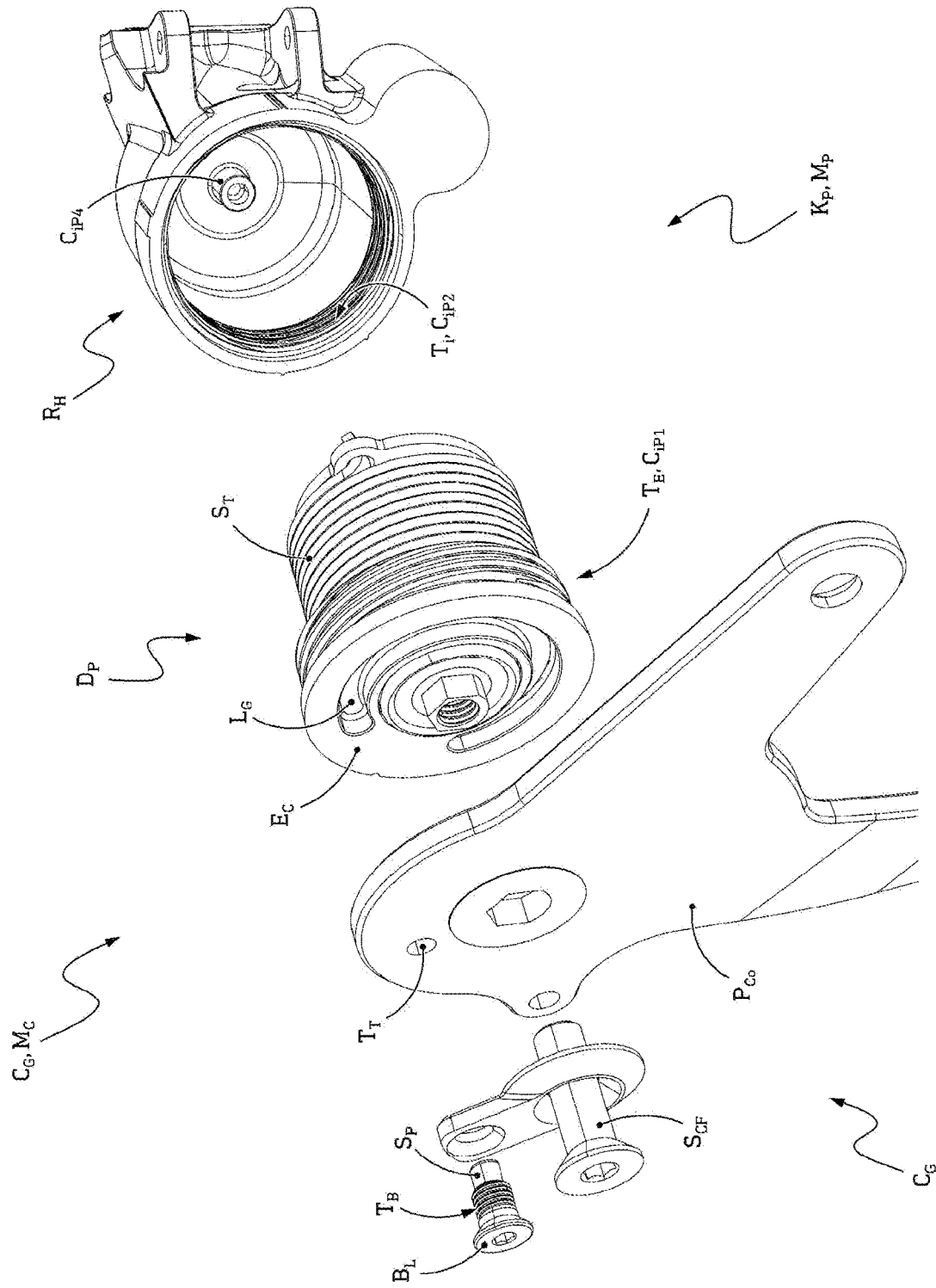
FIG. 32: shows a chain cage guide plate device and spring/damper device screwed out of the receptive housing of the base element similar to FIG. 31 in an exploded view.

In the rear derailleurs according to the present disclosure, the spring/damper device $D_P$, as shown in FIG. 31, is present as a module that can be handled or removed in one piece, which is also shown, for example, in FIGS. 7 and 32. In another embodiment, the spring/damper device $D_P$ is designed together with the chain cage device $C_G$ as an sub-assembly that can be handled as a single piece, which corresponds to the spring/damper device $D_P$ in FIG. 7, which is drawn in dashed lines and provided with bracketed reference signs.

This makes it considerably easier to unscrew the spring/damper device $D_P$ from the receptive housing $R_H$ of the base element $K_B$ due to the large lever arm formed by the chain cage device $C_G$. For this purpose, among others, the chain cage device $C_G$ has a limit stop bolt $B_L$ protruding in the inboard direction or in the direction of the spring/damper device (cf. FIG. 7 and FIG. 33), which is inserted into a stop groove $L_G$ visible in FIGS. 6, 7 and 33, and thus permits torque transmission from the chain cage device $C_G$ to the spring/damper device $D_P$ for the purpose of unscrewing the spring/damper device $D_P$ from the receptive housing $R_H$.

This means that the spring/damper device $D_P$ can also be removed without tools from the receptive housing $R_H$ of the base element $K_B$, for example in order to be able to repair or replace the spring/damper device $D_P$ in the event of damage. Furthermore, it is also possible and intended with regard to the spring/damper device $D_P$ to provide spring/damper devices $D_P$ with different functional characteristics which can be acquired by the customer optionally or as a spare part and exchanged with one another or with a respective existing spring/damper device $D_P$, for example, in the sense of an upgrade of their bicycle derailleur $R_D$. In particular, this refers to spring/damper devices $D_P$ with, for example, a mechanical friction damper on the one hand and a higher-quality hydraulic damper on the other, or with mechanical friction dampers of different construction, weight and quality.

The torque transmission from the chain cage device $C_G$ to the spring/damper device $D_P$ for the purpose of unscrewing the spring/damper device $D_P$, together with the chain cage device $C_G$, from the base element housing $R_H$ using the chain cage device $C_G$ as a torque-generating handle is again shown in FIG. 32. The limit stop bolt $B_L$ can be seen, which is screwed by means of its bolt thread $T_B$ into a corresponding through-hole thread $T_T$ of the outer chain cage guide plate device $P_{Co}$ in such a way that the end of the limit stop bolt $B_L$, which is designed as a stop peg $S_P$, engages in the stop groove $L_G$ when the outer chain cage guide plate $P_{Co}$ is connected to the damper module $D_P$ by means of a cage fastening screw $S_{CF}$.

Thus, by rotating the chain cage device $C_G$ by hand in an anticlockwise direction, a sufficiently high torque can be applied to the cover element $E_C$ via the end of the stop pin $B_L$ designed as a stop peg $S_P$ and via the upper end of the stop groove $L_G$ shown in FIG. 32 in relation to the drawing, in order to be able to unscrew it from the base element housing $R_H$ by means of the thread $T_E$. Screwing in is conducted in the same way, although in this case the torque is transmitted via the end of the limit stop bolt $B_L$, which is designed as a stop peg $S_P$, and via the lower end of the stop groove $L_G$ as shown in FIG. 32.

Figure 33:
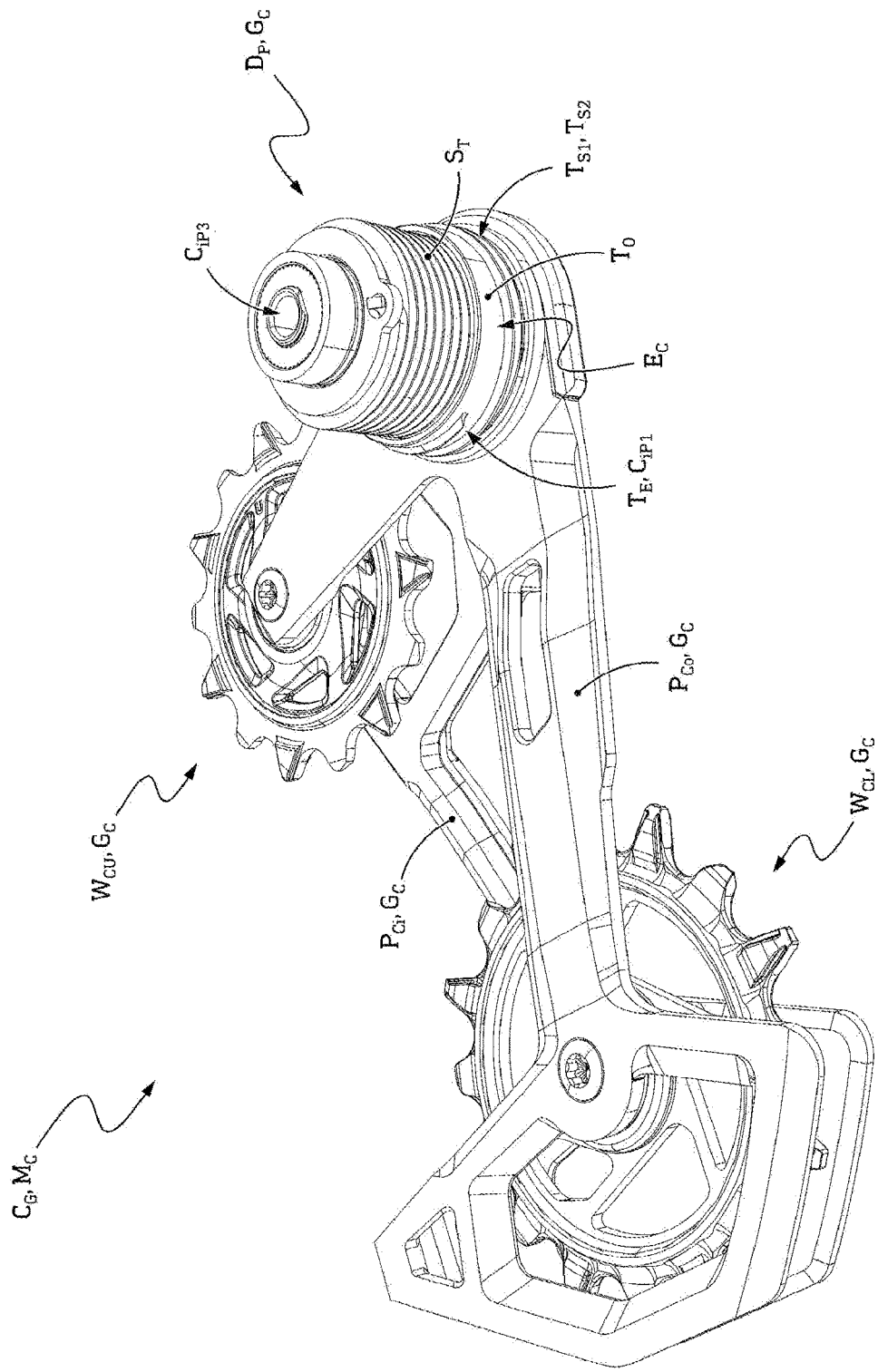
FIG. 33: shows a chain guiding device and spring/damper device of the rear derailleur according to FIGS. 26 to 28 as a module that can be handled as a single piece.

After unscrewing, the chain guiding device module $M_C$ including the spring/damper device $D_P$ is available as a module that can be handled as a single piece, as shown in FIG. 33. Due to the design of the spring/damper device $D_P$, the cage spring $S_T$ remains tensioned and adjusted unchanged, as does the damper device arranged radially inside the cage spring $S_T$ and not visible in the figures. The design and function of the spring/damper device $D_P$ are not the subject of the present disclosure but can be found in other patent applications of the applicant, for example the German patent application DE1020209370A1.

As can be seen in FIGS. 31 to 34, the spring/damper device $D_P$ is connected to the receptive housing $R_H$ of the base element $K_B$ by means of a multi-start thread $T_E$, $T_i$. In the embodiment shown, the thread is a three-start thread $T_E$, $T_i$, which can be seen in particular in the illustration of FIG. 34, which shows a view of the inside of the receptive housing $R_H$ of the base element $K_B$, with the spring/damper device removed.

By looking at FIGS. 31, 33 and 34 together, a distinctive feature of the three-start thread $T_E$, $T_i$ of the embodiment shown becomes clear. In the three-start thread $T_E$, $T_i$, one of the screw threads has been omitted in the thread area $T_O$ of both the external thread $T_E$ and the internal thread $T_i$. In other words, this means that the remaining two screw threads $T_{S1}$ and $T_{S2}$ of the here actually three-thread pairing $T_E$, $T_i$ are not evenly spaced from each other both in the axial direction according to FIG. 31 and in the circumferential direction according to FIG. 32, in each case with reference to the pivot axis $A_P$ of the chain cage device $C_G$ (cf. FIG. 2, 3 or 6).

Advantageously, this means that the thread pair $T_E$, $T_i$ cannot be screwed into one another in the three different rotational relative positions 120 angular degrees apart, which are usual for a three-start thread, but only in one rotational relative position, which is the correct rotational relative position of spring/damper device $D_P$ and receptive housing $R_H$ of the base element $K_B$ provided for in the design. In this way, incorrect assembly of the chain guiding device module $M_C$ with the spring/damper device $D_P$ arranged thereon can be reliably avoided.

FIG. 35 shows three differently constructed spring/damper devices $D_{P1}$, $D_{P2}$, $D_{P3}$ for a modular rear derailleur $R_D$ similar to FIG. 2 or FIG. 26. The components shown in FIG. 35 are at least partially drawn schematically and not to scale. In the illustration of FIG. 35, the spring/damper devices $D_{P1}$, $D_{P2}$, $D_{P3}$ are installed in three receptive housings $R_{H1}$, $R_{H2}$, $R_{H3}$ which are also differently constructed or shaped. The various spring/damper devices $D_{P1-3}$ can be different damper modules such as, for example, dampers with belleville washer spring $W_B$ and roller freewheel $R_F$ (FIG. 35 center), dampers with directionally damping wrap springs $W_S$ (FIG. 35 left and right) or hydraulic dampers (not shown).

In accordance with the at least two-level hierarchical modular construction system $M_{CS}$ according to the present disclosure, the three different spring/damper devices $D_{P1}$, $D_{P2}$, $D_{P3}$ are present in the form of modularly interchangeable and one-piece manageable (cf. FIGS. 31 and 32) sub-assemblies G, in this case of three (P1-P3) first (G1) sub-assemblies $G1_{P1}$, $G1_{P2}$, $G1_{P3}$, which are assigned (P) to the shifting element module $M_P$, cf. the overview of the modular system $M_{CS}$ in FIG. 7 with the shifting element module $M_P$ at the top left, which also shows a spring/damper device $D_{P1}$ as the first sub-assembly $G1_P$ of the shifting element module $M_P$.

As shown in FIG. 7, in the embodiment of the modular system $M_{CS}$ shown there, the shifting element module $M_P$ includes a spring/damper device $D_P$ and a receptive housing $R_H$ as sub-assemblies $G_P$ of the module $M_P$. Both the spring/damper device $D_P$ and the receptive housing $R_H$ can be handled as a single piece, cf. FIGS. 31 and 32.

Furthermore, according to FIG. 35, both the three spring/damper devices $D_{P1}$, $D_{P2}$ and $D_{P3}$, and the three receptive housings $R_{H1}$, $R_{H2}$, and $R_{H3}$ form respective sub-assembly families $S_{C1}$, $S_{C2}$ of the shifting element module $M_P$, cf. analogously the family $S_B$ comprising two family members $S_{B1}$, $S_{B2}$ according to FIG. 7 from first sub-assemblies $G1_{B1}$, $G1_{B2}$ of the base element module $M_B$.

In FIG. 35, the two sub-assembly families $S_{C1}$, $S_{C2}$ of the shifting element module $M_P$, which corresponds to the P-knuckle or shifting element $K_P$ of the rear derailleur $R_D$, are framed with dotted lines ($S_{C1}$) or marked for display purposes ($S_{C2}$) in accordance with the representation of the sub-assembly family $S_B$ in FIG. 7.

After FIG. 7, FIG. 35 thus shows a further example of the at least two-level hierarchical modular construction system $M_{CS}$ according to the present disclosure. In the embodiment example according to FIG. 35, the first stage of the hierarchical two-level modularity lies in the modules $M_{P1}$, $M_{P2}$ and $M_{P3}$, which can be handled as a single piece and are interchangeable with one another and contain three different B-knuckles or circuit elements $K_{P1}$, $K_{P2}$ and $K_{P3}$ with identical interfaces $C_{CP}$ to neighboring modules across modules (cf. FIG. 7), and thus form a module family $F_P$ (with regard to the one-piece or one-piece manageability of the circuit elements $K_P$ or circuit element modules $M_P$, cf. FIG. 7, FIGS. 31 and 32). The circumference of the module family $F_P$, here comprising the one-piece manageable and interchangeable p-knuckle or circuit element modules $M_{P1}$, $M_{P2}$ and $M_{P3}$, is visualized in FIG. 35 by the thicker dashed line $F_P$.

The second stage of the at least two-level hierarchical modularity of the modular construction system $M_{CS}$ is realized with the three (P1-P3) first (G1) shifting element (P) sub-assemblies $G1_{P1}$, $G1_{P2}$ and $G1_{P3}$, which can also be handled as a single piece and are interchangeable with one another in a modular manner, or with the three (P1-P3) second (G2) shifting element (P) sub-assemblies $G2_{P1}$, $G2_{P2}$ and $G3_{P3}$, which respectively form spring/damper devices $D_P$ and receptive housings $R_H$ of a shifting element module $M_P$ (with regard to the one-piece or one-piece manageability also of the spring/damper devices $D_P$ and the receptive housings $R_H$, cf. again FIG. 7, FIGS. 31 and 32).

With the interfaces $C_{iP1}$, $C_{iP2}$, $C_{iP3}$, $C_{iP4}$ (cf. FIGS. 31 to 34), which are identical across modules, to the respective neighboring modules $G_P$ of the same module $M_P$ (cf. FIG. 7 and FIGS. 31 to 34) and with identical interfaces $C_{CP1}$, $C_{CP2}$ (cf. FIG. 7) and $C_{CP3}$ to the neighboring modules $M_S$ and $M_C$, the sub-assemblies $G1_{P1-3}$ and $G2_{P1-3}$ form two sub-assembly families $S_{C1}$ and $S_{C2}$ within the shifting element module $M_P$.

Thus, in the embodiment according to FIG. 35, three different spring/damper devices $D_{P1}$, $D_{P2}$, $D_{P3}$ and three different base element receptive housings $R_{H1}$, $R_{H2}$, $R_{H3}$ are available, which can be interchanged or combined with each other in any modular way within the shifting element module $M_P$, which already leads to nine different possible combinations and thus different versions of the shifting element module $M_P$. The same applies to the other base element modules $M_B$, swivel formation module $M_S$, chain guiding device module $M_C$ and electric module $M_E$ (see FIG. 7).

It can thus be seen that due to the at least two-level hierarchical modularity of the rear derailleur $R_D$ or the modular construction system $M_{CS}$ according to the present disclosure, a large number of variants of the rear derailleur $R_D$ can be formed, whereby rear derailleurs with a wide variety of product properties and -capabilities as well as with a wide variety of material and surface qualities can be represented in a simple manner. This allows the rear derailleur $R_D$ to be modularly adapted as freely as possible to the requirements of a wide variety of market segments and customer groups.

The desired ease of repair of the rear derailleur $R_D$ is also realized in this way. It is no longer necessary to replace the entire rear derailleur if a module or sub-assembly is damaged or defective, but the corresponding module or sub-assembly can be repaired or replaced very easily by a wide range of user groups, including the end customer. Likewise, the customer or an owner of such a rear derailleur $R_D$ can equip their rear derailleur with additional functions or higher-quality sub-assemblies G or modules M as required without having to replace the entire rear derailleur. This leads to a considerably lower overall consumption of materials and resources during the life cycle of the rear derailleur $R_D$, which can be extended almost indefinitely in this way.

Figure 36:
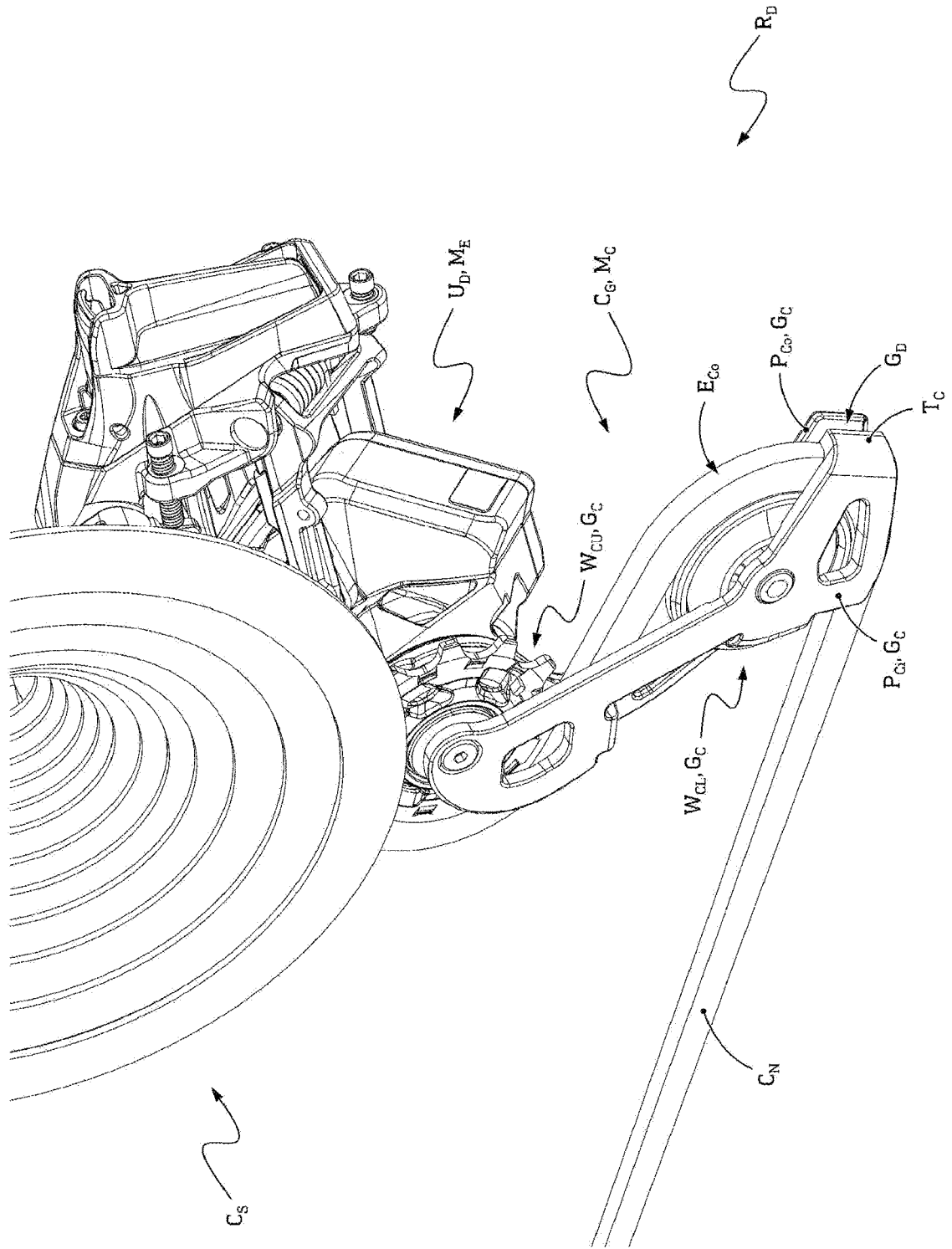
FIG. 36: shows another embodiment of a bicycle derailleur in a rear perspective view from inboard, with a chain tensioning pulley without teeth and associated chain cage.
Figure 38:
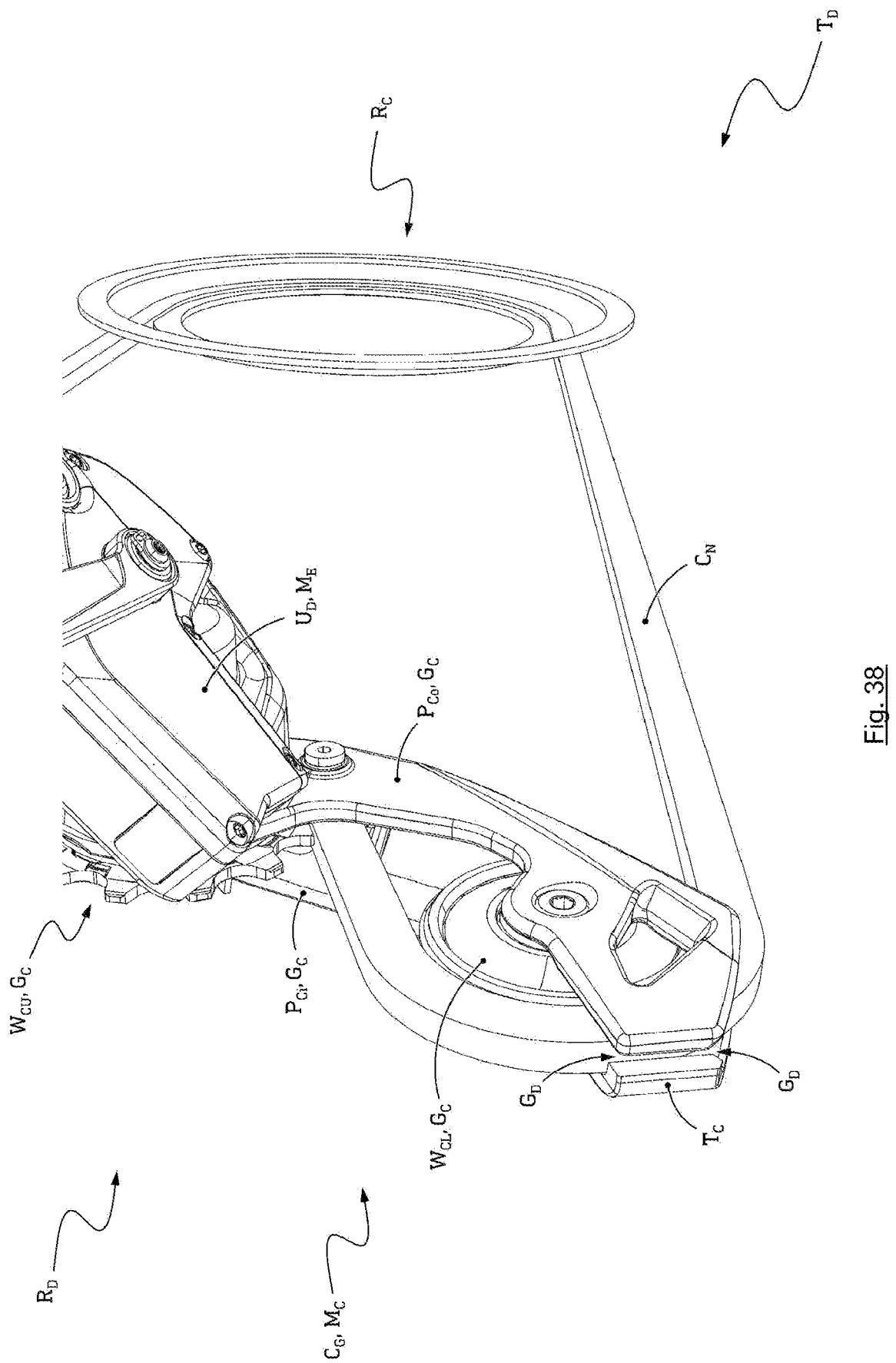
FIG. 38: shows the bicycle derailleur according to FIG. 36 in a rear perspective view from outboard.
Figure 39:
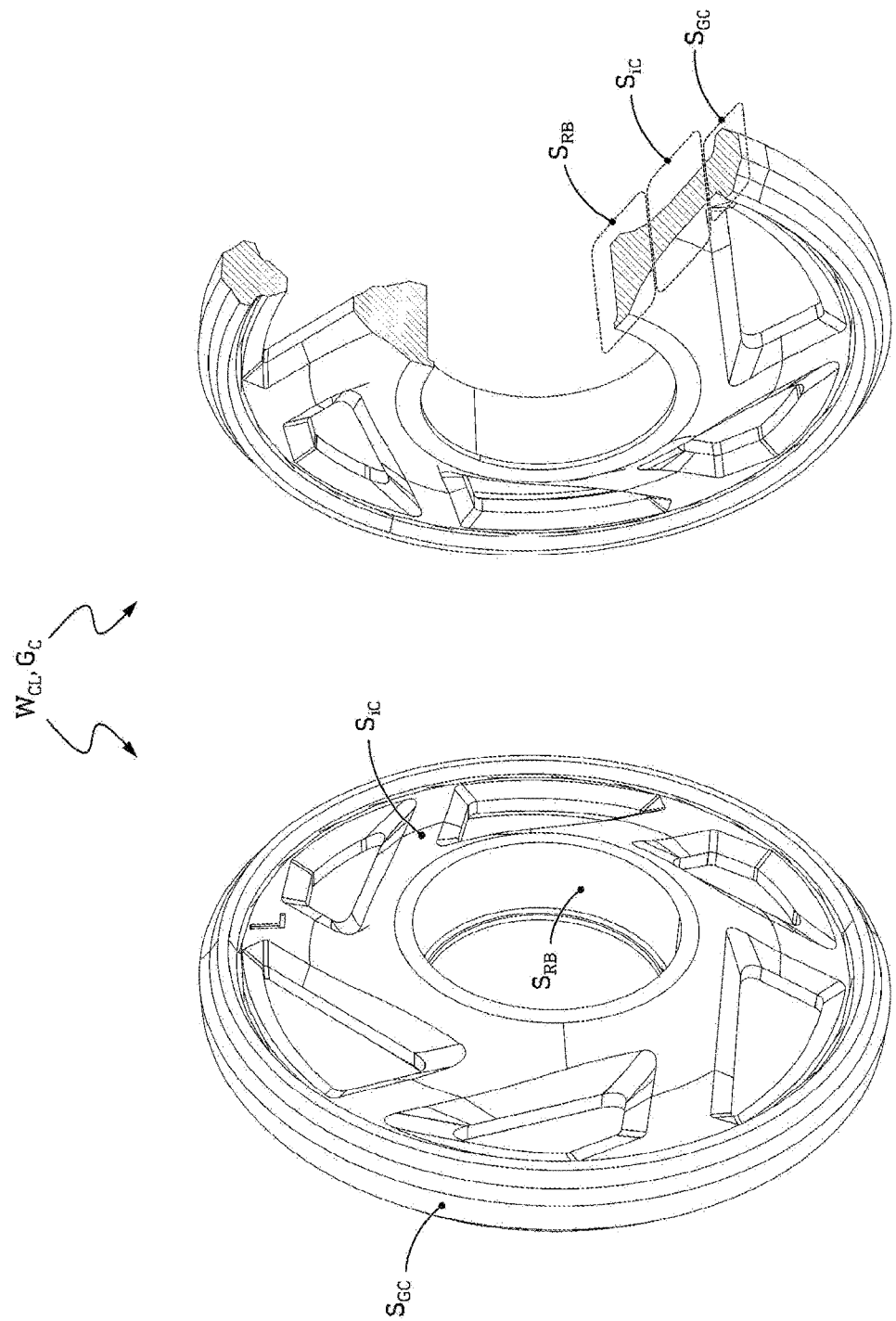
FIG. 39: shows the toothless chain tensioning pulley of the rear derailleur according to FIGS. 36 and 38 in two different representations.

FIGS. 36, 38 and 39 show a further embodiment of an electric bicycle derailleur $R_D$. This bicycle derailleur $R_D$ is provided with a lower chain tensioning pulley $W_{CL}$ which has no teeth.

Due to the toothing omitted from the chain tensioning pulley $W_{CL}$, it is no longer possible for the chain $C_N$ to ride up on the teeth of the chain tensioning pulley $W_{CL}$, as is the case with the prior art (cf. FIG. 36). For this reason, in the prior art, the chain guiding device $C_G$ between the lower chain tensioning pulley $W_{CL}$ and a chain cage guide tab $T_C$ closing the chain cage must have a sufficiently large tab distance $D_T$ from the teeth of the chain tensioning pulley $W_{CL}$ or from the outer enveloping surface $E_{Co}$ of the chain $C_N$. The tab distance $D_T$ must be large enough to allow the chain $C_N$ to pass between the chain cage guide tab $T_C$ and the lower chain tensioning pulley $W_{CL}$ even if the chain $C_N$ rides on the teeth of the chain tensioning pulley $W_{CL}$, since jamming of the chain in the chain cage can easily lead to a derailleur break.

Figure 37:
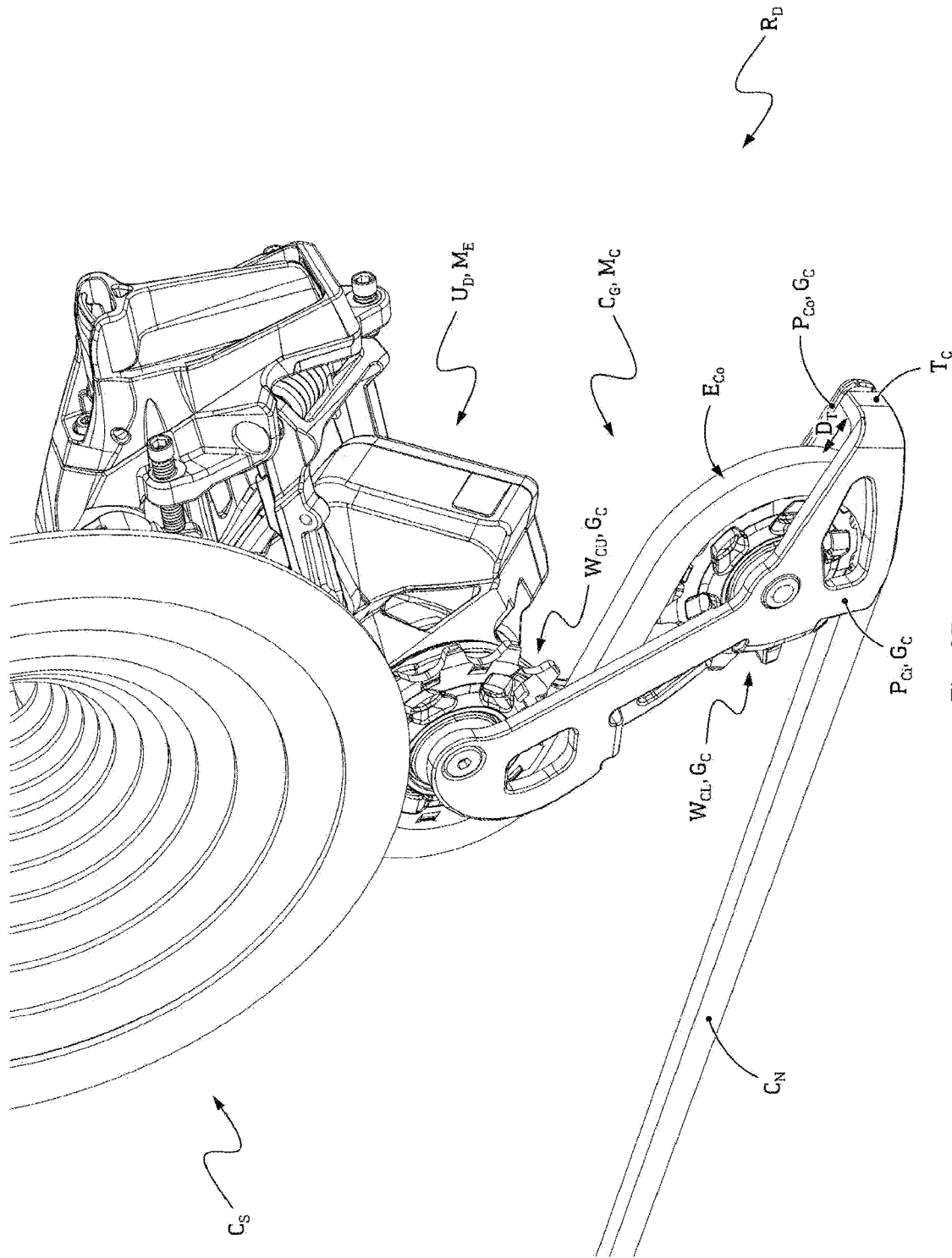
FIG. 37: shows the bicycle derailleur according to FIG. 36 with chain tensioning pulley and chain cage according to prior art.

In the bicycle derailleur $R_D$ according to FIGS. 35, 37 and 38, which has a smooth, non-toothed lower chain tensioning pulley $W_{CL}$, the chain $C_N$ has an always constant radial distance position from the chain tensioning pulley $W_{CL}$. Therefore, the chain cage guide tab $T_C$ can be positioned much closer or directly at the outer envelope surface $E_{Co}$ of the chain $C_N$, which is particularly clear not only from FIG. 35 but also from FIG. 37. This results in improved and safer guidance of the empty strand of the chain $C_N$ when entering the rear derailleur $R_D$ in all driving conditions.

In this embodiment, the chain cage tab $T_C$ is formed in such a way that a substantial gap $G_D$ remains between the chain cage tab $T_C$ and the opposite chain cage guide plate device $P_{CO}$, which can also be taken from FIGS. 35 and 37. This gap allows dirt adhering to the chain or, for example, entrained plant parts such as small branches etc. to be easily ejected from the chain cage again without clogging it, which could otherwise lead to the derailleur breaking.

FIG. 39 shows the lower chain tensioning pulley $W_{CL}$ of the rear derailleur embodiment according to FIGS. 35, 37 and 38 separately. A bearing receiving section $S_{RB}$ can be seen positioned radially inward for the arrangement of a plain or ball bearing, further a non-toothed, smooth chain guiding section $S_{GC}$ and an interconnecting structure section $S_{iC}$, which connects the bearing receiving section $S_{RB}$ and the chain guiding section $S_{GC}$ to one another.

Since the lower chain tensioning pulley $W_{CL}$ only serves to pretension the chain $C_N$ and, unlike the upper chain tensioning pulley $W_{CU}$, does not have to perform specific lateral chain guide tasks, in particular during the shifting process, the omission of the toothing on the lower chain tensioning pulley $W_{CL}$ does not involve any disadvantages.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A rear derailleur for coaxial mounting with respect to a rear wheel axis to a frame dropout of a rear frame, the rear derailleur comprising:
a rigid base element including an inner mounting arm having an inner pivot joint for inboard arrangement in the region of the frame dropout, and an outer mounting arm having an outer pivot joint coaxially aligned with the inner pivot joint for outboard arrangement in the region of the frame dropout, and the base element being connectable to the rear frame so as to be pivotable coaxially about the rear wheel axis by the inner pivot joint and outer pivot joint;
a shifting element for changing gears, the shifting element including a swivel formation pivotably connecting the base element and the shifting element wherein the shifting element is translatory pivotably movable relative to the base element pivotably; and
a chain guide device rotatably and pivotably connected to the shifting element, the chain guide including an upper chain guide pulley and a lower chain tensioning pulley;
wherein the rear derailleur is configured as a hierarchical modular construction system with at least two hierarchical levels;
the rear derailleur including at least two modules from a set of modules including a base element module corresponding to the base element, a swivel formation module corresponding to the swivel formation, a shifting element module corresponding to the shifting element, and a chain guide module corresponding to the chain guide; and
at least one of the base element module, swivel formation module, shifting element module, or chain guide module is configured to be interchangeable in one piece without tools, and the least one of the modules includes at least one sub-assembly that is configured as to be interchangeable in one piece.

2. The rear derailleur of claim 1, wherein the sub-assembly includes at least three interconnected individual parts.

3. The rear derailleur of claim 1 wherein the modular construction system is configured for use of at least one family comprising at least two family members of sub-assemblies within at least one of the modules,
wherein, for the at least one sub-assembly family, detachable connection interfaces of the family members to adjacent sub-assemblies of the at least one module within the at least one sub-assembly family are configured uniformly across the family members such that a family member of the at least one sub-assembly family of the at least one module can be exchanged for another family member of the same sub-assembly family having any one, or a combination of, different materials, different design, different functionality, or different surface properties, while retaining the remaining sub-assemblies of the at least one module.

4. The rear derailleur of claim 1 wherein the sub-assembly of the base element module is a replaceable mounting arm.

5. The rear derailleur of claim 4 wherein the replaceable mounting arm is formed as a pressed or stamped part formed from a substantially planar blank.

6. The rear derailleur of claim 4 wherein the replaceable mounting arm is formed substantially from a fiber composite.

7. The rear derailleur of claim 1 wherein the sub-assembly of the base element module is a replaceable cover element for protecting, at least in part, the base element module.

8. The rear derailleur of claim 1 wherein the swivel formation module has two swivel arms of the swivel parallelogram type for translationally swivel-connecting the base element module and the shifting element module, and at least one of the two swivel arms includes a replaceable swivel arm sub-assembly.

9. The rear derailleur of claim 8 wherein the replaceable swivel arm sub-assembly is a cover element protecting at least portions of the swivel formation module.

10. The rear derailleur of claim 9 wherein at least one swivel arm of the swivel formation module is pivotably connected to the base element module and to the shifting element module by means of two link pins; and the cover element forms a locking element for the two link pins so that the two link pins can be removed from the at least one swivel arm when the cover element is removed.

11. The rear derailleur of claim 8 wherein at least one of the swivel arms comprises at least two swivel arm sub-assemblies, of which at least one swivel arm sub-assembly is configured as to be interchangeable.

12. The rear derailleur of claim 1 wherein any one or a combination of the shifting element module and the chain guide module comprises a spring/damper sub-assembly for springing and/or damping a pivoting movement of the chain guiding device module relative to the shifting element module, and the spring/damper sub-assembly is configured as an integrally replaceable sub-assembly.

13. A rear derailleur of claim 12 wherein the spring/damper sub-assembly and a receptive housing of the shifting element module are detachably connectable to one another by an at least two-threaded screw thread pairing arranged on the spring/damper sub-assembly and on the receptive housing, wherein the at least two-threaded screw threads of the screw thread pairing are arranged unevenly spaced from one another axially and/or in the circumferential direction relative to a pivot axis of the chain guide in such a way that the thread pairing is screwable into one another in only one rotational relative position.

14. A rear derailleur of claim 1 wherein the chain guide module comprises at least one replaceable chain guide sub-assembly.

15. A rear derailleur of claim 14 wherein the at least one replaceable chain guide sub-assembly is any one or a combination of a chain cage guide plate device, a chain guiding pulley, or a chain tensioning pulley.

16. A rear derailleur of claim 1 further comprising an electric module for electric operation of the rear derailleur, the electric module having at least one replaceable electric sub-assembly.

17. The rear derailleur of claim 16 wherein the at least one replaceable electric sub-assembly is an electric motor-gearbox sub-assembly, or a battery unit, or both.

18. The rear derailleur of claim 16 further comprising a motor-gearbox sub-assembly having a housing, the housing having a rotational axis connection and two translational stop connections for connecting to the base element, wherein the housing is connectable to the base element with respect to its six spatial degrees of freedom of movement.

19. A rear derailleur for coaxial mounting with respect to a rear wheel axis to a frame dropout of a rear frame, the rear derailleur comprising:
- a rigid base element including an inner mounting arm having an inner pivot joint for inboard arrangement in the region of the frame dropout, and an outer mounting arm having an outer pivot joint coaxially aligned with the inner pivot joint for outboard arrangement in the region of the frame dropout, and the base element being connectable to the rear frame so as to be pivotable coaxially about the rear wheel axis by the inner pivot joint and outer pivot joint;
- a shifting element for changing gears, the shifting element including a swivel formation pivotably connecting the base element and the shifting element wherein the shifting element is translatory pivotably movable relative to the base element pivotably;
- a chain guide device rotatably and pivotably connected to the shifting element, the chain guide including an upper chain guide pulley and a lower chain tensioning pulley; and
- an electric module for electric operation of the rear derailleur, the electric module having at least one replaceable electric sub-assembly comprising a motor-gearbox sub-assembly having a housing comprising at least two housing parts, an electric motor, and a support plate device for supporting the electric motor, wherein the support plate device is resiliently loadable by the sub-assembly of the at least two housing parts and can be positively fixed in the housing with respect to all six degrees of freedom of movement.

* * * * *